United States Patent
Haneline et al.

(10) Patent No.: US 11,111,161 B2
(45) Date of Patent: Sep. 7, 2021

(54) RARE EARTH CLARIFYING AGENT AND METHOD FOR USE IN PRIMARY TREATMENT OF WASTEWATER

(71) Applicant: Neo Water Treatment, LLC, Greenwood Village, CO (US)

(72) Inventors: Mason Reames Haneline, Orange, CA (US); James Frederic Gallmann, Baton Rouge, LA (US)

(73) Assignee: Neo Water Treatment, LLC, Greenwood Village, CO (US)

( * ) Notice: Subject to any disclaimer, the term of this patent is extended or adjusted under 35 U.S.C. 154(b) by 0 days.

(21) Appl. No.: 16/178,356

(22) Filed: Nov. 1, 2018

(65) Prior Publication Data

US 2019/0127246 A1    May 2, 2019

Related U.S. Application Data

(60) Provisional application No. 62/580,246, filed on Nov. 1, 2017, provisional application No. 62/589,322, filed on Nov. 21, 2017.

(51) Int. Cl.
*C02F 1/52*      (2006.01)
*C02F 101/10*    (2006.01)
*C02F 1/00*      (2006.01)

(52) U.S. Cl.
CPC ...... *C02F 1/5236* (2013.01); *C02F 2001/007* (2013.01); *C02F 2101/105* (2013.01);
(Continued)

(58) Field of Classification Search
CPC .................................................. C02F 1/5236
See application file for complete search history.

(56) References Cited

U.S. PATENT DOCUMENTS

| | | |
|---|---|---|
| 3,956,118 A | 5/1976 | Kleger et al. |
| 9,233,863 B2 | 1/2016 | Hassler et al. |

(Continued)

FOREIGN PATENT DOCUMENTS

| | | |
|---|---|---|
| WO | 2000/24680 A1 | 5/2000 |
| WO | 20120100264 A1 | 7/2012 |

(Continued)

OTHER PUBLICATIONS

Neo et al., "Chemistry of Rare Earth Elements in Wastewater", Technology Chemistry in Wastewater (Sep. 24, 2017) entire document; https://neowatertreatement.com/wp-content/uploads/2017/09/RETechnology_Chemistry_in_Wastewater.pdf.

(Continued)

*Primary Examiner* — Peter Keyworth
(74) *Attorney, Agent, or Firm* — Merchant & Gould, P.C.; Melissa M. Hayworth; George C. Lewis

(57) ABSTRACT

Chloride salts of certain rare earth elements have beneficial effects as clarifying agents in the primary treatment of wastewater. Disclosed herein are methods for treating wastewater comprising dosing wastewater, as part of a primary treatment system, with a clarifying agent of chloride salts of rare earth elements, either individually or mixtures. The rare earth clarifying agents are added or dosed at any point upstream of the primary treatment operation, within the primary treatment operation, or both upstream of and within the primary treatment operation. Also disclosed herein are clarifying agents for use in the primary treatment of wastewater comprising an aqueous solution of chloride salts of the rare earth elements.

21 Claims, 37 Drawing Sheets

(52) U.S. Cl.
CPC ....... *C02F 2209/10* (2013.01); *C02F 2209/11* (2013.01); *C02F 2209/18* (2013.01)

(56) References Cited

U.S. PATENT DOCUMENTS

| | | | |
|---|---|---|---|
| 2003/0141229 A1* | 7/2003 | Chaffee | B01D 24/386 210/97 |
| 2004/0168980 A1 | 9/2004 | Musale et al. | |
| 2006/0231499 A1 | 10/2006 | Brummett | |
| 2008/0223783 A1 | 9/2008 | Sutton | |
| 2009/0223903 A1 | 9/2009 | Coffey et al. | |
| 2012/0074071 A1 | 3/2012 | Hassler et al. | |
| 2012/0103909 A1 | 5/2012 | Burba et al. | |
| 2012/0187047 A1 | 7/2012 | Cable et al. | |
| 2012/0187337 A1 | 7/2012 | Hassler et al. | |
| 2012/0223022 A1 | 9/2012 | Hassler et al. | |
| 2012/0261347 A1 | 10/2012 | Hassler et al. | |
| 2012/0261611 A1† | 10/2012 | Hassler | |
| 2012/0261661 A1 | 10/2012 | Hassler et al. | |

FOREIGN PATENT DOCUMENTS

| | | | |
|---|---|---|---|
| WO | 2012141895 A1 | 10/2012 | |
| WO | 2012141896 A1 | 10/2012 | |
| WO | 2012141897 A1 | 10/2012 | |
| WO | 2016/015328 A1 | 4/2016 | |
| WO | 2016015329 A1 | 4/2016 | |

OTHER PUBLICATIONS

International Search Report dated Feb. 21, 2019 in International Application No. PCT/US2018/058746.
Neo et al., "Chemistry of Rare Earth Elements in Wastewater", Technology Chemistry in Wastewater (Sep. 24, 2017) pp. 1, 2, 6; https://neowatertreatement.com/wp-content/uploads/2017/09/RE_Technology_Chemistry_in_Wastewater.pdf.
Neo, "Phosphorus Removal. Enhanced coagulation drives plant efficiency and performance", Albion Case Study RE100 (Sep. 24, 2017) entire document; https://neowatertreatement.com/wp-content/uploads/2017/09/Albion_Case_Study_RE100.pdf.
Third Party Observation filed Jan. 22, 2020 in corresponding International Application No. PCT/US2018/058746, pp. 1-2.
Recht, H.L., and Masood Ghassemi, "Phosphate Removal from Wastewaters Using Lanthanum Precipitation", Atomics International for the Federal Water Quality Administration Department of the Interior, Program #17010 EFX, Contract #14-12-183 1970 pp. 1-65. https://books.google.com.
Strileski, M., "Phosphorus Removal From EBPR Sludge Dewatering Liquors Using Lanthanum Chloride, Aluminum Sulfate and Ferric Chloride", UNLV Theses, Dissertations, Professional Papers, and Capstones, University of Nevada, Las Vegas 2013 pp. 1-84. https://digitalscholarship.unlv.edu/thesesdissertations.
Hach Phosphorus, Total, PhosVer 3 TNT Method, DOC316.53.01121, Jun. 2017, Edition 10.
Metcalf & Eddy.; Tchobanoglous, G.; Stensel, H. D.; Tsuchihashi, R.; Burton, F. Wastewater engineering: Treatment and Resource Recovery (5th ed.). McGraw-Hill: New York. 2014; p. 394.
Guo, J.; Peng, Y.; Wang, S.; Yang, X.; Yuan, Z. Filamentous and non-filamentous bulking of activated sludge encountered under nutrients limitation or deficiency conditions. Chem. Eng. J. 2014, 255, pp. 453-461.
Cetiner, Z. S.; Wood, S. A.; Gammons, C. H. The aqueous geochemistry of the rare earth elements. Part XIV. The solubility of rare earth element phosphates from 23 to 150° C. Chemical Geology 2005, 217, pp. 147-169.
Kim, E.; Osseo-Asare, K. Aqueous stability of thorium and rare earth metals in monazite hydrometallurgy: Eh-pH diagrams for the systems Th-, Ce-, La-, Nd—(PO4)—(SO4)—H2O at 25° C. Hydrometallurgy 2012, 113-114, 67-78.
Cotton, S., Lanthanide and Actinide Chemistry, Chapter 1 "Introduction to the Lanthanides", John Wiley & Sons Ltd: West Sussex, England, 2006; pp. 1-7.
Patterson, Robert A., "Peat Treatment of Septic Tank Effluent", Proceedings of On-site '99 Conference, University of New England, Lanfax Laboratories, Armidale, NSW Australia pp. 293-290.
Ef-Chlor on-line product information for Chlorine Tablets for Drinking Water Purification https://www.efchlor.com/product/chlorine-tablets/#:~:text=Chlorine%20Tablets%20is%20a%20widely,and%20washing%20fruits%20and%20vegetables.
Mixed Rare Earth Chloride—Material Safety Data Sheet, 2005, Advanced Material Resources.†
Koen Binnemans and Peter Tom Jones, Rare Earths and the Balance Problem, pp. 1-29, 2015, Journal of Sustainable Metallurgy.†

\* cited by examiner
† cited by third party

RARE EARTH CLARIFYING AGENT AND METHOD FOR USE IN PRIMARY TREATMENT OF WASTEWATER

This application claims priority to U.S. Provisional Application Nos. 62/580,246 filed Nov. 1, 2017, and 62/589,322 filed Nov. 21, 2017, both of which are entitled "RARE EARTH CLARIFYING AGENT AND METHOD FOR USE IN PRIMARY TREATMENT OF WASTEWATER" and are herein incorporated by reference in their entireties.

INTRODUCTION

Wastewater is a broad term that includes both human-generated wastewater (e.g., sewage) and industrial waste streams of water combined with various contaminants from the industrial process. Wastewater typically must be treated to remove at least some of the contaminants before it can be discharged into the environment or reused.

Wastewater treatment commonly involves two stages, called primary and secondary treatment. Primary treatment consists of temporarily holding the wastewater in a holding tank or basin where heavy solids can settle to the bottom while oil, grease and lighter solids float to the surface. The settled materials are removed as a sludge and the floating materials are removed from the surface, for example by skimming, and both may be disposed or processed further. The remaining liquid after primary treatment may be discharged if sufficiently clean or, as is more commonly the case, subjected to at least a secondary treatment.

A primary treatment system often includes one or more holding tanks, settling ponds, clarifiers or any other device or system that provides residence time and allows the sludge and floating materials produced to be separated from the liquid after the holding time. A pre-treatment operation also may be provided in which large objects may be removed from the wastewater, for example using a grate or large filter screen, prior to raw wastewater entering the primary treatment system.

Secondary treatment removes dissolved and suspended biological matter. Secondary treatment is typically performed by water-borne micro-organisms in a managed habitat. The levels of important nutrients for the micro-organisms in the effluent from the primary treatment are important to the effective operation of the secondary treatment. If the amount of the nutrients are too low or the ratio of the nutrients is sufficiently out of balance, the population of micro-organisms can be adversely affected and, in extreme cases, destroyed.

Some of the most important nutrients are carbon (C) and phosphorus (P) and maintaining the ratio of C—P in the primary treatment effluent is a factor when operating a wastewater treatment system that uses both primary and secondary treatment. While phosphorus is useful and effective as a fertilizer, it can cause catastrophic problems if too much gets into streams, rivers, lakes and seas. When levels of phosphates in water bodies are too high, it can trigger algal blooms and then lead to depletion of oxygen levels. Fertilizers, human waste, and detergents are the main sources of phosphate pollution. One person produces an average of 2 g of phosphorus a day which ends up at municipal treatment works.

A secondary treatment system typically includes one or more holding tanks, retention ponds, or clarifiers adapted to promote the growth and maintenance of the micro-organisms and to allow sufficient contact with the wastewater. Sometimes referred to as bio-reactors, the equipment is often provided with superstructures or other components upon which some of the micro-organisms may be attached. In other systems, the micro-organism population is primarily or purely aqueous. In these systems some stirring or agitation may be provided such as by sparging air or oxygen into the holding vessel or using a mechanical stirring component.

In addition, a tertiary treatment step is sometimes performed to reduce the levels of any remaining dissolved compounds to an acceptable level for discharge into the environment.

Primary treatment can be assisted through the addition of coagulants or other clarifying agents; however, in traditional treatment methods these coagulants and clarifying agents are rarely used because at the treatment levels required for their effective use, they are not economically feasible. Clarifying agents can be used to remove suspended solids from liquids by inducing coagulation and/or flocculation (the solids begin to aggregate forming flakes, which either precipitate to the bottom or float to the surface of the liquid, and then they can be removed or collected). The process of coagulation, along with flocculation, may be used whenever the natural settling rate of suspended material is too slow to provide effective clarification. Coagulants can be used to neutralize the charge of the suspended solids, bringing the particles together to create a small "pin floc". To generate larger particles, or flocs, for faster settling, a high molecular weight flocculant may be used, generally in combination with a coagulant.

Thus, effective methods of treating wastewater, including removing phosphorus waste while maintaining the ratio of C—P for the secondary treatment stage using microorganisms, are important. Environmentally friendly and economical waste water treatment methods are generally desirable.

SUMMARY

As disclosed herein, the present methods for treating wastewater include dosing wastewater, as part of a primary treatment system, with a clarifying agent of chloride salts of Ce and La having from 55.0-75.0% Ce and from 25.0-45.0% La and the balance being chloride salts of other rare earth elements to obtain a rare earth concentration of 0.001 to 1.0 mmol/L of wastewater.

The present methods for treating wastewater further include dosing wastewater, as part of a primary treatment system, with chloride salts of Ce and La having from 55.0-75.0% Ce and from 25.0-45.0% La in an amount sufficient to achieve a ratio of C to P ranging from 200 C:1 P to 25 C:1 P.

In additional embodiments these methods include dosing wastewater, as part of a primary treatment system, with a clarifying agent of chloride salts of a pure rare earth element to obtain a rare earth concentration of 0.001 to 1.0 mmol/L of wastewater. As used herein, a "pure rare earth element" is 95% or greater of that rare earth element, relative to total mol of all other rare earth elements in the composition, the balance being chloride salts of other rare earth elements.

Further as disclosed herein is a method for treating wastewater comprising dosing wastewater, as part of a primary treatment system, with a clarifying agent of chloride salts of a pure rare earth element in an amount sufficient to achieve a ratio of C to P ranging from 200 C:1 P to 25 C:1 P.

In an additional embodiment, the present methods include a method for treating wastewater comprising dosing wastewater, as part of a primary treatment system, with a clarifying agent of a mixture of chloride salts of rare earth elements to obtain a rare earth concentration of 0.001 to 1.0 mmol/L of wastewater, wherein the mixture is at least 95% of the rare earth Ce and a rare earth selected from praseodymium (Pr), neodymium (Nd), promethium (Pm), samarium (Sm), yttrium (Y), and mixtures thereof.

In yet another embodiment, the present methods include a method for treating wastewater comprising dosing wastewater, as part of a primary treatment system, with a clarifying agent of a mixture of chloride salts of rare earth elements to obtain a rare earth concentration of 0.001 to 1.0 mmol/L of wastewater, wherein the mixture is at least 95% of the rare earth La and a rare earth selected from praseodymium (Pr), neodymium (Nd), promethium (Pm), samarium (Sm), yttrium (Y), and mixtures thereof.

Further as disclosed herein are clarifying agents for use in the primary treatment of wastewater comprising an aqueous solution of chloride salts of the rare earth elements. The concentration of the solution of the chloride salt of the rare earth element can be 1.5 to 3.5 mol/L. As such, the clarifying agent comprises an aqueous solution of chloride salts of a rare earth element or mixtures of rare earth elements having a concentration of 1.5 to 3.5 mol/L. The pH of the solution can be 3 to 4, and the density of the solution can be 1.3 to 1.6 g/mL. In one embodiment these clarifying agents comprises an aqueous solution of chloride salts of Ce and La having from 55.0-75.0% Ce and from 25.0-45.0% La. In certain of these embodiments the balance of chloride salts of other rare earth elements is less than 2%. And in certain of these embodiments common impurities selected from the group consisting of sodium, iron, lead, uranium, and mixtures thereof are present in an amount of less than approximately 10 g/L.

In a further embodiment, the present methods include a method for treating wastewater comprising dosing wastewater, as part of a primary treatment system, with a clarifying agent of a mixture of chloride salts of rare earth elements to obtain a rare earth concentration of 0.001 to 1.0 mmol/L of wastewater, wherein the mixture is $CeCl_3$ and $LaCl_3$ with 25.0-35.0% Ce and 12.0-20.0% La and the balance being one or more of chloride salts of the other rare earth elements. In certain of these embodiments, the balance of chloride salts of other rare earth elements is greater than 45% or is 50% or greater. The balance may be a single rare earth chloride or chloride salts of a mixture of rare earth elements.

DETAILED DESCRIPTION

Figure 1:
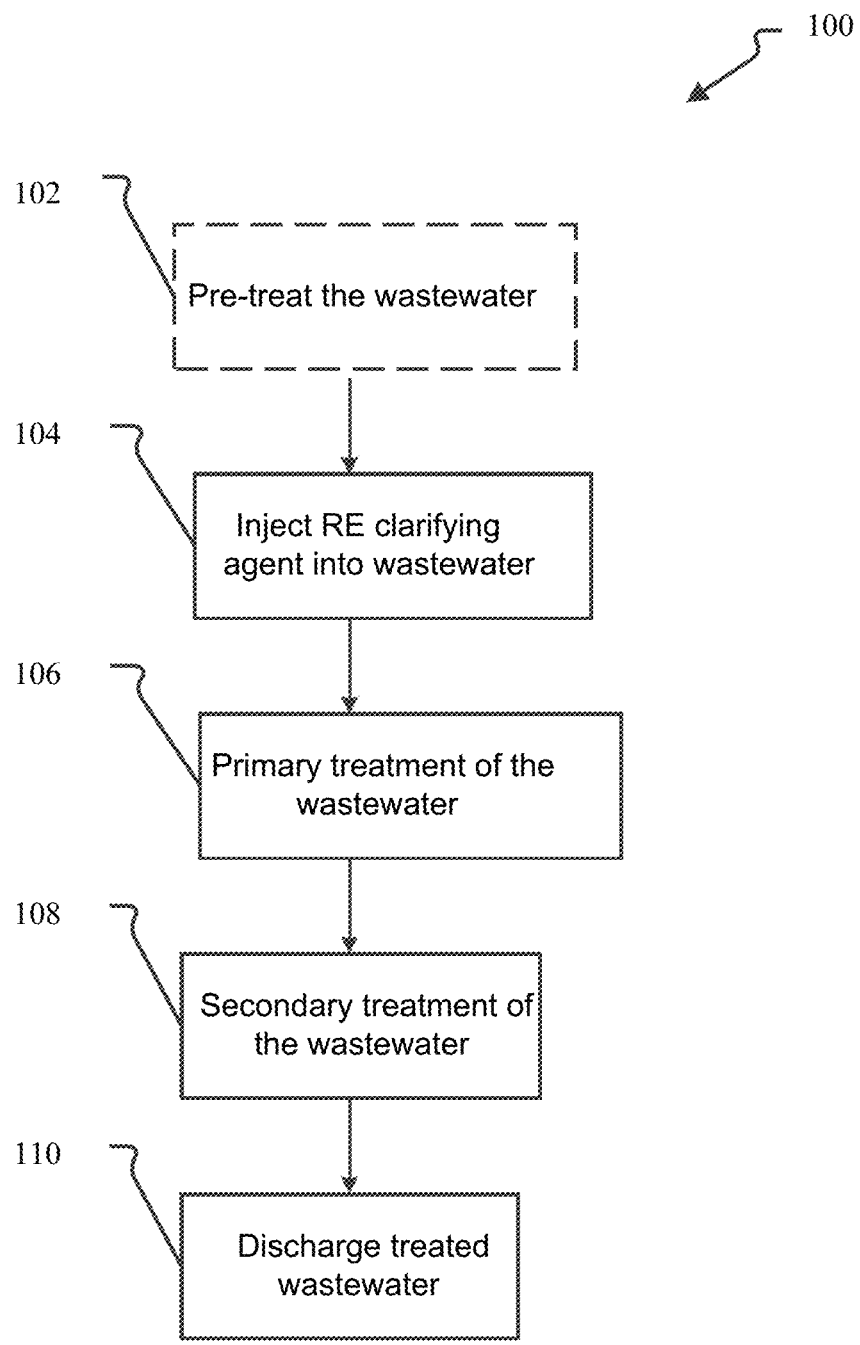
FIG. 1 illustrates an example plant flow with the RE clarifying agent dosed prior to the primary clarifier.

Before the rare earth (RE) clarifying agents and methods are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a cerium chloride" is not to be taken as quantitatively or source limiting, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

The present application relates to rare earth clarifying agents and methods of using these rare earth clarifying agents in the primary treatment of wastewater. As used herein, primary treatment includes holding the wastewater in one or more holding tanks, settling ponds, clarifiers, or the like that provides residence time and allows the heavy solids to settle to the bottom while oil and lighter solids to float to the surface. The settlable solids can be removed as sludge and the floating materials are also removed. As described herein, in addition to separation by flotation and sedimentation in the primary treatment, the rare earth clarifying agents are added as part of the primary treatment process.

The rare earth clarifying agents are added or dosed at any point within the primary treatment system, including upstream of the primary treatment operation, within the primary treatment operation, or both upstream of and within the primary treatment operation. As such, dosing in the primary treatment system or dosing as part of a primary treatment system means that the rare earth clarifying agents are added or dosed at any point upstream of the primary treatment operation, within the primary treatment operation, or both upstream of and within the primary treatment operation.

It has been determined that chloride salts of certain rare earth elements have beneficial effects as clarifying agents in the primary treatment of wastewater. As such, as used herein rare earth clarifying agents are chloride salts of rare earth elements. Chloride salts having 25% or more (by mol of rare earth element relative to total mol of all rare earth elements in the salt composition) of rare earth elements may be particularly attractive. These rare earth elements include all of the rare earth elements individually, as well as mixtures thereof. In certain embodiments, certain mixtures may be particularly attractive and in yet other embodiments, the light rare earth elements and mixtures thereof are particularly attractive.

As disclosed herein, the clarifying agents are typically an aqueous solution of chloride salts of the rare earth elements, either individually or mixtures thereof.

Without being held to any particular theory, it is believed that the rare earth clarifying agents and treatment methods described herein reduce both P and C in the primary treatment, but appear to reduce P preferentially over C. Thus, it appears that the rare earth clarifying agents can beneficially adjust the C—P ratio in the primary treatment for typical wastewaters especially sewage, because the rare earth clarifying agents reduce P more than C and typical wastewaters have a C—P ratio with relatively more P than desirable.

The rare earth clarifying agents and treatment methods described herein also beneficially can reduce one or more of turbidity, orthophosphate (OP), total phosphorous (TP), total organic carbon (TOC), chemical oxygen demand (COD), biochemical oxygen demand (BOD), and total suspended solids (TSS). The rare earth clarifying agents and treatment methods described herein further beneficially can increase the settlable solids. Since water clarity is improved (i.e., turbidity is decreased and settlable solids are increased), the rare earth clarifying agents also improve initial solid-liquid separation.

The clarifying agents as disclosed herein are chloride salts of rare earth elements. The rare earth elements (REE) are a group of seventeen metallic elements—the fifteen lanthanides, with atomic numbers 57 (lanthanum, La) to 71 (lutetium, Lu), together with yttrium (Y, atomic number 39) and scandium (Sc, atomic number 21).

Specifically, the rare earth elements (REE) are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). As used herein the rare-earth elements are selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), yttrium (Y), and mixtures thereof. As described herein the light rare earth elements include cerium (Ce), lanthanum (La), praseodymium (Pr), neodymium (Nd), promethium (Pm), samarium (Sm), and mixtures thereof.

Because of their chemical similarities, REE tend to occur together in minerals and rocks and they can be difficult to separate from each other. Geologically occurring compounds tend to be oxides, halides (fluorides), carbonates, phosphates, silicates, and fluorocarbonates. As used herein, the REE are chlorides.

It also may be possible to recycle REE from previous uses, such as high performance magnets, batteries, used electronics, and coal and coal by-products.

As used herein, the rare earth clarifying agents can be compositions containing a singular rare earth element or a mixture of rare earth elements. The rare earth clarifying agents can be aqueous solutions of a single rare earth element chloride salt or aqueous solutions of a mixture of rare earth elements chloride salts.

For the purposes of this application, % of a rare earth element is relative to total mol of all rare earth elements in the salt composition without regard to the chloride anion or any other trace salts of non-rare earth elements that may be included in a composition such as NaCl. Common impurities found in rare earth chlorides as utilized herein include sodium, iron, lead, and uranium. In certain embodiments the rare earth clarifying agents contain less than approximately 10 g/L of these common impurities. The rare earth clarifying agents can include less than approximately 9 g/L of sodium, less than approximately 20 mg/L iron, less than approximately 3 mg/L lead, and less than approximately 1 mg/L uranium.

In one embodiment, clarifying agents of chloride salts of pure rare earth elements have been tested and found to be effective. As used herein, a "pure rare earth element" is 95% or greater of that rare earth element, relative to total mol of all other rare earth elements in the composition, the balance being chloride salts of other rare earth elements. As such, the clarifying agents comprise an aqueous solution of chloride salts of the pure rare earth element.

For example, pure cerium is 95% or greater cerium; pure lanthanum is 95% or greater lanthanum; pure neodymium is 95% or greater neodymium; pure samarium is 95% or greater samarium; pure yttrium is 95% or greater yttrium; and the like. In some embodiments a "pure rare earth element" may be 99% or greater of that rare earth element, relative to total mol of all other rare earth elements in the composition, the balance being chloride salts of other rare earth elements. For example, the clarifying agent may be chloride salts of 99% or greater cerium.

In another embodiment, the clarifying agents of chloride salts of pure rare earth elements can be selected from the group consisting of lanthanum (La), praseodymium (Pr), neodymium (Nd), promethium (Pm), samarium (Sm), and yttrium (Y).

In another embodiment, the clarifying salt for use in wastewater treatment is a rare earth chloride salt of Ce having from 95-100% Ce by weight (relative to the total mass of rare earth elements) and the balance being chloride salts of other rare earth elements. In particular, this embodiment includes rare earth chloride salts having $CeCl_3$ with the 95.000-99.999% Ce (again, relative to the total mass of rare earth elements in the salt) and the balance being one or more of chloride salts of the other rare earth elements.

The rare earth clarifying agents also can be chloride salts of a mixture of rare earth elements. In one embodiment, the clarifying salt for use in wastewater treatment is a rare earth chloride salt of a mixture of Ce and La. As such, the clarifying agents comprise an aqueous solution of chloride salts of these mixtures of rare earth elements.

In one embodiment, the clarifying salts for use in wastewater treatment are rare earth chloride salts of Ce and La having from 55.0-75.0% Ce and from 25.0-45.0% La and the balance being chloride salts of other rare earth elements. As such, the clarifying agent comprises an aqueous solution of chloride salts of Ce and La having from 55.0-75.0% Ce and from 25.0-45.0% La. In certain embodiments this balance of chloride salts of other rare earth elements is less than 2%. In certain of these embodiments common impurities selected from the group consisting of sodium, iron, lead, uranium, and mixtures thereof are present in an amount of less than approximately 10 g/L.

In particular, embodiments include rare earth chloride salts having a mixture of $CeCl_3$ and $LaCl_3$ with the 60.0-65.0% Ce and 30.0-40.0% La and the balance being one or more of chloride salts of the other rare earth elements. Chloride salts of 59.8-70.1% Ce and 29.9-40.1% La, of 63.0-69.0% Ce and 30.0-36.0% La, and of 63.0-68.0% Ce and 31.0-35.0% La (all with the balance being one or more of chloride salts of the other rare earth elements) are all further embodiments of the Ce/La clarifying salt. In certain embodiments the balance of chloride salts of other rare earth elements is less than 2% and in certain of these embodiments common impurities selected from the group consisting of sodium, iron, lead, uranium, and mixtures thereof are present in an amount of less than approximately 10 g/L.

In embodiments in which the clarifying salts for use in wastewater treatment are rare earth chloride salts of Ce and La having from 55.0-75.0% Ce and from 25.0-45.0% La and the balance being chloride salts of other rare earth elements, the other rare earth elements may be any one or more of the other rare earth elements. These other rare earth elements may be selected from the group consisting of Pr, Nd, Sm, Y, and mixtures thereof.

Embodiments also include rare earth chloride salts having a mixture of $CeCl_3$ and $LaCl_3$ with 25.0-35.0% Ce and 12.0-20.0% La and the balance being one or more of chloride salts of the other rare earth elements. In certain of these embodiments, the balance of chloride salts of other rare earth elements is greater than 45% or is 50% or greater. The balance may be a single rare earth chloride or chloride salts of a mixture of rare earth elements. For example the balance of chloride salts may be 50% Y, or 50% Sm, or a mixture of 25% Sm and 25% Y.

In an embodiment, the clarify salt may be provided in hydrated crystal form (e.g., $RECl_3 \cdot xH_2O$) as described in the examples.

In other embodiments, the clarifying salt for use in wastewater treatment is a rare earth chloride salt mixture, wherein the mixture is 95% or greater of the rare earth Ce and a rare earth selected from praseodymium (Pr), neodymium (Nd), promethium (Pm), samarium (Sm), yttrium (Y), and mixtures thereof. For example, the mixture is 95% or greater of Ce and praseodymium (Pr), by way of example, 50% Ce and 45% Pr or 80% Ce and 15% Pr.

In another embodiment, the clarifying salt for use in wastewater treatment is a rare earth chloride salt mixture, wherein the mixture is 95% or greater of the rare earth La and a rare earth selected from praseodymium (Pr), neodymium (Nd), promethium (Pm), samarium (Sm), yttrium (Y), and mixtures thereof. For example, the mixture is 95% or greater of La and praseodymium (Pr), by way of example, 50% La and 45% Pr or 80% La and 15% Pr.

In another embodiment, the clarifying salt for use in wastewater treatment is a rare earth chloride salt mixture, wherein the mixture is 95% or greater of the rare earth mixture Pr and a rare earth selected from cerium (Ce), neodymium (Nd), promethium (Pm), samarium (Sm), yttrium (Y), and mixtures thereof. In another embodiment, the clarifying salt for use in wastewater treatment is a rare earth chloride salt mixture, wherein the mixture is 95% or greater of the rare earth mixture Pr and a rare earth selected from lanthanum (La), neodymium (Nd), promethium (Pm), samarium (Sm), yttrium (Y), and mixtures thereof.

In another embodiment, the clarifying salt for use in wastewater treatment is a rare earth chloride salt mixture, wherein the mixture is 95% or greater of the rare earth mixture Nd and a rare earth selected from cerium (Ce), praseodymium (Pr), promethium (Pm), samarium (Sm), yttrium (Y), and mixtures thereof. In yet another embodiment, the clarifying salt for use in wastewater treatment is a rare earth chloride salt mixture, wherein the mixture is 95% or greater of the rare earth mixture Nd and a rare earth selected from lanthanum (La), praseodymium (Pr), promethium (Pm), samarium (Sm), yttrium (Y), and mixtures thereof.

In another embodiment, the clarifying salt for use in wastewater treatment is a rare earth chloride salt mixture, wherein the mixture is 95% or greater of the rare earth mixture Pm and a rare earth selected from cerium (Ce), praseodymium (Pr), neodymium (Nd), samarium (Sm), yttrium (Y), and mixtures thereof. In yet another embodiment, the clarifying salt for use in wastewater treatment is a rare earth chloride salt mixture, wherein the mixture is 95% or greater of the rare earth mixture Pm and a rare earth selected from lanthanum (La), praseodymium (Pr), neodymium (Nd), samarium (Sm), yttrium (Y), and mixtures thereof.

In another embodiment, the clarifying salt for use in wastewater treatment is a rare earth chloride salt mixture, wherein the mixture is 95% or greater of the rare earth mixture Sm and a rare earth selected from cerium (Ce), praseodymium (Pr), neodymium (Nd), promethium (Pm), yttrium (Y), and mixtures thereof. In yet another embodiment, the clarifying salt for use in wastewater treatment is a rare earth chloride salt mixture, wherein the mixture is 95% or greater of the rare earth mixture Sm and a rare earth selected from lanthanum (La), praseodymium (Pr), neodymium (Nd), promethium (Pm), yttrium (Y), and mixtures thereof.

In another embodiment, the clarifying salt for use in wastewater treatment is a rare earth chloride salt mixture, wherein the mixture is 95% or greater of the rare earth mixture Y and a rare earth selected from cerium (Ce), praseodymium (Pr), neodymium (Nd), promethium (Pm), samarium (Sm), and mixtures thereof. In yet another embodiment, the clarifying salt for use in wastewater treatment is a rare earth chloride salt mixture, wherein the mixture is 95% or greater of the rare earth mixture Y and a rare earth selected from lanthanum (La), praseodymium (Pr), neodymium (Nd), promethium (Pm), samarium (Sm), and mixtures thereof.

Treatment Method

As described herein, the clarifying agents are utilized as part of a wastewater treatment method and as such, are added at any point in the treatment system upstream of and including in the primary treatment operation itself. As defined herein, "dosing as part of a primary treatment system" means dosing the wastewater with the rare earth clarifying agent upstream of and/or in the primary treatment operation. As such, the methods for treating wastewater include dosing the wastewater with the rare earth clarifying agent upstream of the primary treatment operation, in the primary treatment operation, or both upstream of and in the primary treatment operation. When added upstream of the primary treatment operation, the methods for treating wastewater include dosing the wastewater with the rare earth clarifying agent prior to any pretreatment or grit screen.

Adding the rare earth clarifying agents in or prior to the primary treatment beneficially may adjust the C—P ratio. The beneficial results of dosing the rare earth clarifying agents at this point in the treatment process is also of note because coagulants/clarifying agents are not typically dosed during this part of the water treatment process. The rare earth clarifying agents are cost effective because their dose rates are relatively small and they are highly effective in adjusting the C—P ratio. They can also be effective in reducing one or more of turbidity, orthophosphate (OP), total phosphorous (TP), total organic carbon (TOC), chemical oxygen demand (COD), biochemical oxygen demand (BOD), and total suspended solids (TSS), and increasing settlable solids.

The rare earth clarifying agents may be dosed in a single addition or multiple additions. When multiple additions are utilized, the rare earth clarifying agents may be dosed multiple times at the same dose point within or just prior to the primary treatment operation or the rare earth clarifying agents may be dose at multiple dose points within or just prior to the primary treatment operation. In a plant running continuously, multiple dose points may be advantageous.

FIG. 1 is a flow chart for an embodiment of a method for treating wastewater with a rare earth element clarifying agent. In the method 100, the raw wastewater is first optionally passed through a pre-treatment operation 102. The pre-treatment operation 102 may include any pre-treatments to remove large objects, such as for example passing the raw wastewater through a grate, through a knockout tank, or other physical screen separator.

The pre-treated water is then dosed with the rare earth element clarifying agent in a rare earth dosing operation 104 before it is passed into the primary treatment system where it undergoes primary treatment in the primary treatment operation 106. The rare earth dosing operation 104 injects, mixes, or otherwise adds the rare earth element clarifying agent to the wastewater so that some concentration of rare earth elements is obtained in the wastewater during the primary treatment operation 106. In an embodiment, the dosing rate is changed to maintain a particular target concentration. Alternatively, the dosing rate may be set based on the observed performance of the primary treatment system (and secondary treatment system) and not adjusted unless degraded performance is observed. For example, it has been observed that if a dose is too high, the resulting sludge becomes too thick to be efficiently removed from the primary treatment system and the primary treatment effluent becomes too clear and reduced in nutrients, causing the micro-organism population in the secondary treatment to starve unless supplemental nutrients are provided. In yet another embodiment, the dosing rate of the rare earth element clarifying agent may be adjusted based on measurements of some indirect indicator parameter such as total organic carbon (TOC), chemical oxygen demand (COD), filtered orthophosphate (FOP), unfiltered orthophosphate (UOP), total phosphorus (TP), turbidity, and Biochemical Oxygen Demand (BOD). The dosing rate that may be used is described in greater detail below.

Depending on the embodiment, the rare earth element clarifying agent may be continuously added at a desired rate or discrete amounts may be added batch-wise. A single dose point or multiple dose points may be utilized. If added in discrete amounts, the rare earth element clarifying agent may be added in a single addition or in multiple additions, for example in one to twenty discrete additions and in certain embodiments in one to ten discrete additions. These additions may be at the same dose point or at different dose points.

Furthermore, the rare earth element clarifying agent may be added at any point in the treatment system upstream of and including in the primary treatment operation itself. When added upstream of the primary treatment operation, the methods for treating wastewater include dosing the wastewater with the rare earth clarifying agent prior to any pretreatment. For example, in one system configuration, the dosing operation 104 is performed using a simple metering pump set to inject a predetermined amount of the rare earth element clarifying agent into the wastewater stream as it enters the primary treatment system. In an alternate embodiment, the rare earth element clarifying agent may be added directly to primary treatment operation (e.g., directly into the clarifier, holding tank, etc.). In yet another embodiment, the rare earth element clarifying agent may be added before the pre-treatment of the wastewater. If multiple dose points are utilized, these multiple dose points may be one of these locations at any point in the treatment system upstream of and including in the primary treatment operation itself or may include all of these locations.

The primary treatment operation 106 includes retaining the wastewater and rare earth element clarifying agent for a retention time (residence time), thereby allowing flocculation and/or coagulation time to occur resulting in separation of solids from the wastewater. As mentioned above, a typical form of wastewater treatment is to flow the wastewater through a clarifier, settling tank, or other holding vessel and control the flow rates that results in a predetermined residence time. Clarifiers are settling tanks provided with mechanical equipment for continuous removal of solids being deposited by sedimentation as sludge. A clarifier is designed to more efficiently remove solid particulates or suspended solids from liquid for clarification and (or) thickening than a simple settling tank.

In the flow chart shown in FIG. 1, the primary treatment is followed by a secondary treatment operation 108. Secondary treatment, as described above, involves the biological treatment of the dissolved and suspended organic material as well as the nutrients nitrogen and phosphorus, and, optionally, disinfection to kill pathogenic bacteria. As described herein, the wastewater may be dosed with the rare earth clarifying agent in an amount sufficient to obtain a ratio of C to P ranging from 500 C:1 P to 5 C:1 P, and in some embodiments 200 C:1 P to 25 C:1 P, so that the secondary treatment operates more efficiently. In certain embodiments, the wastewater may be dosed with the rare earth clarifying agent in an amount sufficient to obtain a ratio of C to P ranging from 100 C:1 P to 50 C:1 P. Wastewater prior to treatment may have a C to P ratio of approximately 20 C:1 P and the methods as described herein can adjust that wastewater such that the C:P ratio is approximately 100 C:1 P to 50 C:1 P and thus the secondary treatment operates more efficiently.

After the secondary treatment, the treated effluent may be discharged in a discharge operation 110 or subjected to additional treatment (e.g., tertiary treatment, not shown). As shown in the Examples, below, the addition of the rare earth element clarifying agent improves the performance of the primary treatment in terms of increased mass of solids removal and improved phosphorous removal while maintaining an acceptable C—P ratio. The addition of the rare earth clarifying agents also beneficially may reduce one or more of turbidity, orthophosphate (OP), total phosphorous (TP), total organic carbon (TOC), chemical oxygen demand (COD), biochemical oxygen demand (BOD), and total suspended solids (TSS), and further beneficially may can increase the settlable solids.

Rare Earth Element Treatment Levels

In one embodiment of the method 100, the rare earth element treatment level to be obtained in the dosing operation 104 is based on the amount of rare earth elements (in mmol of total rare earth elements or mol RE) per liter (L) of wastewater. In this embodiment, the dosing rate of the rare earth element clarifying agent is varied based on the wastewater stream's volumetric flowrate to achieve a predetermined concentration target of mmol/L of rare earth elements to liter of wastewater.

The concentration of the solution of the chloride salt of the rare earth element also can be adjusted to achieve the target concentration of mmol/L of rare earth elements to liter of wastewater or the dosing amount (volume of the solution of the chloride salt of the rare earth element) can be varied to achieve the target concentration of mmol/L of rare earth elements to liter of wastewater.

The concentration of the solution of the chloride salt of the rare earth element can be 1.5 to 3.5 mol/L and in some embodiments 1.8 to 2.6 mol/L. As such, the clarifying agent comprises an aqueous solution of chloride salts of a rare earth element or mixtures of rare earth elements having a concentration of 1.5 to 3.5 mol/L. The pH of the solution can be 3 to 4. The density of the solution can be 1.3 to 1.6 g/mL. The treatment is focused to achieve a target concentration of mmol/L of rare earth elements to liter of wastewater.

In one embodiment the range of the concentration target is from 0.001 to 1.0 mmol RE/L wastewater. In another the concentration target is from 0.01 to 0.5 mmol RE/L wastewater. In a yet more narrow embodiment the concentration target is from 0.03 to 0.30 mmol RE/L wastewater. As such, the methods for treating wastewater described herein, include dosing wastewater with a clarifying agent of chloride salts of a pure rare earth element to obtain a rare earth concentration of 0.001 to 1.0 mmol/L of wastewater, and in certain embodiments 0.01 to 0.5 mmol of wastewater or 0.03 to 0.30 mmol/L wastewater. The methods for treating wastewater described herein, further include dosing wastewater with a clarifying agent of chloride salts of a mixture of rare earth elements to obtain a rare earth concentration of 0.001 to 1.0 mmol/L of wastewater, and in certain embodiments 0.01 to 0.5 mmol of wastewater or 0.03 to 0.30 mmol/L wastewater. This mixture can be any mixtures of rare earth elements, including those specifically detailed herein.

This dosing target may be used regardless of whether the rare earth element clarifying agent is a pure rare earth element or a mixture of rare earth elements. This dosing target may be achieved by a single dose or by multiple doses which together provide the dosing target. If multiple doses are utilized, the multiple doses can be performed at the same site or at different sites.

In an alternative embodiment, the rare earth element treatment level to be obtained in the dosing operation 104 is based on achieving a target ratio of carbon to phosphorus (C—P) in the primary treatment effluent. In this embodiment, the wastewater is dosed with the rare earth element clarifying agents in an amount sufficient to achieve ratio of C to P ranging from 500 C:1 P to 5 C:1 P and in certain instances 200 C:1 P to 25 C:1 P. In other embodiments, a C to P of 200 C:1 P to 30 C:1 P or 200 C:1 P to 35 C:1 P or 200 C:1 P to 40 C:1 P or 200 C:1 P to 45 C:1 P can be achieved. More narrowly, the target C—P ratio may range from 150 C:1 P to 25 C:1 P or even ranging from approximately 100 C:1 P to 50 C:1 P. Wastewater prior to treatment can have a C to P ratio of approximately 20 C:1 P and the methods as described herein can adjust the C:P ratio to approximately 100 C:1 P to 50 C:1 P.

EXAMPLES

The description and results of experiments showing the efficacy of the rare earth element clarifying agent and the treatment method are described in the following non-limiting examples. It is noted that some of the mass values are reported in mass of rare earth oxide (REO). This is used because the $RECl_3$ hydrate has some inherent variability in the hydration levels which makes calculation of mass of $RECl_3$ hydrate a poor metric in some instances. Conversion of $RECl_3$ hydrate to REO is typically handled by burning/oxidizing all $RECl_3$ hydrate to REO as is known in the art.

Example 1: Experimental Data Generated from Simulated Wastewater

Synthesis of Rare Earth Chloride Solution:

Individual $RECl_3$ solutions were prepared by dissolving rare earth oxides with at least 99.9% purity of the individual rare earth vs the other rare earths in concentrated hydrochloric acid (HCl). A concentration of 2 mol/L RE was targeted. The solution was then pH adjusted with dilute NaOH until the pH was between 3 and 4. The solutions were then titrated with 0.1 M EDTA using Xylenol Orange as an indicator to determine the actual concentration. As an example, 32.74 g of $La_2O_3$ (99.9% La vs all RE) was dissolved in a minimal amount of conc HCl. The solution was then pH adjusted with dilute NaOH solution. The volume was adjusted to 100 ml by dilution with DI water. The resulting solution was titrated and found to be 1.95 mol/L La.

Mixtures of $RECl_3$ solutions were prepared by mixing the appropriate volumes of the individual $RECl_3$ solutions such that the desired RE distribution was obtained. As an example, to prepare a 66.67% Ce, 33.33% La solution, 1 ml of 2.43 mol/L Ce solution was mixed with 0.625 ml of 1.95 mol/L La.

Simulated Wastewater:

Simulated wastewater was created using a combination of three components 1) simulated human feces, 2) simulated human urine, and 3) food waste. Methods for preparing simulated human feces and urine were obtained from the literature. (See Colón, J.; Forbis-Stokes, A. A.; Deshusses, M. A. *Anaerobic digestion of undiluted simulant human excreta for sanitation and energy recovery in less-developed countries*. Energy for Sustainable Development 29 (2015) 57-64.) The food waste formula was obtained from the 2014 ASCE Mid-Pacific Conference Water Treatment Competition Rules.

The amounts of simulated human feces and urine were based on published numbers for the amount of feces and urine generated per person per day. These numbers were cross referenced with known flow rates for plants which treat known populations. The food waste was added in amounts to increase the total phosphorus and chemical oxygen demand to levels comparable to observed levels in WWT plants.

| Simulated feces | | Simulated urine | |
|---|---|---|---|
| Ingredient | Amount (g/kg) | Ingredient | Amount (g/L) |
| Water | 800 | Urea | 9.3 |
| Baker's yeast (dry) | 60 | Creatinine | 2.0 |
| Microcrystalline cellulose | 20 | Ammonium citrate | 1.0 |
| Psyllium | 35 | NaCl | 8 |
| Miso paste | 35 | KCl | 1.65 |
| Oleic acid | 40 | $KHSO_4$ | 0.5 |
| NaCl | 4 | $MgSO_4$ | 0.2 |
| KCl | 4 | $KH_2PO_4$ | 1.75 |
| $CaCl_2$ | 2 | $KHCO_3$ | 0.5 |

A reasonable average of feces generated per day is 350-400 g/day/person and for urine it is 1 L/day/person (reference 1).

The amount of wastewater generated per day can vary. The USGS states it is 100 gallons/day/person. The EPA published a paper in 1993 stating that the amount of wastewater generated was 184 gallons/day/person.

For this experiment, a generated wastewater average of 200 gal/day/person was chosen along with 400 g/day/person for feces and 1 L/day/person for urine. Thus, for 1 gal of test solution: 2 g of simulated feces were used and 5 ml of simulated urine.

The food waste formula, obtained from the 2014 ASCE Mid-Pacific Conference Water Treatment Competition Rules as set forth below, was used. These ingredients were mixed together (excluding the Simple Green All-Purpose Cleaner and water) and blended to form a consistent mixture.

| Ingredient | Quantity per 4.5 gallons |
|---|---|
| Tostitos Original Tortilla Chips | 4 oz |
| Ortega Thick & Chunky Medium Salsa | 1 cup |
| Goya black beans | 7.5 oz (½ can) |
| Shredded mild cheddar cheese | 2 oz |
| Iceberg lettuce | 1 head, heart removed, cut into quarter shredded into ¼ inch stripes along the short side |
| Coca-Cola Classic | 6 oz |
| Nabisco saltines, roughly crushed into 1 inch pieces (max) | ⅛ lb |
| Ocean Spray Cranberry Juice | 2 cups |
| Sun-maid black seedless raisins | ½ cup |
| Quaker steel cut oats | 1 cup |
| Yoplait original strawberry yogurt | 3 oz |
| Simple Green All-Purpose Cleaner | ¼ cup |

Thus, the simulated waste water was made by charging a 5 gal bucket fitted with baffles, overhead stirrer, and discharge valve near the bottom with 8 g simulated feces, 11 ml simulated human urine, 5 g food waste mixture, and 1.5 ml Simple Green All-Purpose Cleaner per 1 gal of tap water (City of Orange, Calif.).

Results and Experimental

Example 1A: Dose Curves

A $RECl_3$ solution was made at the concentrations outlined in the table below. 4 gal of simulated wastewater was made as described above and allowed to stir for at least 15 min. A 1 L sample was collected in an Imhoff cone from the discharge valve as a control. Rare earth chloride was then dosed into the simulated wastewater solution in increments such that the RE concentration in the mixture increased by approximately 0.013 mmol/L each increment for a total of 9 additions. The actual concentration was calculated based on the dose and the volume of sample removed after sampling. The mixture was allowed to stir for at least 5 min before a 1 L sample was collected as before. This process was repeated until a total of 10 samples (1 control and 9 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for orthophosphorus. Unfiltered samples were analyzed for turbidity, total phosphorus, and chemical oxygen demand.

| Rare Earth Chloride | RE Distribution | RE concentration (mol/L) |
|---|---|---|
| CeCl$_3$ | ≥99.9% Ce | 2.43 |
| SmCl$_3$ | ≥99.9% Sm | 1.47 |
| YCl$_3$ | ≥99.9% Y | 3.13 |
| (CeLa)Cl$_3$ | 66.6% Ce, 33.3% La | 2.11 |
| (CeLaY)Cl$_3$ | 33.3% Ce, 16.6% La, 50% Y | 2.61 |
| (CeLaSm)Cl$_3$ | 33.3% Ce, 16.6% La, 50% Sm | 1.77 |
| (CeLaSmY)Cl$_3$ | 33.3% Ce, 16.6% La, 25% Sm, 25% Y | 2.11 |

Figure 2A:
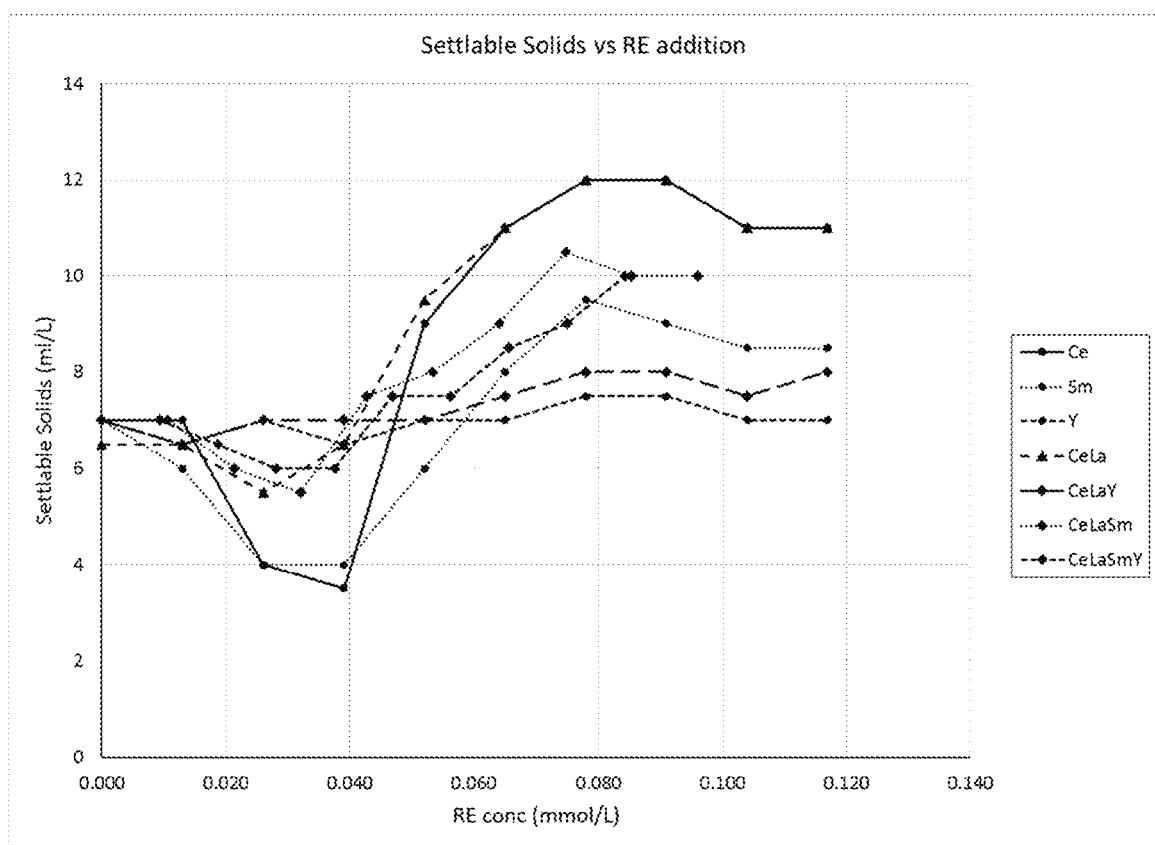
FIG. 2A is a graph of the settlable solids of each sample of Example 1A as measured and plotted vs. the RE concentration in mmol/L.
Figure 2B:
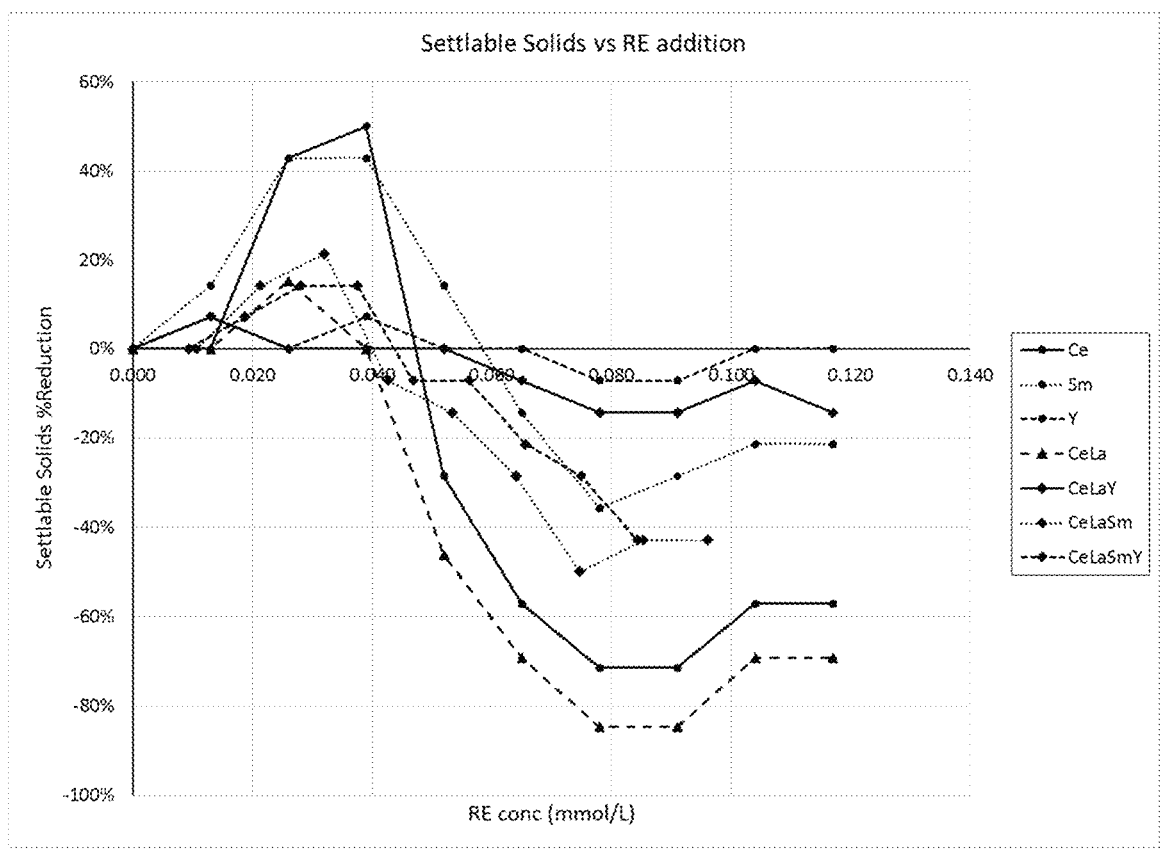
FIG. 2B is a graph of the % reduction in settlable solids as calculated and plotted vs the RE concentration in mmol/L of Example 1A.
Figure 2C:
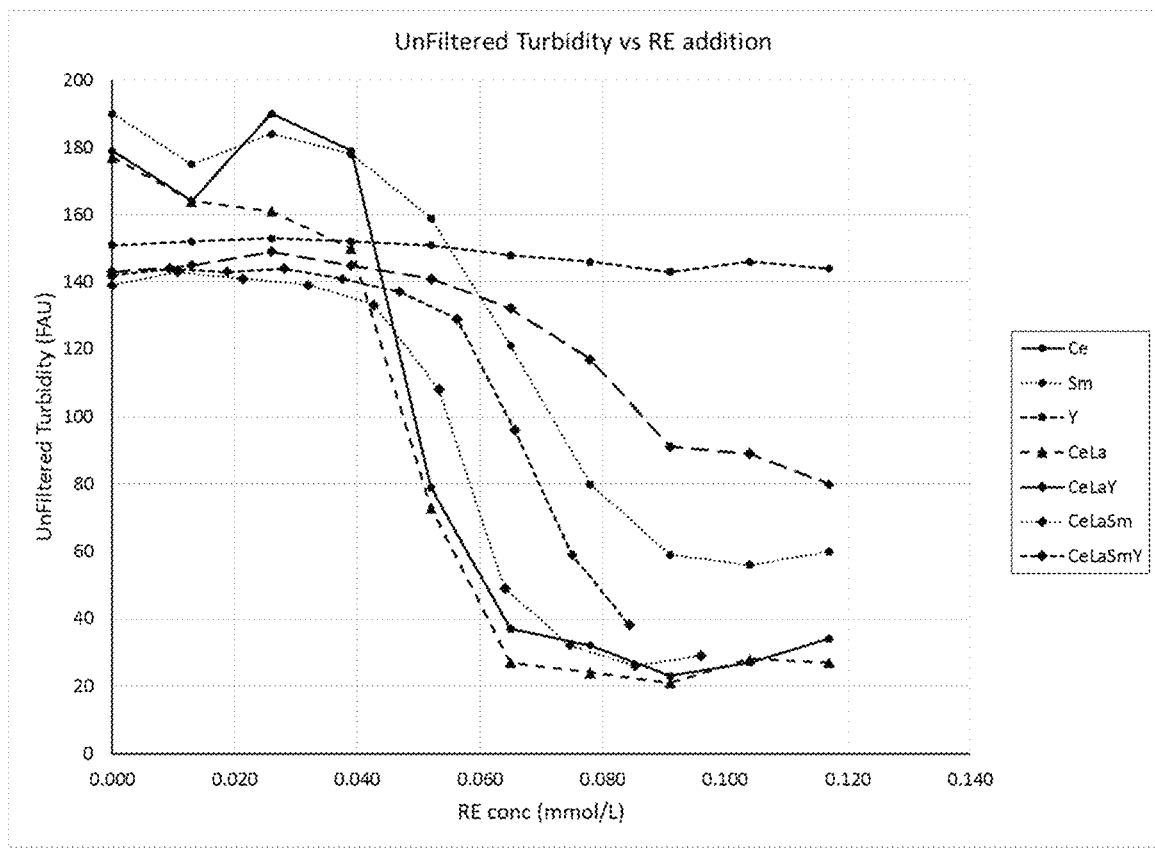
FIG. 2C is a graph of unfiltered turbidity as measured and plotted vs. the RE concentration in mmol/L of Example 1A.
Figure 2D:
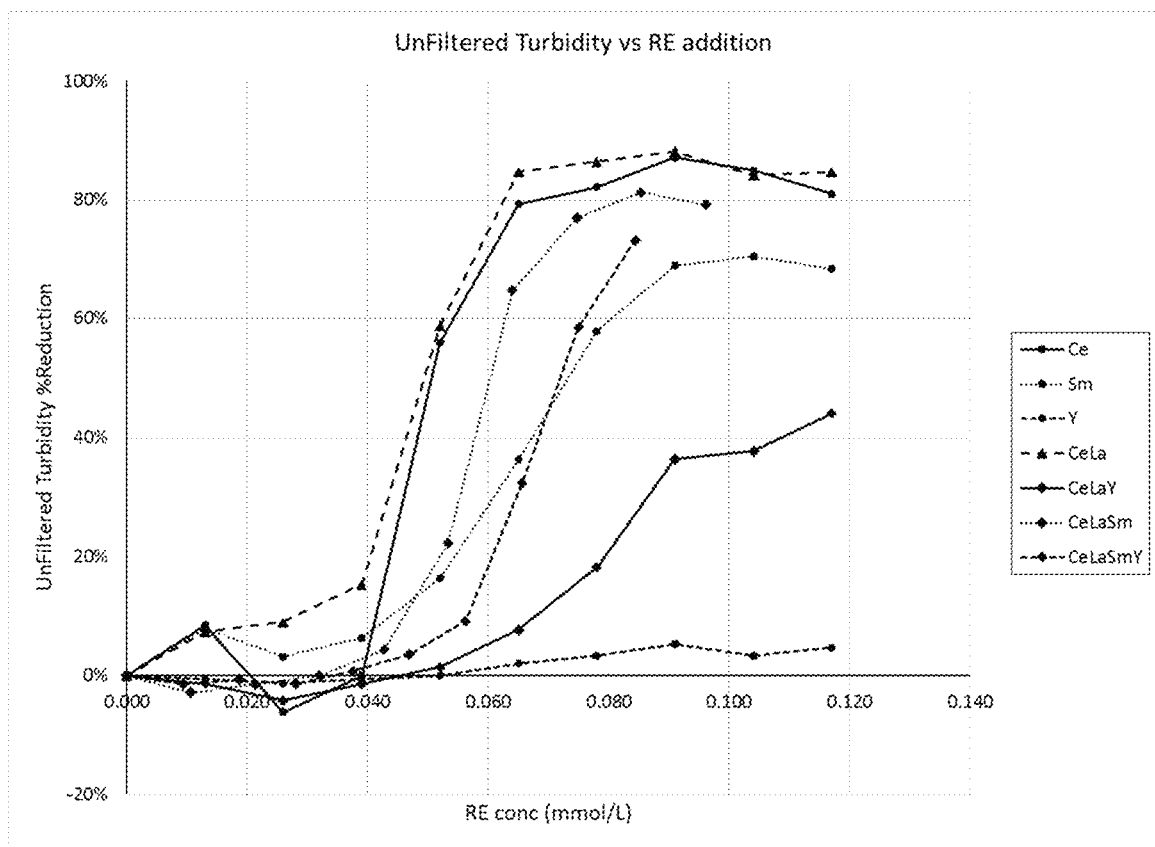
FIG. 2D is a graph of the % reduction in turbidity as calculated and plotted vs the RE concentration in mmol/L of Example 1A.

The settable solids of each sample were measured and plotted vs. the RE concentration in mmol/L, as shown in FIG. 2A. The % reduction in settable solids was also calculated and plotted, as shown in FIG. 2B. Unfiltered samples of the supernatant from each dosing were measured for turbidity and this was plotted vs. the RE concentration in mmol/L, as shown in FIG. 2C. The % reduction in turbidity was also calculated and plotted, as shown in FIG. 2D.

Figure 2E:
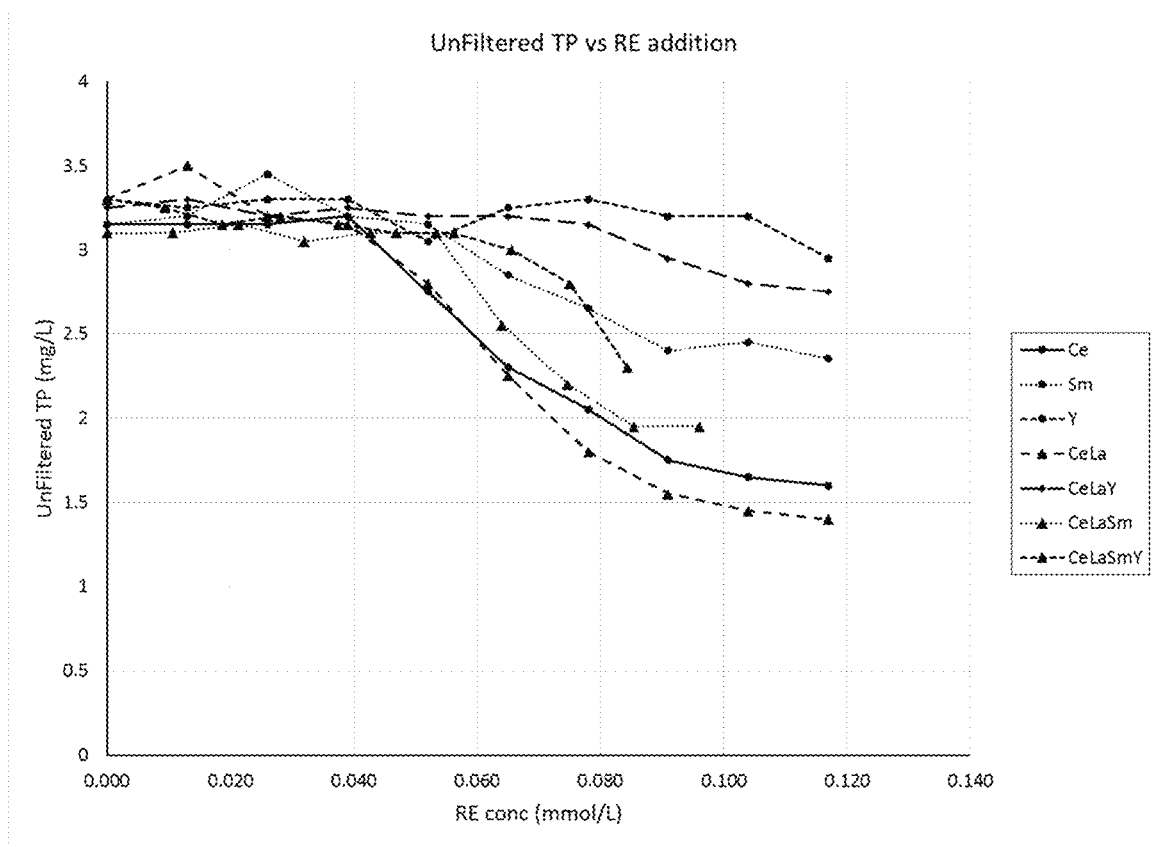
FIG. 2E is a graph of Total Phosphorus (TP) as measured and plotted vs. the RE concentration in mmol/L of Example 1A.
Figure 2F:
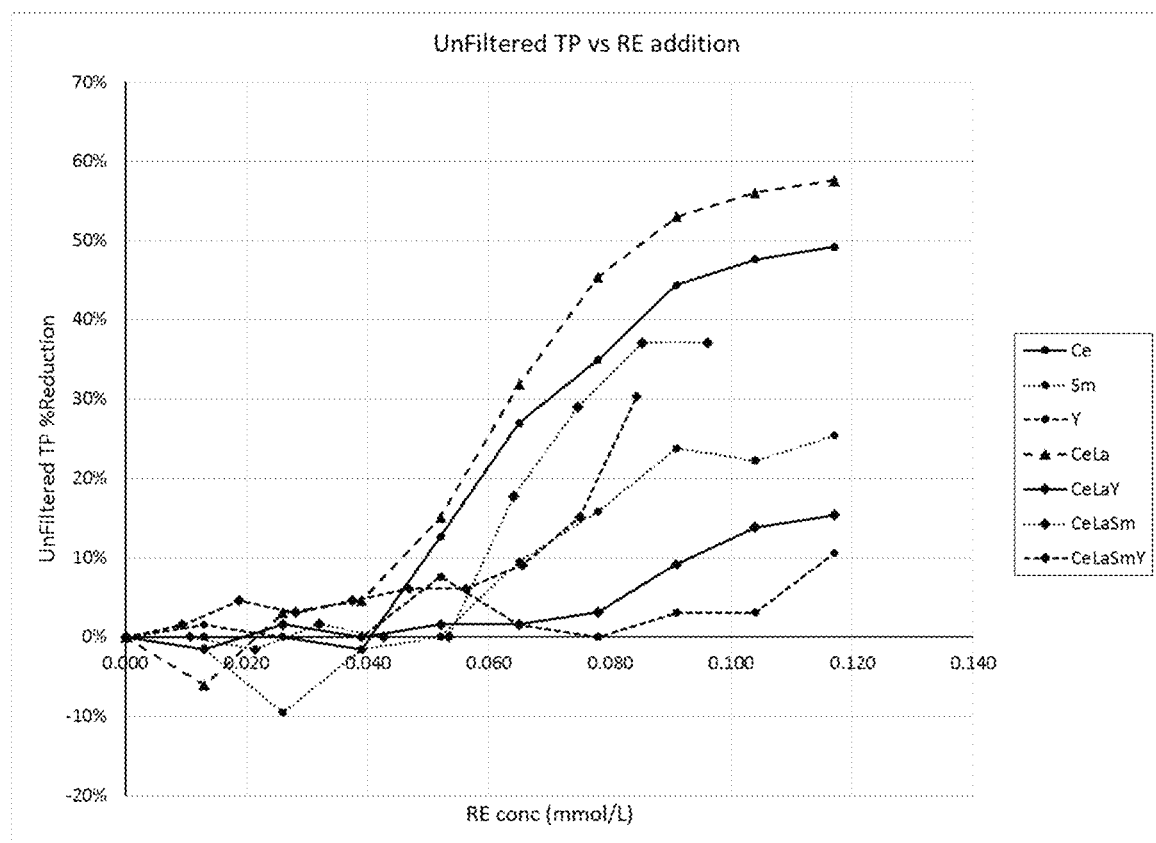
FIG. 2F is a graph of the % reduction in TP as calculated and plotted vs the RE concentration in mmol/L of Example 1A.
Figure 2G:
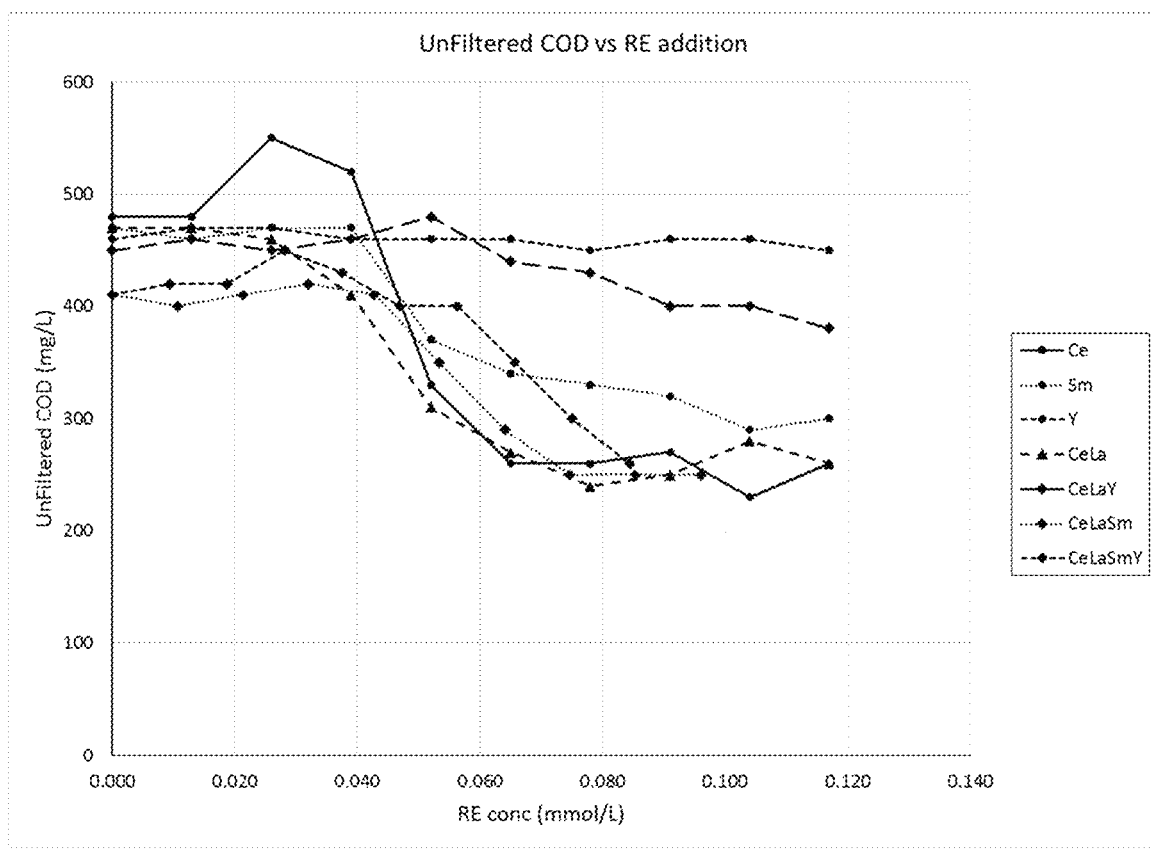
FIG. 2G is a graph of Chemical Oxygen Demand (COD) as measured and plotted vs. the RE concentration in mmol/L of Example 1A.
Figure 2H:
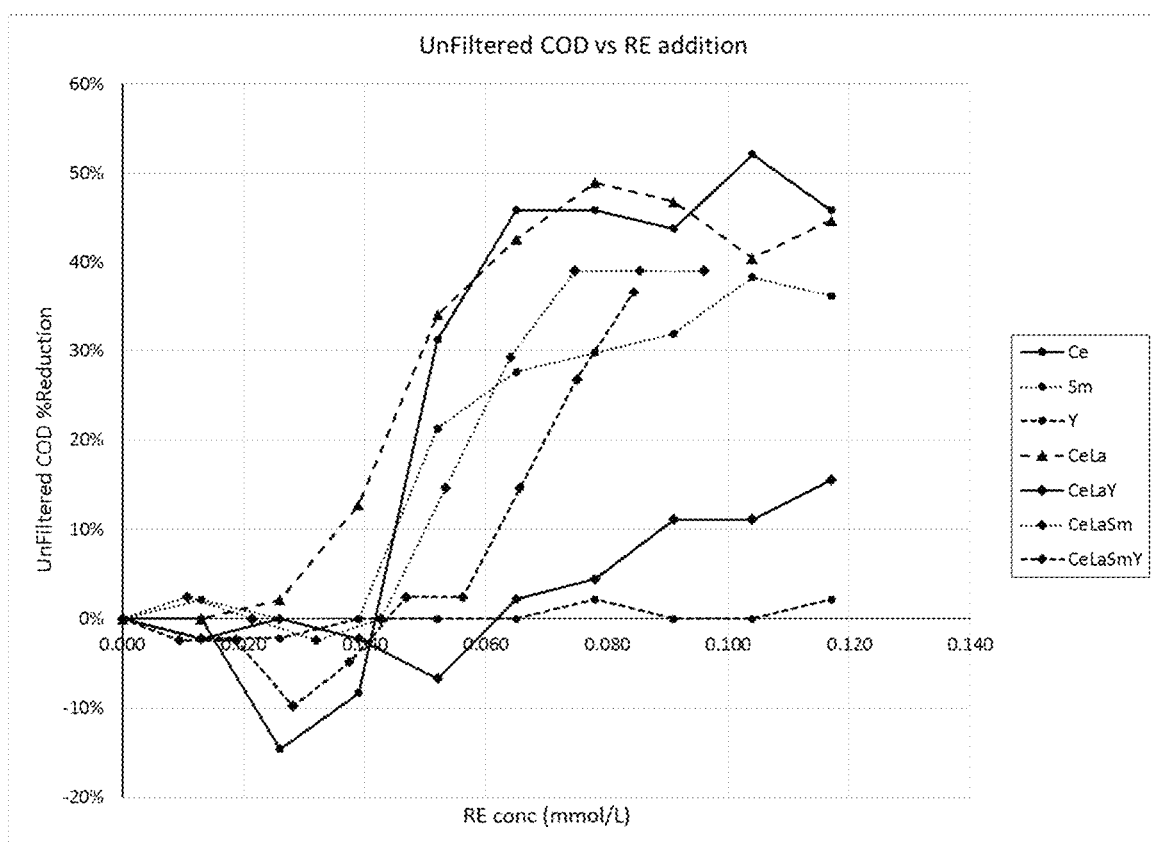
FIG. 2H is a graph of the % reduction in COD as calculated and plotted vs the RE concentration in mmol/L of Example 1A.

Unfiltered samples of the supernatant from each dosing were measured for Total Phosphorus (TP) and this was plotted vs. the RE concentration in mmol/L, as shown in FIG. 2E. The % reduction in TP was also calculated and this was plotted, as shown in FIG. 2F. Unfiltered samples of the supernatant from each dosing were measured for Chemical Oxygen Demand (COD) and this was plotted vs. the RE concentration in mmol/L, as shown in FIG. 2G. The % reduction in COD was also calculated and plotted, as shown in FIG. 2H.

Figure 2I:
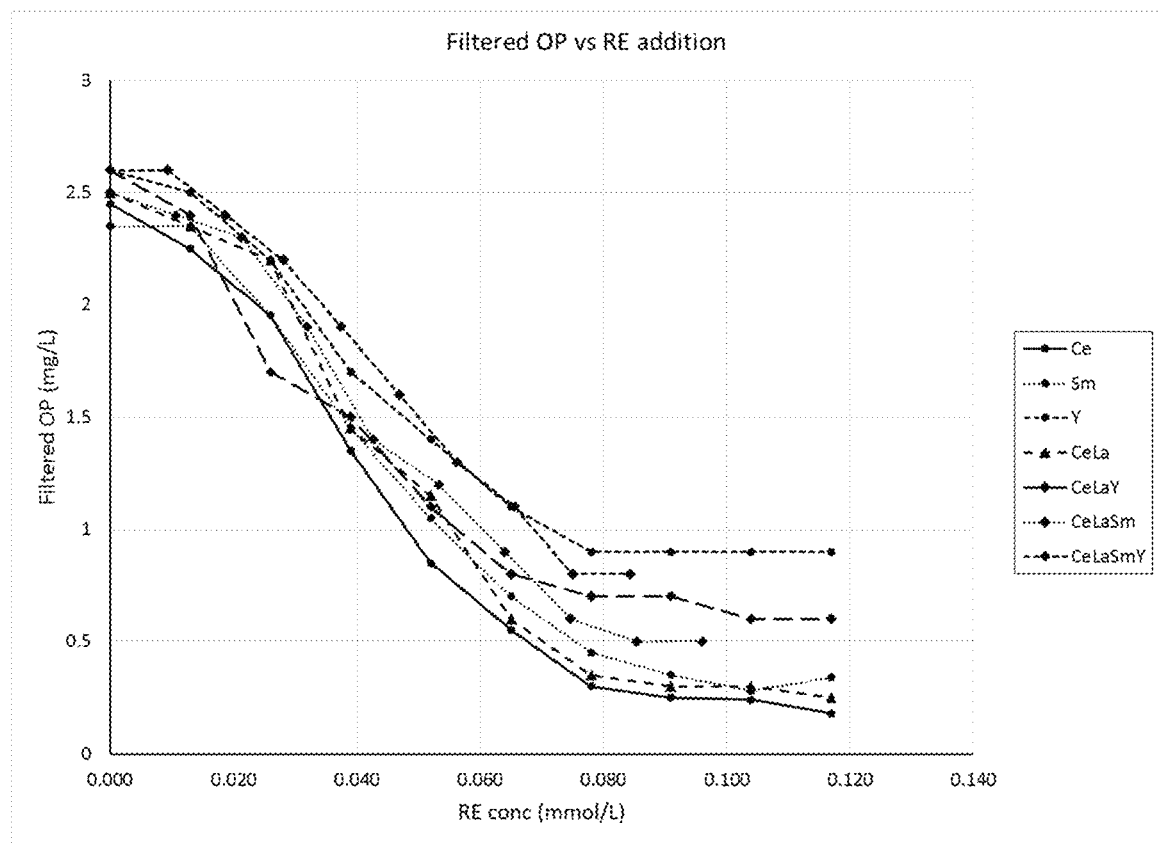
FIG. 2I is a graph of Ortho-phosphate (OP) as measured and plotted vs. the RE concentration in mmol/L of Example 1A.
Figure 2J:
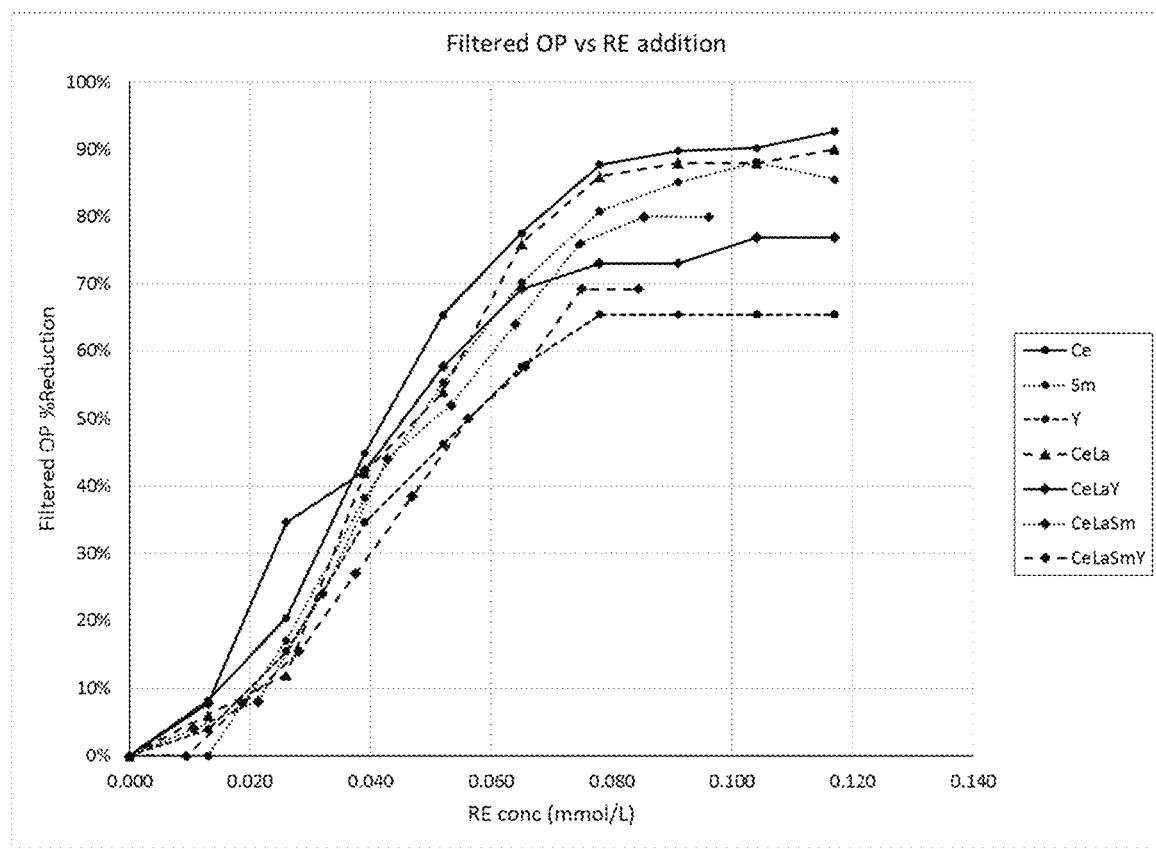
FIG. 2J is a graph of the % reduction in OP as calculated and plotted vs the RE concentration in mmol/L of Example 1A.

Unfiltered samples of the supernatant from each dosing were measured for Ortho-phosphate (OP) and this was plotted vs. the RE concentration in mmol/L, as shown in FIG. 2I. The % reduction in OP was also calculated and plotted, as shown in FIG. 2J.

Example 1B: Single Dose Single RE (0.241 Mmol/L RE Dose)

A RECl$_3$ solution was made at the concentrations outlined in the table below via the method outlined above. 4 gal of simulated wastewater was made as outlined above and allowed to stir for at least 15 min. 10 Imhoff cones were set up and 8 were charged with the appropriate amount of a RECl$_3$ solution such that the final concentration was 0.241 mmol/L RE (except for the CeLa mixture which was 0.225 mmol/L). Two cones were left as control samples. The order of the 15 RE used and the placement of the 2 controls was randomized. The 10 Imhoff cones were then loaded with simulated wastewater from the discharge valve. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand (COD), and biochemical oxygen demand (BOD). This process was repeated with the remaining RE solutions. The 2 controls in each run were averaged and compared to the results within each run.

| Rare Earth Chloride | RE Distribution | RE concentration (mol/L) | Volume added (ml) | RE concentration in treated water (mmol/L) |
|---|---|---|---|---|
| YCl$_3$ | ≥99.9% Y | 3.13 | 0.077 | 0.241 |
| LaCl$_3$ | ≥99.9% La | 1.95 | 0.124 | 0.241 |
| CeCl$_3$ | ≥99.9% Ce | 2.43 | 0.099 | 0.241 |
| PrCl$_3$ | ≥99.9% Pr | 1.85 | 0.130 | 0.241 |
| NdCl$_3$ | ≥99.9% Nd | 1.89 | 0.127 | 0.241 |
| SmCl$_3$ | ≥99.9% Sm | 1.47 | 0.164 | 0.241 |
| EuCl$_3$ | ≥99.9% Eu | 1.73 | 0.140 | 0.241 |
| GdCl$_3$ | ≥99.9% Gd | 1.53 | 0.157 | 0.241 |
| TbCl$_3$ | ≥99.9% Tb | 1.94 | 0.124 | 0.241 |
| DyCl$_3$ | ≥99.9% Dy | 1.99 | 0.121 | 0.241 |
| HoCl$_3$ | ≥99.9% Ho | 2.04 | 0.118 | 0.241 |
| ErCl$_3$ | ≥99.9% Er | 1.97 | 0.122 | 0.241 |
| TmCl$_3$ | ≥99.9% Tm | 2.84 | 0.085 | 0.241 |
| YbCl$_3$ | ≥99.9% Yb | 1.99 | 0.121 | 0.241 |
| LuCl$_3$ | ≥99.9% Lu | 1.97 | 0.122 | 0.241 |
| (CeLa)Cl$_3$ | 66.67% Ce, 33.33% La | 2.25 | 0.100 | 0.225 |

Run 1

| RECl$_3$ | Settable solids (ml/L) | Turbidity (FAU) | Filtered OP (mg/L) | TP (mg/L) | COD (mg/L) | BOD (mg/L) |
|---|---|---|---|---|---|---|
| Control | 5.5 | 167 | 2.3 | 3.9 | 550 | 316 |
| EuCl$_3$ | 7.5 | 141 | 0.1 | 3.3 | 450 | 175 |
| TbCl$_3$ | 6.5 | 149 | 0.14 | 3.6 | 480 | 190 |
| NdCl$_3$ | 7.5 | 131 | 0.08 | 3.3 | 430 | 259 |
| DyCl$_3$ | 6.0 | 155 | 0.2 | 3.5 | 490 | 224 |
| PrCl$_3$ | 7.5 | 130 | 0.06 | 3.2 | 450 | 194 |
| Control | 5.0 | 173 | 2.3 | 3.6 | 540 | 270 |
| CeCl$_3$ | 5.5 | 145 | 0.06 | 3.3 | 410 | 233 |
| SmCl$_3$ | 6.0 | 152 | 0.1 | 3.4 | 460 | 204 |
| GdCl$_3$ | 6.5 | 140 | 0.1 | 2.9 | 430 | 197 |

Run 2

| RECl$_3$ | Settable solids (ml/L) | Turbidity (FAU) | Filtered OP (mg/L) | TP (mg/L) | COD (mg/L) | BOD (mg/L) |
|---|---|---|---|---|---|---|
| ErCl$_3$ | 6.0 | 155 | 0.14 | 3.1 | 480 | 218 |
| Control | 5.0 | 168 | 2.2 | 3.4 | 510 | 286 |
| Control | 5.0 | 169 | 2.2 | 3.5 | 530 | 247 |
| LuCl$_3$ | 5.0 | 156 | 0.2 | 3.4 | 490 | 247 |
| LaCl$_3$ | 6.5 | 122 | 0 | 3.1 | 420 | 202 |
| HoCl$_3$ | 5.0 | 160 | 0.26 | 3.4 | 480 | 191 |
| (CeLa)Cl$_3$ | 5.5 | 141 | 0.04 | 3.3 | 440 | 224 |
| TmCl$_3$ | 5.0 | 166 | 0.12 | 3.3 | 470 | 180 |
| YCl$_3$ | 5.0 | 154 | 0.08 | 3.4 | 470 | 189 |
| YbCl$_3$ | 5.0 | 153 | 0.16 | 3.3 | 470 | 182 |

Difference from Control (Average of Controls−Dose Value)

| RECl$_3$ | Settable solids (ml/L) | Turbidity (FAU) | Filtered OP (mg/L) | TP (mg/L) | COD (mg/L) | BOD (mg/L) |
|---|---|---|---|---|---|---|
| YCl$_3$ | 0 | 14.5 | 2.12 | 0.05 | 50 | 77.5 |
| LaCl$_3$ | −1.5 | 46.5 | 2.2 | 0.35 | 100 | 64.5 |
| CeCl$_3$ | −0.25 | 25 | 2.24 | 0.45 | 135 | 60 |
| PrCl$_3$ | −2.25 | 40 | 2.24 | 0.55 | 95 | 99 |
| NdCl$_3$ | −2.25 | 39 | 2.22 | 0.45 | 115 | 34 |
| SmCl$_3$ | −0.75 | 18 | 2.2 | 0.35 | 85 | 89 |
| EuCl$_3$ | −2.25 | 29 | 2.2 | 0.45 | 95 | 118 |
| GdCl$_3$ | −1.25 | 30 | 2.2 | 0.85 | 115 | 96 |
| TbCl$_3$ | −1.25 | 21 | 2.16 | 0.15 | 65 | 103 |
| DyCl$_3$ | −0.75 | 15 | 2.1 | 0.25 | 55 | 69 |
| HoCl$_3$ | 0 | 8.5 | 1.94 | 0.05 | 40 | 75.5 |

-continued

| RECl$_3$ | Settlable solids (ml/L) | Turbidity (FAU) | Filtered OP (mg/L) | TP (mg/L) | COD (mg/L) | BOD (mg/L) |
|---|---|---|---|---|---|---|
| ErCl$_3$ | −1 | 13.5 | 2.06 | 0.35 | 40 | 48.5 |
| TmCl$_3$ | 0 | 2.5 | 2.08 | 0.15 | 50 | 86.5 |
| YbCl$_3$ | 0 | 15.5 | 2.04 | 0.15 | 50 | 84.5 |
| LuCl$_3$ | 0 | 12.5 | 2 | 0.05 | 30 | 19.5 |
| (CeLa)Cl$_3$ | −0.5 | 27.5 | 2.16 | 0.15 | 80 | 42.5 |

% Reduction from Control

| RECl$_3$ | Settlable solids (ml/L) | Turbidity (FAU) | Filtered OP (mg/L) | TP (mg/L) | COD (mg/L) | BOD (mg/L) |
|---|---|---|---|---|---|---|
| YCl$_3$ | 0% | 9% | 96% | 1% | 10% | 29% |
| LaCl$_3$ | −30% | 28% | 100% | 10% | 19% | 24% |
| CeCl$_3$ | −5% | 15% | 97% | 12% | 25% | 20% |
| PrCl$_3$ | −43% | 24% | 97% | 15% | 17% | 34% |
| NdCl$_3$ | −43% | 23% | 97% | 12% | 21% | 12% |
| SmCl$_3$ | −14% | 11% | 96% | 9% | 16% | 30% |
| EuCl$_3$ | −43% | 17% | 96% | 12% | 17% | 40% |
| GdCl$_3$ | −24% | 18% | 96% | 23% | 21% | 33% |
| TbCl$_3$ | −24% | 12% | 94% | 4% | 12% | 35% |
| DyCl3 | −14% | 9% | 91% | 7% | 10% | 24% |
| HoCl$_3$ | 0% | 5% | 88% | 1% | 8% | 28% |
| ErCl$_3$ | −20% | 8% | 94% | 10% | 8% | 18% |
| TmCl$_3$ | 0% | 1% | 95% | 4% | 10% | 32% |
| YbCl$_3$ | 0% | 9% | 93% | 4% | 10% | 32% |
| LuCl$_3$ | 0% | 7% | 91% | 1% | 6% | 7% |
| (CeLa)Cl$_3$ | −10% | 16% | 98% | 4% | 15% | 16% |

Example 1C: Single Dose Multiple RE (0.241 Mmol/L RE Dose)

Mixtures of RECl$_3$ solutions were made with the RE elements and at the concentrations outlined in the table below. Each solution was made with equal molar amounts of 8 rare earths, thus each RE in the solution was 12.5% of the total RE content. These mixtures were chosen based on a 15 parameter Design of Experiment (DOE) where each parameter is the presence of an individual RE. A 16 experiment matrix was generated where 1 experiment was no addition of RE and the other 15 experiments had 8 of the 15 RE elements present in equal molar concentrations. The 8 RE for each experiment were determined by the DOE matrix. The matrix is provided below.

4 gal of simulated wastewater was made as outlined above and allowed to stir for at least 15 min. 10 Imhoff cones were set up and 8 were charged with the appropriate amount of a RECl$_3$ solution such that the final concentration would be 0.241 mmol/L RE. Two cones were left as control samples. The order of the 15 RE used and the placement of the 2 controls was randomized. The 10 Imhoff cones were then loaded with simulated wastewater from the discharge valve. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand (COD), and biochemical oxygen demand (BOD). This process was repeated with the remaining RE solutions. The 2 controls in each run were averaged and compared to the results within each run.

| Rare Earth Chloride Mix | RE Distribution | RE concentration (mol/L) | Volume added (ml) | RE concentration in treated water (mmol/L) |
|---|---|---|---|---|
| CeSmEuTbHoErTmYb | 12.5% Each | 1.98 | 0.122 | 0.241 |
| YCeNdSmEuGdErLu | 12.5% Each | 1.91 | 0.126 | 0.241 |
| LaNdSmGdDyHoErTm | 12.5% Each | 1.89 | 0.127 | 0.241 |
| YLaSmTbDyErYbLu | 12.5% Each | 1.97 | 0.122 | 0.241 |
| YCePrNdSmDyTmYb | 12.5% Each | 2.08 | 0.116 | 0.241 |
| YLaPrSmEuGdTbTm | 12.5% Each | 1.92 | 0.125 | 0.241 |
| YLaCeEuDyHoTmLu | 12.5% Each | 2.17 | 0.111 | 0.241 |
| YPrNdEuTbDyHoEr | 12.5% Each | 2.01 | 0.120 | 0.241 |
| LaCePrNdTbErTmLu | 12.5% Each | 2.06 | 0.117 | 0.241 |
| YLaCePrGdHoErYb | 12.5% Each | 2.03 | 0.119 | 0.241 |
| LaPrNdSmEuHoYbLu | 12.5% Each | 1.84 | 0.131 | 0.241 |
| LaCeNdEuGdTbDyYb | 12.5% Each | 1.90 | 0.127 | 0.241 |
| PrEuGdDyErTmYbLu | 12.5% Each | 1.93 | 0.125 | 0.241 |
| CePrSmGdTbDyHoLu | 12.5% Each | 1.86 | 0.130 | 0.241 |
| None | — | — | — | — |
| YNdGdTbHoTmYbLu | 12.5% Each | 2.07 | 0.117 | 0.241 |

| Exp. | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| 1 | 1 | 0 | 0 | 0 | 1 | 0 | 0 | 1 | 1 | 0 | 1 | 0 | 1 | 1 | 1 |
| 2 | 1 | 1 | 0 | 0 | 0 | 1 | 0 | 0 | 1 | 1 | 0 | 1 | 0 | 1 | 1 |
| 3 | 1 | 1 | 1 | 0 | 0 | 0 | 1 | 0 | 0 | 1 | 1 | 0 | 1 | 0 | 1 |
| 4 | 1 | 1 | 1 | 1 | 0 | 0 | 0 | 1 | 0 | 0 | 1 | 1 | 0 | 1 | 0 |
| 5 | 0 | 1 | 1 | 1 | 1 | 0 | 0 | 0 | 1 | 0 | 0 | 1 | 1 | 0 | 1 |
| 6 | 1 | 0 | 1 | 1 | 1 | 1 | 0 | 0 | 0 | 1 | 0 | 0 | 1 | 1 | 0 |
| 7 | 0 | 1 | 0 | 1 | 1 | 1 | 1 | 0 | 0 | 0 | 1 | 0 | 0 | 1 | 1 |
| 8 | 1 | 0 | 1 | 0 | 1 | 1 | 1 | 1 | 0 | 0 | 0 | 1 | 0 | 0 | 1 |
| 9 | 1 | 1 | 0 | 1 | 0 | 1 | 1 | 1 | 1 | 0 | 0 | 0 | 1 | 0 | 0 |
| 10 | 0 | 1 | 1 | 0 | 1 | 0 | 1 | 1 | 1 | 1 | 0 | 0 | 0 | 1 | 0 |
| 11 | 0 | 0 | 1 | 1 | 0 | 1 | 0 | 1 | 1 | 1 | 1 | 0 | 0 | 0 | 1 |
| 12 | 1 | 0 | 0 | 1 | 1 | 0 | 1 | 0 | 1 | 1 | 1 | 1 | 0 | 0 | 0 |
| 13 | 0 | 1 | 0 | 0 | 1 | 1 | 0 | 1 | 0 | 1 | 1 | 1 | 1 | 0 | 0 |
| 14 | 0 | 0 | 1 | 0 | 0 | 1 | 1 | 0 | 1 | 0 | 1 | 1 | 1 | 1 | 0 |
| 15 | 0 | 0 | 0 | 1 | 0 | 0 | 1 | 1 | 0 | 1 | 0 | 1 | 1 | 1 | 1 |
| 16 | 0 | 0 | 0 | 0 | 0 | 0 | 0 | 0 | 0 | 0 | 0 | 0 | 0 | 0 | 0 |

Run 1

| RECl$_3$ | Settlable solids (ml/L) | Turbidity (FAU) | Filtered OP (mg/L) | TP (mg/L) | COD (mg/L) | BOD (mg/L) |
| --- | --- | --- | --- | --- | --- | --- |
| YLaCeEuDyHoTmLu | 7 | 155 | 0.24 | 3.2 | 510 | 198 |
| CeSmEuTbHoErTmYb | 7.5 | 153 | 0.26 | 3.2 | 480 | 215 |
| YLaPrSmEuGdTbTm | 6.5 | 152 | 0.24 | 3.1 | 470 | 248 |
| Control | 4.5 | 171 | 2.7 | 3.4 | 520 | 269 |
| LaNdSmGdDyHoErTm | 7 | 156 | 0.26 | 3.2 | 490 | 192 |
| YCeNdSmEuGdErLu | 7 | 136 | 0.16 | 3.1 | 450 | 159 |
| YCePrNdSmDyTmYb | 6.5 | 147 | 0.18 | 3.2 | 450 | 183 |
| YPrNdEuTbDyHoEr | 7 | 153 | 0.18 | 3.1 | 490 | 156 |
| YLaSmTbDyErYbLu | 6 | 160 | 0.22 | 3.3 | 480 | 178 |
| Control | 4.5 | 171 | 2.8 | 3.3 | 530 | 250 |

Run 2

| RECl$_3$ | Settlable solids (ml/L) | Turbidity (FAU) | Filtered OP (mg/L) | TP (mg/L) | COD (mg/L) | BOD (mg/L) |
| --- | --- | --- | --- | --- | --- | --- |
| PrEuGdDyErTmYbLu | 6.5 | 150 | 0.16 | 3.3 | 480 | 177 |
| LaCePrNdTbErTmLu | 5.5 | 154 | 0.16 | 3.3 | 500 | 191 |
| YNdGdTbHoTmYbLu | 6 | 158 | 0.26 | 3.2 | 500 | 206 |
| LaCeNdEuGdTbDyYb | 6.5 | 145 | 0.1 | 3.1 | 450 | 194 |
| Control | 4.5 | 164 | 2.2 | 3.4 | 510 | 261 |
| CePrSmGdTbDyHoLu | 6 | 139 | 0.12 | 3.2 | 430 | 158 |
| Control | 4.75 | 166 | 2.3 | 3.4 | 530 | 268 |

Run 3%

| RECl$_3$ | Settlable solids (ml/L) | Turbidity (FAU) | Filtered OP (mg/L) | TP (mg/L) | COD (mg/L) | BOD (mg/L) |
| --- | --- | --- | --- | --- | --- | --- |
| Control | 5 | 161 | 2.5 | 4.2 | 530 | 264 |
| None | 5 | 168 | 2.5 | 3.4 | 500 | 351 |
| YLaCePrGdHoErYb | 6.5 | 125 | 0.1 | 3 | 430 | 180 |
| LaPrNdSmEuHoYbLu | 6 | 130 | 0.06 | 3.2 | 420 | 134 |
| Control | 5 | 178 | 2.6 | 3.4 | 500 | 316 |

% Reduction from Control

| RECl$_3$ | Settlable solids (ml/L) | Turbidity (FAU) | Filtered OP (mg/L) | TP (mg/L) | COD (mg/L) | BOD (mg/L) |
| --- | --- | --- | --- | --- | --- | --- |
| CeSmEuTbHoErTmYb | −67% | 11% | 91% | 4% | 9% | 17% |
| YCeNdSmEuGdErLu | −56% | 20% | 94% | 7% | 14% | 39% |
| LaNdSmGdDyHoErTm | −56% | 9% | 91% | 4% | 7% | 26% |
| YLaSmTbDyErYbLu | −33% | 6% | 92% | 1% | 9% | 31% |
| YCePrNdSmDyTmYb | −44% | 14% | 93% | 4% | 14% | 29% |
| YLaPrSmEuGdTbTm | −44% | 11% | 91% | 7% | 10% | 4% |
| YLaCeEuDyHoTmLu | −56% | 9% | 91% | 4% | 3% | 24% |
| YPrNdEuTbDyHoEr | −56% | 11% | 93% | 7% | 7% | 40% |
| LaCePrNdTbErTmLu | −19% | 7% | 93% | 3% | 4% | 28% |
| YLaCePrGdHoErYb | −30% | 26% | 96% | 21% | 17% | 38% |
| LaPrNdSmEuHoYbLu | −20% | 23% | 98% | 16% | 18% | 54% |
| LaCeNdEuGdTbDyYb | −41% | 12% | 96% | 9% | 13% | 27% |
| PrEuGdDyErTmYbLu | −41% | 9% | 93% | 4% | 8% | 33% |
| CePrSmGdTbDyHoLu | −30% | 16% | 95% | 6% | 17% | 40% |
| None | 0% | 1% | 2% | 11% | 3% | −21% |
| YNdGdTbHoTmYbLu | −30% | 4% | 88% | 6% | 4% | 22% |

An analysis of this DOE data confirms the results seen in the individual rare earth dosing experiments in that each rare earth is capable of removing turbidity, OP, TP, COD, and BOD and that the lighter REs may perform better than the heavy REs.

Example 1D: Single Dose Single RE (0.3 Mmol/L RE Dose)

A $RECl_3$ solution was made at the concentrations outlined in the table below. 3 gal of simulated wastewater made as outlined above and allowed to stir for at least 15 min. A 3×1 L samples were collected in Imhoff cones from the discharge valve as a control. Rare earth chloride was then dosed into the simulated wastewater solution such that the final RE concentration in the mixture was 0.3 mmol/L. The mixture was allowed to stir for 30 min before 3×1 L samples were collected as before. Each 1 L sample was allowed to settle according to the standard Settable Solids measurement procedure. After 1 hr the volume of settable solids was recorded. The average reading from the 3 Imhoff cones is reported. Equal volumes from each set of 3 cones was collected and mixed for both the filtered and unfiltered samples of the supernatant. Filtered samples were filtered through a 0.45 micron syringe filter and analyzed for orthophosphorus. Unfiltered samples were analyzed for turbidity, total phosphorus, total organic carbon, chemical oxygen demand, and biochemical oxygen demand.

| Rare Earth Chloride | RE Distribution | RE concentration (mol/L) | Volume added (ml) | RE concentration in treated water (mmol/L) |
|---|---|---|---|---|
| $YCl_3$ | ≥99.9% Y | 3.13 | 0.077 | 0.3 |
| $LaCl_3$ | ≥99.9% La | 1.95 | 0.124 | 0.3 |
| $CeCl_3$ | ≥99.9% Ce | 2.43 | 0.099 | 0.3 |
| $PrCl_3$ | ≥99.9% Pr | 1.85 | 0.130 | 0.3 |
| $NdCl_3$ | ≥99.9% Nd | 1.89 | 0.127 | 0.3 |
| $SmCl_3$ | ≥99.9% Sm | 1.47 | 0.164 | 0.3 |
| $EuCl_3$ | ≥99.9% Eu | 1.73 | 0.140 | 0.3 |
| $GdCl_3$ | ≥99.9% Gd | 1.53 | 0.157 | 0.3 |
| $TbCl_3$ | ≥99.9% Tb | 1.94 | 0.124 | 0.3 |
| $DyCl_3$ | ≥99.9% Dy | 1.99 | 0.121 | 0.3 |
| $HoCl_3$ | ≥99.9% Ho | 2.04 | 0.118 | 0.3 |
| $ErCl_3$ | ≥99.9% Er | 1.97 | 0.122 | 0.3 |
| $TmCl_3$ | ≥99.9% Tm | 2.84 | 0.085 | 0.3 |
| $YbCl_3$ | ≥99.9% Yb | 1.99 | 0.121 | 0.3 |
| $LuCl_3$ | ≥99.9% Lu | 1.97 | 0.122 | 0.3 |

Data

| $RECl_3$ | Settable solids (ml/L) | Turbidity (FAU) | Filtered OP (mg/L) | TP (mg/L) | TOC (mg/L) | COD (mg/L) | BOD (mg/L) |
|---|---|---|---|---|---|---|---|
| Control | 5.2 | 196 | 1.9 | 3.9 | 180 | 470 | 199 |
| $YCl_3$ | 7.0 | 147 | 0.2 | 3.4 | 146 | 420 | 106 |
| Control | 4.8 | 164 | 3 | 3.6 | 182 | 510 | 263 |
| $LaCl_3$ | 7 | 94 | 0.16 | 3 | 146 | 380 | 175 |
| Control | 4.8 | 160 | 2.7 | 3.6 | 186 | 490 | 324 |
| $CeCl_3$ | 6.5 | 85 | 0.14 | 3.1 | 144 | 360 | 150 |
| Control | 4.5 | 158 | 2.7 | 3.9 | 178 | 530 | 309 |
| $PrCl_3$ | 6.2 | 108 | 0.18 | 3.3 | 148 | 420 | 149 |
| Control | 4.8 | 161 | 2.5 | 3.3 | 186 | 480 | 284 |
| $NdCl_3$ | 6.7 | 95 | 0.1 | 2.8 | 148 | 400 | 155 |
| Control | 4.7 | 168 | 2.9 | 4 | 178 | 510 | 339 |
| $SmCl_3$ | 5.7 | 121 | 0.22 | 3.4 | 158 | 470 | 161 |
| Control | 4.5 | 192 | 2.0 | 3.8 | 162 | 480 | 235 |
| $EuCl_3$ | 6.8 | 142 | 0.14 | 3.2 | 130 | 370 | 146 |
| Control | 4.7 | 162 | 2.9 | 3.7 | 178 | 520 | 334 |
| $GdCl_3$ | 5.8 | 117 | 0.24 | 3.3 | 154 | 400 | 150 |
| Control | 4.7 | 187 | 1.9 | 3.8 | 152 | 470 | 218 |
| $TbCl_3$ | 6.7 | 142 | 0.16 | 3.2 | 128 | 380 | 133 |
| Control | 4.8 | 153 | 2.9 | 3.6 | 170 | 530 | 344 |
| $DyCl_3$ | 5.5 | 121 | 0.32 | 3.2 | 156 | 440 | 153 |
| Control | 4.5 | 159 | 3 | 4 | 180 | 530 | 287 |
| $HoCl_3$ | 5.5 | 137 | 0.5 | 3.2 | 176 | 460 | 206 |
| Control | 5.0 | 178 | 3 | 3.8 | 190 | 590 | 283 |
| $ErCl_3$ | 5.8 | 148 | 0.52 | 3.7 | 182 | 500 | 196 |
| Control | 4.7 | 159 | 2.6 | 3.9 | 182 | 460 | 264 |
| $TmCl_3$ | 5.5 | 122 | 0.34 | 3.5 | 166 | 420 | 174 |
| Control | 4.8 | 168 | 2.6 | 3.5 | 180 | 550 | 258 |
| $YbCl_3$ | 5.5 | 137 | 0.44 | 3.3 | 174 | 450 | 143 |
| Control | 4.8 | 165 | 3 | 3.5 | 178 | 550 | 271 |
| $LuCl_3$ | 5.5 | 140 | 0.58 | 3.3 | 174 | 480 | 134 |

Difference from Control

| $RECl_3$ | Settable solids (ml/L) | Turbidity (FAU) | Filtered OP (mg/L) | TP (mg/L) | TOC (mg/L) | COD (mg/L) | BOD (mg/L) |
|---|---|---|---|---|---|---|---|
| $YCl_3$ | −1.8 | 49 | 1.7 | 0.5 | 34 | 50 | 93 |
| $LaCl_3$ | −2.2 | 70 | 2.8 | 0.6 | 36 | 130 | 88 |
| $CeCl_3$ | −1.7 | 75 | 2.6 | 0.5 | 42 | 130 | 174 |
| $PrCl_3$ | −1.7 | 50 | 2.5 | 0.6 | 30 | 110 | 160 |
| $NdCl_3$ | −1.8 | 66 | 2.4 | 0.5 | 38 | 80 | 129 |

-continued

| RECl$_3$ | Settable solids (ml/L) | Turbidity (FAU) | Filtered OP (mg/L) | TP (mg/L) | TOC (mg/L) | COD (mg/L) | BOD (mg/L) |
|---|---|---|---|---|---|---|---|
| SmCl$_3$ | −1.0 | 47 | 2.7 | 0.6 | 20 | 40 | 178 |
| EuCl$_3$ | −2.3 | 50 | 1.9 | 0.6 | 32 | 110 | 89 |
| GdCl$_3$ | −1.2 | 45 | 2.7 | 0.4 | 24 | 120 | 184 |
| TbCl$_3$ | −2.0 | 45 | 1.7 | 0.6 | 24 | 90 | 85 |
| DyCl$_3$ | −0.7 | 32 | 2.6 | 0.4 | 14 | 90 | 191 |
| HoCl$_3$ | −1.0 | 22 | 2.5 | 0.8 | 4 | 70 | 81 |
| ErCl$_3$ | −0.8 | 30 | 2.5 | 0.1 | 8 | 90 | 87 |
| TmCl$_3$ | −0.8 | 37 | 2.3 | 0.4 | 16 | 40 | 90 |
| YbCl$_3$ | −0.7 | 31 | 2.2 | 0.2 | 6 | 100 | 115 |
| LuCl$_3$ | −0.7 | 25 | 2.4 | 0.2 | 4 | 70 | 137 |

% Reduction from Control

| RECl$_3$ | Settable solids (ml/L) | Turbidity (FAU) | Filtered OP (mg/L) | TP (mg/L) | TOC (mg/L) | COD (mg/L) | BOD (mg/L) |
|---|---|---|---|---|---|---|---|
| YCl$_3$ | −35% | 25% | 89% | 13% | 19% | 11% | 47% |
| LaCl$_3$ | −45% | 43% | 95% | 17% | 20% | 25% | 33% |
| CeCl$_3$ | −34% | 47% | 95% | 14% | 23% | 27% | 54% |
| PrCl$_3$ | −37% | 32% | 93% | 15% | 17% | 21% | 52% |
| NdCl$_3$ | −38% | 41% | 96% | 15% | 20% | 17% | 45% |
| SmCl$_3$ | −21% | 28% | 92% | 15% | 11% | 8% | 53% |
| EuCl$_3$ | −52% | 26% | 93% | 16% | 20% | 23% | 38% |
| GdCl$_3$ | −25% | 28% | 92% | 11% | 13% | 23% | 55% |
| TbCl$_3$ | −43% | 24% | 92% | 16% | 16% | 19% | 39% |
| DyCl$_3$ | −14% | 21% | 89% | 11% | 8% | 17% | 56% |
| HoCl$_3$ | −22% | 14% | 83% | 20% | 2% | 13% | 28% |
| ErCl$_3$ | −17% | 17% | 83% | 3% | 4% | 15% | 31% |
| TmCl$_3$ | −18% | 23% | 87% | 10% | 9% | 9% | 34% |
| YbCl$_3$ | −14% | 18% | 83% | 6% | 3% | 18% | 45% |
| LuCl$_3$ | −14% | 15% | 81% | 6% | 2% | 13% | 51% |

Example 1E: Multiple Doses (0.116 Mmol/L RE Dose)

A RECl$_3$ solution was made at the concentrations outlined in the table below. 3 gal of simulated wastewater made as outlined above and allowed to stir for at least 15 min. A 3×1 L samples were collected in Imhoff cones from the discharge valve as a control. Rare earth chloride was then dosed into the simulated wastewater solution in 6 increments, 1 dose every 5 min, such that the final RE concentration in the mixture was 0.116 mmol/L. The mixture was allowed to stir for at least 5 min before 3×1 L samples were collected as before. For one experiment, CeCl$_3$ solution was dosed in a single increment to reach the 0.116 mmol/L concentration and allowed to stir for 30 min. The pH of the mixture was recorded when each sample was taken. Each 1 L sample was allowed to settle according to the standard Settable Solids measurement procedure. After 1 hr the volume of settable solids was recorded. The average reading from the 3 Imhoff cones is reported. Equal volumes from each set of 3 cones was collected and mixed for both the filtered and unfiltered samples of the supernatant. Filtered samples were filtered through a 0.45 micron syringe filter and analyzed for orthophosphorus. Unfiltered samples were analyzed for turbidity, total phosphorus, total organic carbon, chemical oxygen demand, biochemical oxygen demand, and total suspended solids.

| Rare Earth Chloride | RE Distribution | RE concentration (mol/L) |
|---|---|---|
| CeCl$_3$ | ≥99.9% Ce | 2.43 |
| (CeLa)Cl$_3$ | 66.6% Ce, 33.3% La | 2.11 |
| (CeLaY)Cl$_3$ | 33.3% Ce, 16.6% La, 50% Y | 2.61 |
| (CeLaSm)Cl$_3$ | 33.3% Ce, 16.6% La, 50% Sm | 1.77 |
| (CeLaSmY)Cl$_3$ | 33.3% Ce, 16.6% La, 25% Sm, 25% Y | 2.11 |

Data

| RECl$_3$ | Settable solids (ml/L) | Turbidity (FAU) | Filtered OP (mg/L) | TP (mg/L) | TOC (mg/L) | COD (mg/L) | BOD (mg/L) | TSS (mg/L) |
|---|---|---|---|---|---|---|---|---|
| Control | 5.5 | 195 | 2.2 | 4 | 166 | 490 | 256 | 161 |
| Single dose CeCl$_3$ | 8.7 | 77 | 0.3 | 2.4 | 144 | 340 | 165 | 123 |
| Control | 5.0 | 180 | 2.2 | 3.6 | 160 | 470 | 217 | 136 |

-continued

| RECl$_3$ | Settleable solids (ml/L) | Turbidity (FAU) | Filtered OP (mg/L) | TP (mg/L) | TOC (mg/L) | COD (mg/L) | BOD (mg/L) | TSS (mg/L) |
|---|---|---|---|---|---|---|---|---|
| Multi-dose CeCl$_3$ | 9.0 | 37 | 0.2 | 1.6 | 94 | 290 | 102 | 53 |
| Control | 5.0 | 183 | 2.1 | 3.7 | 166 | 470 | 229 | 121 |
| Multi-dose (CeLa)Cl$_3$ | 8.5 | 43 | 0.24 | 2 | 92 | 300 | 152 | 48 |
| Control | 4.8 | 179 | 2.6 | 4.1 | 148 | 520 | 246 | 145 |
| Multi-dose (CeLaY)Cl$_3$ | 7.2 | 100 | 0.38 | 3 | 118 | 380 | 195 | 92 |
| Control | 5.0 | 191 | 2.4 | 3.6 | 162 | 480 | 240 | 127 |
| Multi-dose (CeLaSm)Cl$_3$ | 7.7 | 72 | 0.2 | 2.5 | 106 | 330 | 171 | 50 |
| Control | 4.8 | 177 | 2.4 | 3.7 | 148 | 500 | 260 | 130 |
| Multi-dose (CeLaSmY)Cl$_3$ | 7.7 | 80 | 0.32 | 3.4 | 110 | 360 | 178 | 126 |

Difference from Control

| RECl$_3$ | Settleable solids (ml/L) | Turbidity (FAU) | Filtered OP (mg/L) | TP (mg/L) | TOC (mg/L) | COD (mg/L) | BOD (mg/L) | TSS (mg/L) |
|---|---|---|---|---|---|---|---|---|
| Single dose CeCl$_3$ | −3.2 | 118 | 1.9 | 1.6 | 22 | 150 | 91 | 38 |
| Multi-dose CeCl$_3$ | −4.0 | 143 | 2.0 | 2.0 | 66 | 180 | 115 | 83 |
| Multi-dose (CeLa)Cl$_3$ | −3.5 | 140 | 1.9 | 1.7 | 74 | 170 | 77 | 73 |
| Multi-dose (CeLaY)Cl$_3$ | −2.7 | 119 | 2.2 | 1.1 | 56 | 150 | 69 | 77 |
| Multi-dose (CeLaSm)Cl$_3$ | −2.3 | 79 | 2.2 | 1.1 | 30 | 140 | 51 | 53 |
| Multi-dose (CeLaSmY)Cl$_3$ | −2.8 | 97 | 2.1 | 0.3 | 38 | 140 | 82 | 4 |

% Reduction

| RECl$_3$ | Settleable solids (ml/L) | Turbidity (FAU) | Filtered OP (mg/L) | TP (mg/L) | TOC (mg/L) | COD (mg/L) | BOD (mg/L) | TSS (mg/L) |
|---|---|---|---|---|---|---|---|---|
| Single dose CeCl$_3$ | −58% | 61% | 86% | 40% | 13% | 31% | 36% | 24% |
| Multi-dose CeCl$_3$ | −80% | 79% | 91% | 56% | 41% | 38% | 53% | 61% |
| Multi-dose (CeLa)Cl$_3$ | −70% | 77% | 89% | 46% | 45% | 36% | 34% | 60% |
| Multi-dose (CeLaY)Cl$_3$ | −53% | 62% | 92% | 31% | 35% | 31% | 29% | 61% |
| Multi-dose (CeLaSm)Cl$_3$ | −48% | 44% | 85% | 27% | 20% | 27% | 21% | 37% |
| Multi-dose (CeLaSmY)Cl$_3$ | −59% | 55% | 87% | 8% | 26% | 28% | 32% | 3% |

Analytical Testing Methods Used

Settleable Solids: 1 liter of influent was place in an Imhoff cone and allowed to settle for 45 min. The supernatant was gently stirred to loosen solids from the wall. Settling continued for an addition 15 min. The volume of solids was then recorded.
Turbidity: Hach Method 8237
Total Suspended Solids (TSS): SM 2540 D-97
Total Phosphorus (TP): Hach Method 8180
Filtered Orthophosphate (FOP): 10 ml samples were filtered through a 0.45 micron syringe filter.
Resulting solution was analyzed by Hach Method 8048
Chemical Oxygen Demand (COD): Hach Method 8000
Biochemical Oxygen Demand (BOD): SM 5210 B-01 Total Organic Carbon (TOC): Hach Method 10173

Conclusion:

A simulated wastewater was made as outlined above and dosed with different amounts and compositions of RECl$_3$ solutions. Addition of RE resulted in an overall reduction in Turbidity, OP, TP, TOC, COD, BOD, and TSS. Small doses of RE resulted in a decrease in the settlable solids, while larger doses resulted in an increase in settlable solids. This works for all RE but appears to provide better results for the lighter REs. Also, it appears that dosing the RE incrementally yields a greater difference between the control and the final sample.

These experiments indicate that how fast the RE is added may change the results. Thus, in an embodiment in which a plant is running continuously, multiple dose points may be advantageous. In a plant that is running batch, a slower dose rate may be more favorable.

Example 2: Experimental Data Generated from Simulated Wastewater: Comparison of RE, Ferric, and Alum Solution Synthesis of Rare Earth Chloride Solution:

Individual $RECl_3$ solutions and mixtures of $RECl_3$ solutions were prepared as described above in Example 1.

Simulated Wastewater:

Simulated wastewater was created as described above in Example 1.

Results and Experimental:

Single Dose Single RE, 0.243 Mmol/L RE Dose

A $RECl_3$ solution was made at the concentrations outlined in the table below via the method outlined above. 4 gal of simulated wastewater was made and allowed to stir for at least 15 min. 10 Imhoff cones were set up and some were charged with 0.100 ml of $RECl_3$, Ferric, or Alum solution. Two cones were left as control samples. The order of the placement of the 2 controls was randomized. The Imhoff cones were then loaded with simulated wastewater from the discharge valve. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, and chemical oxygen demand (COD). This process was repeated. The 2 controls in each run were averaged and compared to the results within each run.

| Rare Earth Chloride | RE Distribution | RE concentration (mol/L) | Volume added (ml) | RE concentration in treated water (mmol/L) |
|---|---|---|---|---|
| $CeCl_3$ | ≥99.9% Ce | 2.43 | 0.100 | 0.243 |
| $(CeLa)Cl_3$ | 66.67% Ce, 33.33% La | 2.25 | 0.100 | 0.225 |

Ferric solution description: 30% wt/wt $FeCl_3$ water solution, pH<1 commercially available sample Alum solution description: 30% wt/wt $Al_2(SO_4)_3$ water solution commercially available sample Run 1

| $RECl_3$ | Settable solids (ml/L) | Turbidity (FAU) | Filtered OP (mg/L) | TP (mg/L) | COD (mg/L) |
|---|---|---|---|---|---|
| Control | 5 | 176 | 1.55 | 3.3 | 500 |
| $FeCl_3$ | 5.5 | 185 | 0.25 | 3.2 | 470 |
| Alum | 5.5 | 171 | 1.15 | 3.2 | 470 |
| $(CeLa)Cl_3$ | 6 | 176 | ≤0.05 | 3.2 | 440 |
| $CeCl_3$ | 7 | 159 | ≤0.05 | 3 | 330 |
| Control | 5 | 174 | 1.65 | 3.2 | 430 |

Run 1 Difference from Control (Average of Controls−Dose Value)

| $RECl_3$ | Settable solids (ml/L) | Turbidity (FAU) | Filtered OP (mg/L) | TP (mg/L) | COD (mg/L) |
|---|---|---|---|---|---|
| $CeCl_3$ | −2 | 16 | 1.6 | 0.25 | 135 |
| $(CeLa)Cl_3$ | −1 | −1 | 1.6 | 0.05 | 25 |
| $FeCl_3$ | −0.5 | −10 | 1.35 | 0.05 | −5 |
| Alum | −0.5 | 4 | 0.45 | 0.05 | −5 |

Run 1% Reduction from Control

| $RECl_3$ | Settable solids (ml/L) | Turbidity (FAU) | Filtered OP (mg/L) | TP (mg/L) | COD (mg/L) |
|---|---|---|---|---|---|
| $CeCl_3$ | −40% | 9% | ≥97% | 8% | 29% |
| $(CeLa)Cl_3$ | −20% | −1% | ≥97% | 2% | 5% |
| $FeCl_3$ | −10% | −6% | 84% | 2% | −1% |
| Alum | −10% | 2% | 28% | 2% | −1% |

Run 2

| $RECl_3$ | Settable solids (ml/L) | Turbidity (FAU) | Filtered OP (mg/L) | TP (mg/L) | COD (mg/L) |
|---|---|---|---|---|---|
| Control | 4.5 | 172 | 1.65 | 3.3 | 480 |
| $CeCl_3$ | 7.5 | 125 | ≤0.05 | 2.7 | 330 |
| $FeCl_3$ | 6 | 181 | 0.25 | 3.3 | 390 |
| Alum | 5.5 | 165 | 1 | 3.4 | 460 |
| Control | 4.5 | 171 | 1.7 | 3.3 | 460 |

Run 2 Difference from Control (Average of Controls−Dose Value)

| $RECl_3$ | Settable solids (ml/L) | Turbidity (FAU) | Filtered OP (mg/L) | TP (mg/L) | COD (mg/L) |
|---|---|---|---|---|---|
| $CeCl_3$ | −3 | 46.5 | 1.675 | 0.6 | 140 |
| $FeCl_3$ | −1.5 | −9.5 | 1.425 | 0 | 80 |
| Alum | −1 | 6.5 | 0.675 | −0.1 | 10 |

Run 2% Reduction from Control

| $RECl_3$ | Settable solids (ml/L) | Turbidity (FAU) | Filtered OP (mg/L) | TP (mg/L) | COD (mg/L) |
|---|---|---|---|---|---|
| $CeCl_3$ | −67% | 27% | ≥97% | 18% | 31% |
| $FeCl_3$ | −33% | −5% | 85% | 0% | 19% |
| Alum | −22% | 4% | 39% | −3% | 4% |

Analytical Testing methods were as described in Example 1.

Conclusion:

A simulated wastewater was made and dosed with $RECl_3$, Ferric, and Alum solutions. Addition of RE resulted in an overall greater reduction in Turbidity, OP, TP, and COD when compared to Ferric or Alum. Doses of RE also resulted in a greater increase in settable solids when compared to Ferric or Alum.

Example 3: Primary Influent Testing

General Product Synthesis:

RE chloride crystals ($RECl_3 \cdot xH_2O$ where x can range from 0-10 but is typically around 6-8) are dissolved in water.

The amount of crystals vs the amount of water will determine the final concentration. The pH is adjusted to 3-4. The product is then filtered through a 10 micron filter and a sample is tested for multiple impurities, with Fe, Pb, and U being the ones of primary importance.

Mixed RE Solution Used in Primary Influent Testing:

A $(CeLa)Cl_3$ solution was produced using the above general procedure using a $RECl_3$ that was
RE %

| | Weighted average from analysis of crystals in specific lot used | Average of all historical lots | Highest Observed Value | Lowest Observed Value |
|---|---|---|---|---|
| Ce/RE | 63.43% | 63.261% | 70.100% | 59.840% |
| La/RE | 36.56% | 34.729% | 40.160% | 29.900% |
| Pr/RE | 0.008% | 0.005% | 0.008% | 0.001% |
| Nd/RE | 0.005% | 0.004% | 0.005% | 0.001% |
| Sm/RE | <0.005% | <0.001% | | |
| Y/RE | <0.005% | <0.001% | | |

Other RE elements were not measured.

pH=3; Density=1.562 g/ml; $RECl_3$ conc: 41.1%, 642 g/L; REO conc: 437 g/L Impurities (estimated from weighted average of analysis of crystals used to make specific lot): Fe 43.5 mg/L; Pb 3.11 mg/L; U 0.62 mg/L (with other elements not measured)

Single RE Solution Used in Testing:

A $CeCl_3$ solution was produced using the above general procedure using a $RECl_3$ that was RE %: Ce/RE 99.980%; La/RE 0.010%; Pr/RE 0.003%; Nd/RE 0.003%; Sm/RE 0.001%; Y/RE<0.001% (with other RE elements were not measured). pH=3.3; Density=1.57 g/ml; $RECl_3$ conc: 41.3%, 648 g/L; REO conc: 453 g/L.

Ferric Description:

Density 1.45 g/ml; Concentration 40% (wt/wt) $FeCl_3$

Alum Description:

Density 1.33 g/ml; Concentration 50% (wt/wt) $Al_2(SO_4)_3$

Dosing was performed in the primary clarifier and significant improvements in the plant operations were noticed. It appears that the efficiency of subsequent plant operations (like a trickling filter, anaerobic digester, filter press, etc.) can be controlled by controlling the dose in the primary. The following experiments were designed to investigate the function of RE in the primary clarifier.

The influent from a 0.6 MGD wastewater treatment plant in Pennsylvania was collected after the grit screen and prior to the primary clarifier and tested with varying doses of the Mixed RE solution (($CeLa)Cl_3$). One test was done using a low dose of RE and compared to equal molar doses of Fe and Al as ferric and alum.

Figure 3A:
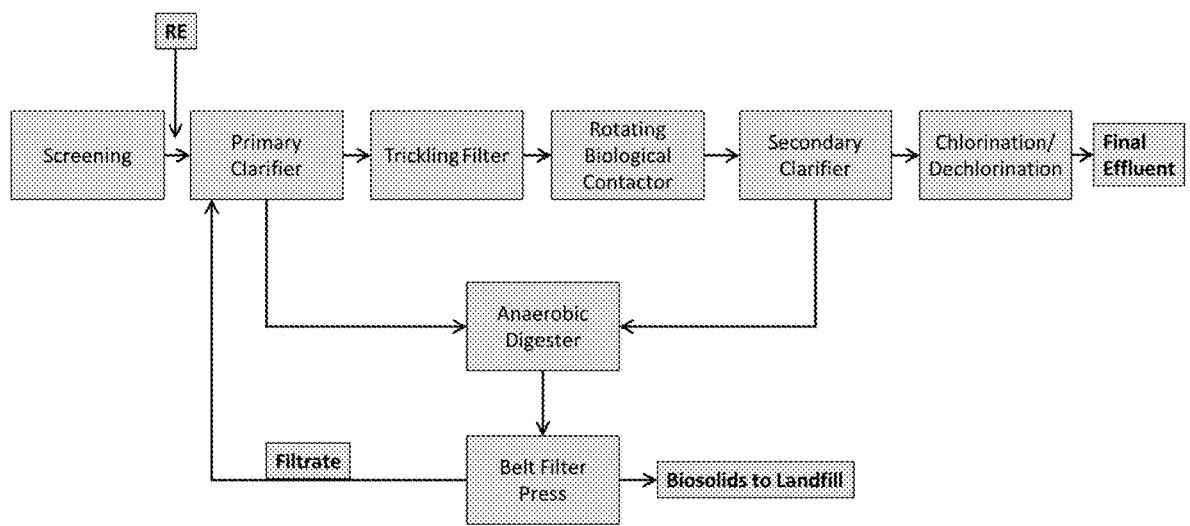
FIG. 3A illustrates the plant flow of Example 3 with the RE clarifying agent dosed prior to the primary clarifier.

The plant flow was as illustrated in FIG. 3A with the RE dosed prior to the primary clarifier.

Results:
Primary Clarifier Influent

Figure 3B:
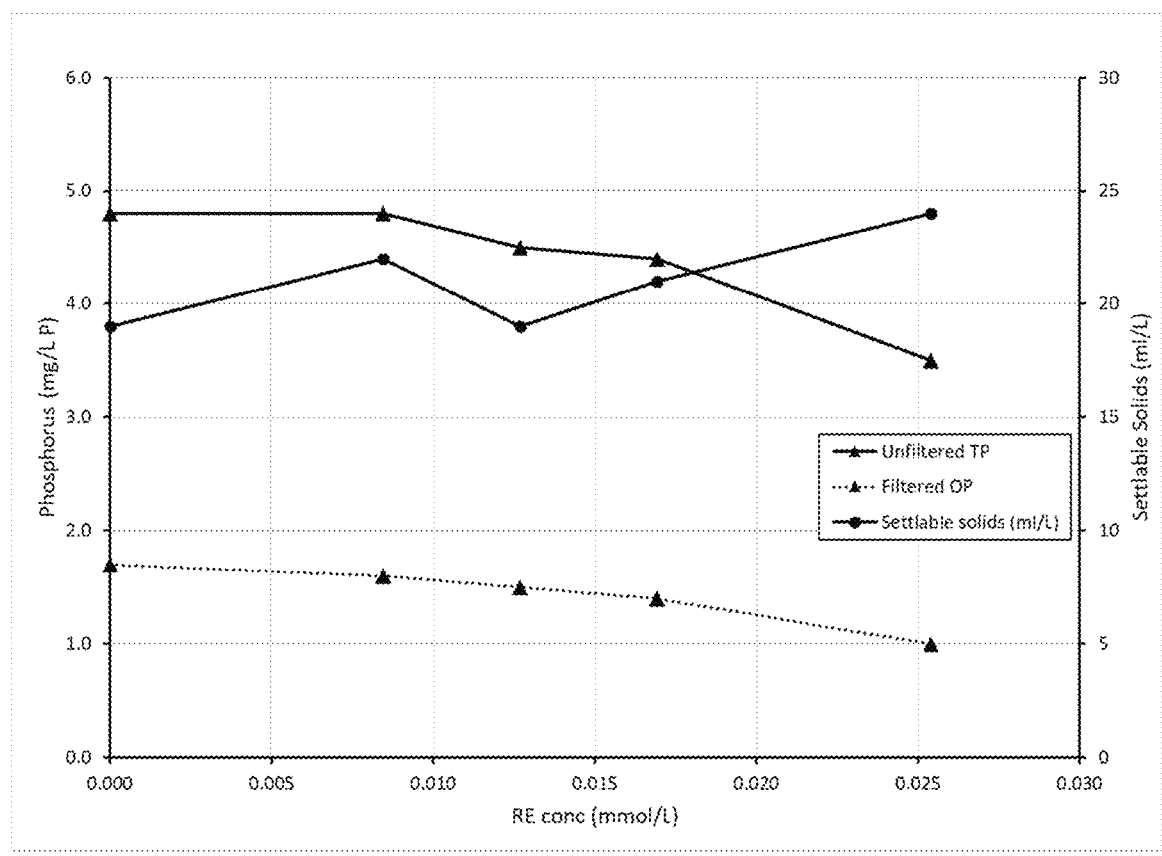
FIG. 3B is a graph of Settlable Solids and phosphorus vs RE concentration in mmol/L as measured for Unfiltered TP, Filtered OP, and settlable solids of Example 3 Test 1.
Figure 3C:
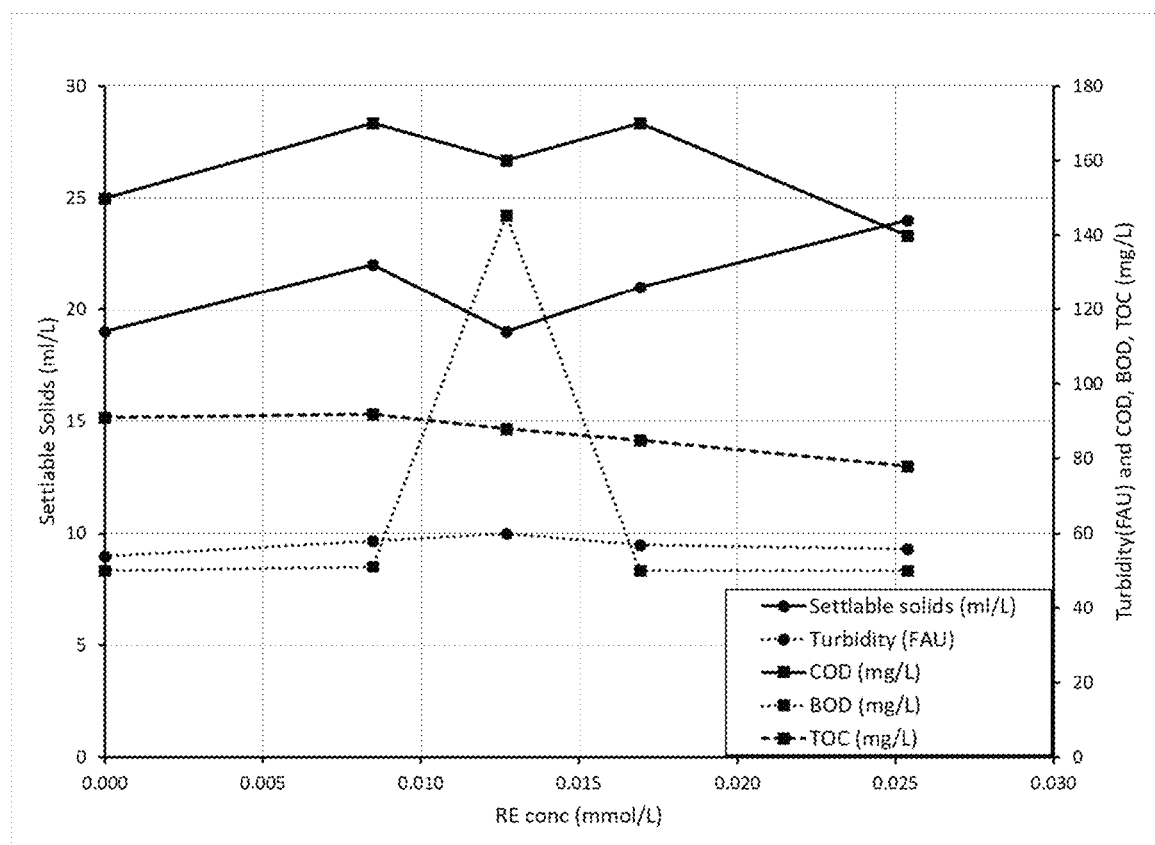
FIG. 3C is a graph of Settlable Solids and Turbidity, COD, BOD, and TOC vs RE concentration in mmol/L of Example 3 Test 1.
Figure 3D:
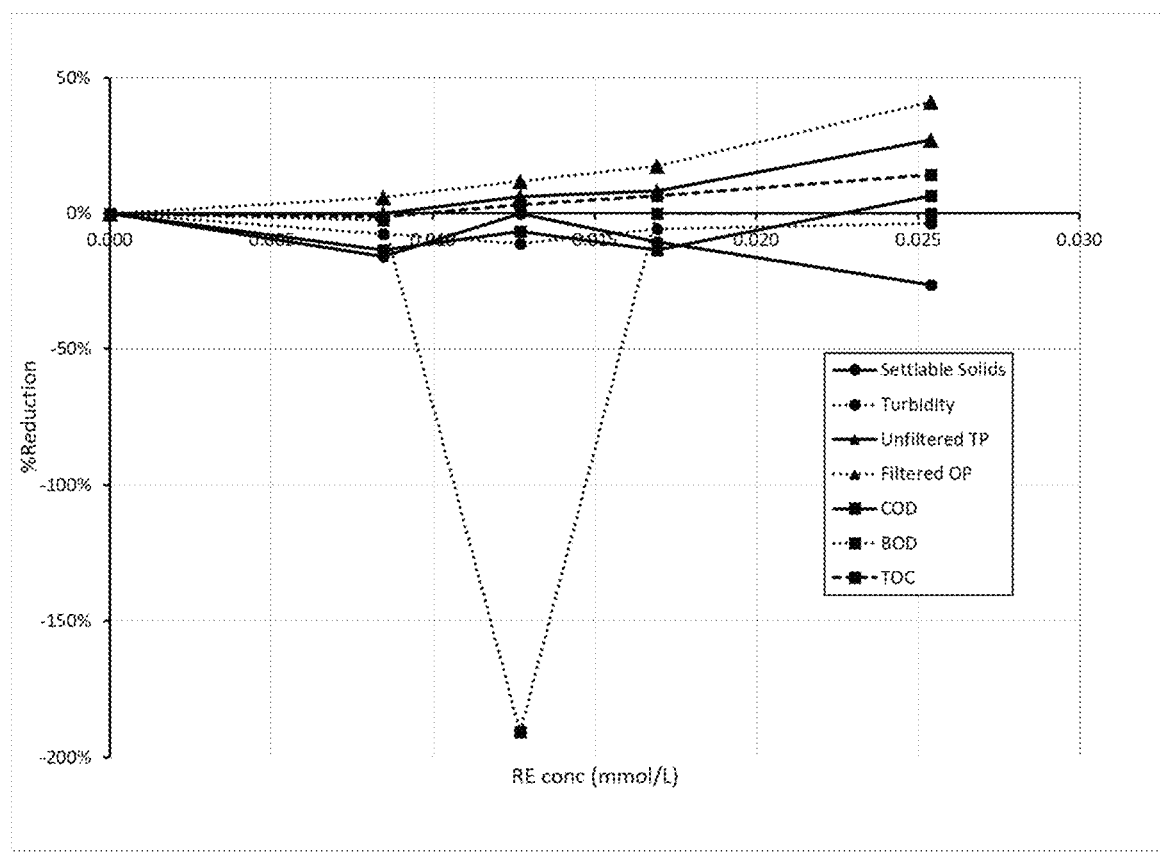
FIG. 3D is a graph of the % Reduction in Settlable Solids, Turbidity, Unfiltered TP, Filtered TP, COD, BOD, and TOC vs. the RE concentration in mmol/L of Example 3 Test 1.
Figure 3E:
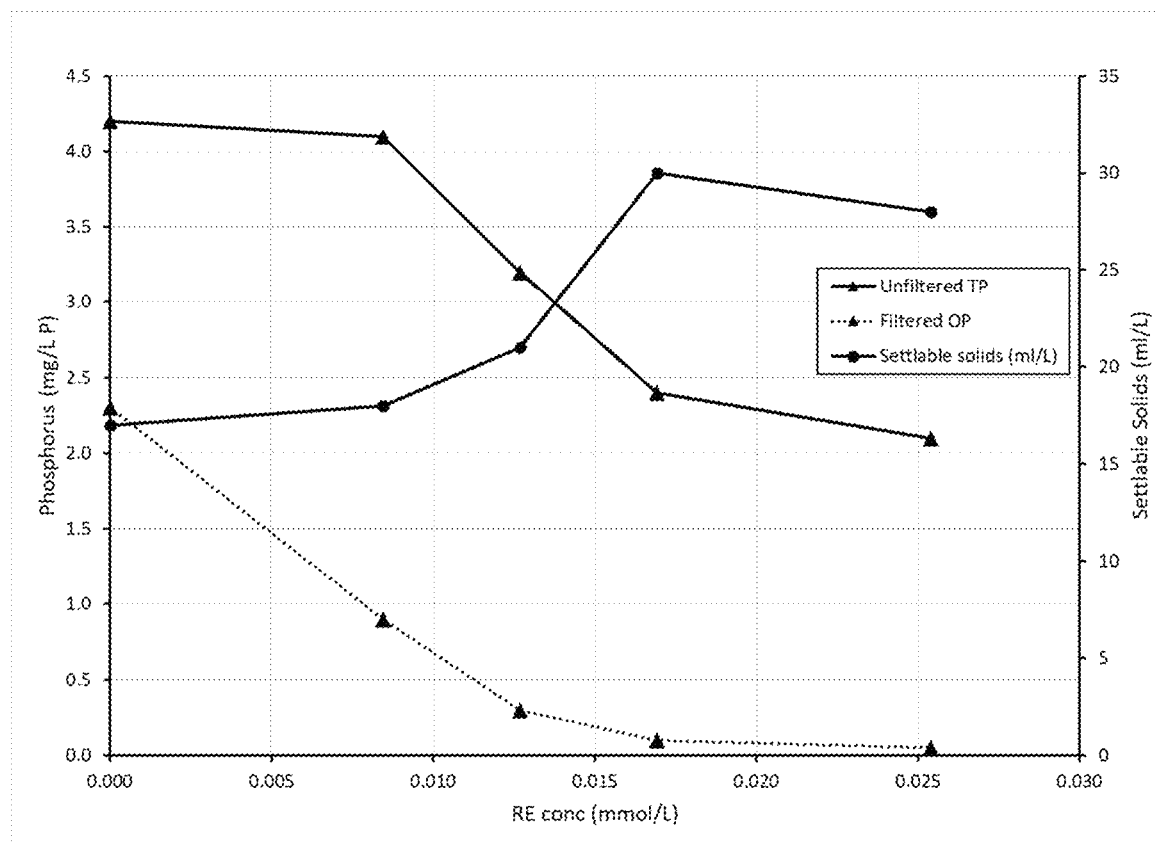
FIG. 3E is a graph of Settlable Solids and phosphorus vs RE concentration in mmol/L as measured for Unfiltered TP, Filtered OP, and settlable solids of Example 3 Test 2.
Figure 3F:
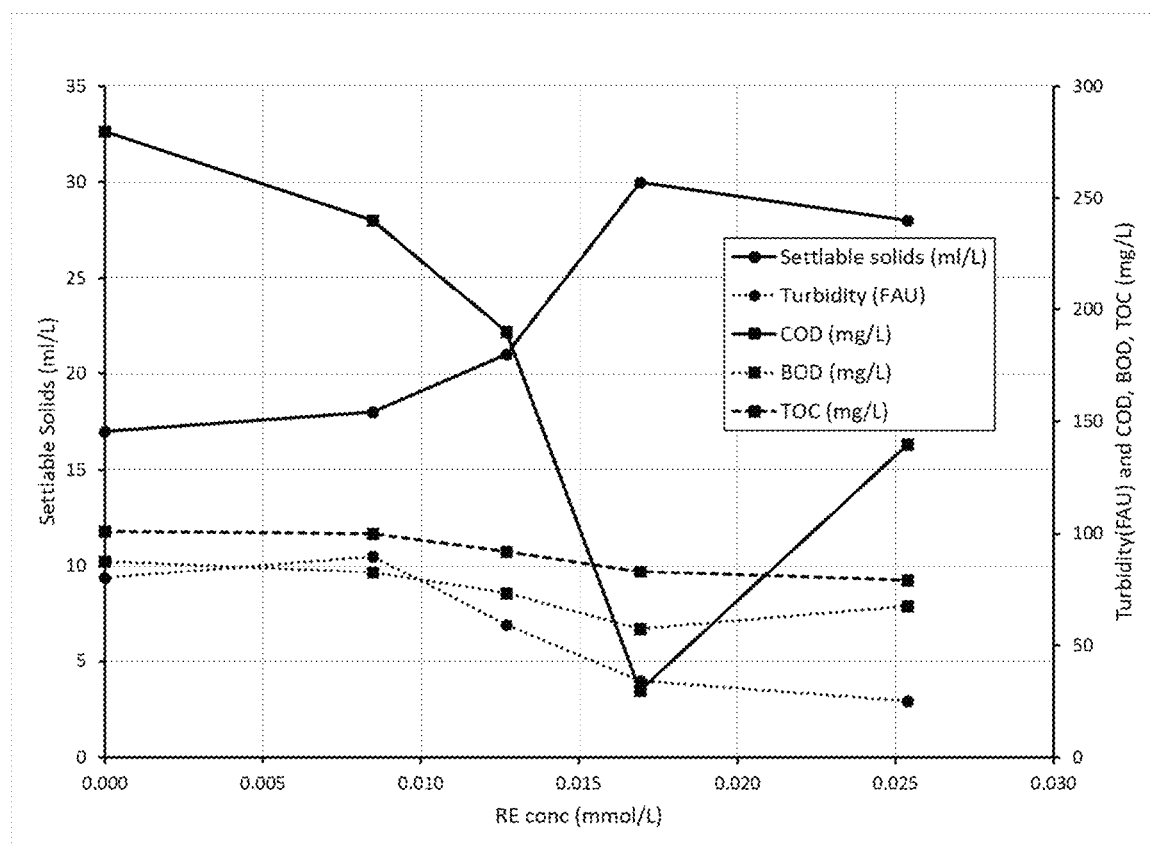
FIG. 3F is a graph of Settlable Solids and Turbidity, COD, BOD, and TOC vs RE concentration in mmol/L of Example 3 Test 2.
Figure 3G:
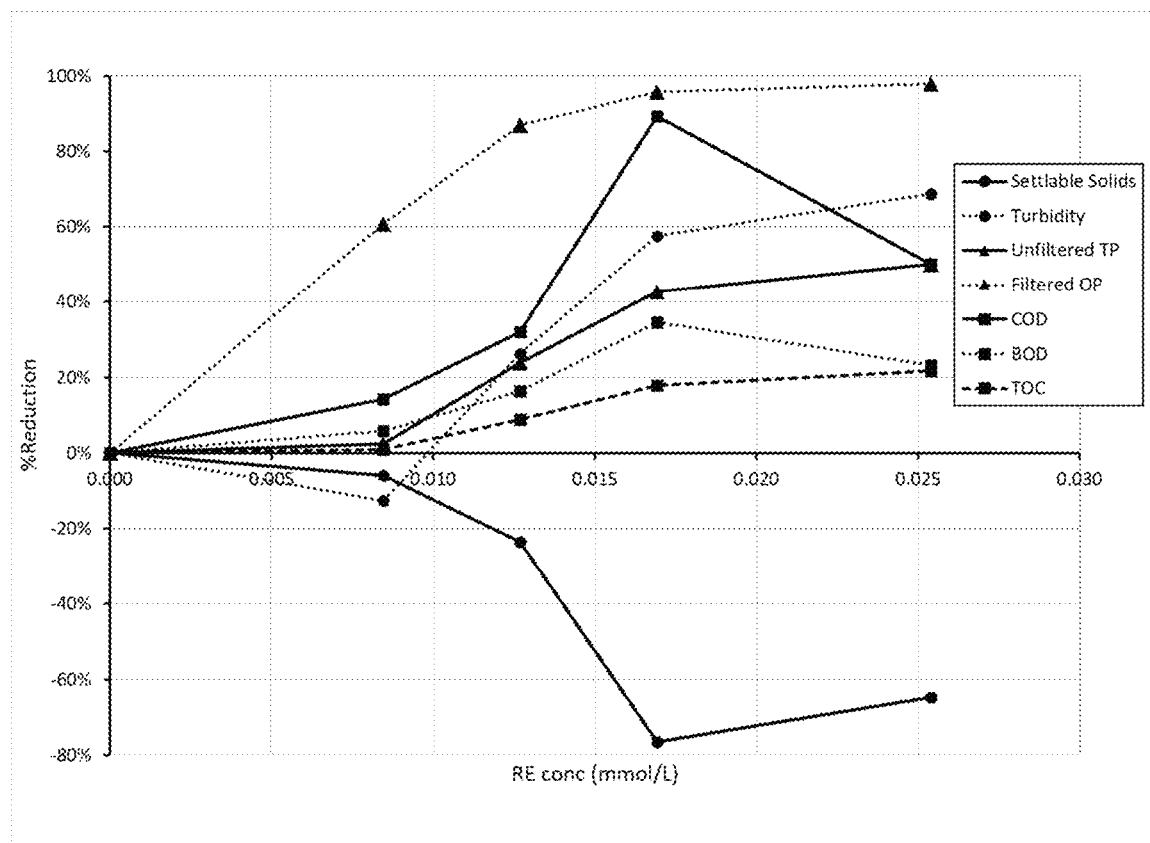
FIG. 3G is a graph of the % Reduction in Settlable Solids, Turbidity, Unfiltered TP, Filtered TP, COD, BOD, and TOC vs. the RE concentration in mmol/L of Example 3 Test 2.

Primary Clarifier influent was dosed with varying amounts of RE. This experiment was performed 2 times, once using small doses of RE (Test 1) and once using a larger doses of RE (Test 2). The settable solids, turbidity, filtered orthophosphate (OP), total phosphorus (TP), chemical oxygen demand (COD), Biochemical Oxygen Demand (BOD), and total organic carbon (TOC) were measured. Each was plotted vs the dosed RE amount in mmol/L treated water. The % change of each [%=(Control−dosed)/control×100] was calculated and plotted. Test 1 Settable Solids, filtered OP and unfiltered TP is shown in FIG. 3B. Test 1 Settable Solids, Turbidity, COD, BOD, and TOC is shown in FIG. 3C. Test 1% Reduction All Data is shown in FIG. 3D. Test 2 Settable Solids, filtered OP and unfiltered TP is shown in FIG. 3E. Test 2 Settable Solids, Turbidity, COD, BOD, and TOC is shown in FIG. 3F. Test 2% Reduction All Data is shown in FIG. 3G.

Coagulant Comparison Testing

Raw influent from the wastewater treatment plant in Pennsylvania was dosed with equal molar amounts of RE, Fe, and Al. The dose amount was 0.015 mmol/L of treated solution. The total organic carbon (TOC), chemical oxygen demand (COD), filtered orthophosphate (FOP), unfiltered orthophosphate (UOP), total phosphorus (TP), turbidity, and Biochemical Oxygen Demand (BOD) were measured. The % change of each [%=(Control−dosed)/control×100] was calculated and plotted.

Measured Data

| | Control | RE | Ferric | Alum |
|---|---|---|---|---|
| Settable Solids (ml/L) | 24 | 20 | 22 | 24 |
| Turbidity (FAU) | 77 | 77 | 75 | 73 |
| Unfiltered TP (mg/L) | 4.9 | 4.4 | 3.8 | 4.6 |
| Filtered OP (mg/L) | 1.7 | 0.9 | 1.7 | 1.2 |
| COD (mg/L) | 170 | 180 | 170 | 210 |
| BOD (mg/L) | 57.3 | 67.1 | 55.9 | 55.7 |
| TOC (mg/L) | 93 | 86 | 96 | 92 |

Difference from Control

| | Control | RE | Ferric | Alum |
|---|---|---|---|---|
| Settable Solids (ml/L) | — | 4 | 2 | 0 |
| Turbidity (FAU) | — | 0 | 2 | 4 |
| Unfiltered TP (mg/L) | — | 0.5 | 1.1 | 0.3 |
| Filtered OP (mg/L) | — | 0.8 | 0 | 0.5 |
| COD (mg/L) | — | −10 | 0 | −40 |
| BOD (mg/L) | — | −9.8 | 1.4 | 1.6 |
| TOC (mg/L) | — | 7 | −3 | 1 |

% Reduction from Control

| | Control | RE | Ferric | Alum |
|---|---|---|---|---|
| Settable Solids | — | 17% | 8% | 0% |
| Turbidity | — | 0% | 3% | 5% |
| Unfiltered TP | — | 19% | 8% | 23% |
| Filtered OP | — | 47% | 0% | 29% |
| COD | — | −6% | 0% | −24% |
| BOD | — | −17% | 2% | 3% |
| TOC | — | 8% | −3% | 1% |

Experimental:
Raw Influent Test 1:

In a wastewater treatment plant, approximately 13 L of raw sewage influent was collected after the grit filter but prior to the primary clarifier. The sample was stirred and separated into 5 portions, a 1 L control sample, three 3 L samples, and one 2.7 L sample. The 1 L control sample was loaded into an Imhoff cone and the standard settleable solids measurement procedure was followed. Each of the remaining 4 samples were then dosed with increasing amounts of rare earth (RE) as a RE chloride solution to make the RE concentration 0.008, 0.013, 0.017, and 0.025 mmol/L. The samples were allowed to stir for 10 min and then 1 L of each was loaded into an Imhoff cone and the standard settleable solids measurement procedure was followed. After settling the volume of the settleable solids was recorded. A sample of the supernatant was collected and tested for Turbidity, TP, filtered OP, COD, BOD, and TOC.

Raw Influent Test 2:

In a wastewater treatment plant, approximately 13 L of raw sewage influent was collected after the grit filter but prior to the primary clarifier. The sample was stirred and separated into 5 portions, a 1 L control sample, and four 3 L sample. The 1 L control sample was loaded into an Imhoff cone and the standard settleable solids measurement procedure was followed. Each of the remaining 4 samples were then dosed with increasing amounts of rare earth (RE) as a RE chloride solution to make the RE concentration 0.038, 0.063, 0.089, and 0.114 mmol/L. The samples were allowed to stir for 10 min and then 1 L of each was loaded into an Imhoff cone and the standard settleable solids measurement procedure was followed. After settling the volume of the settleable solids was recorded. A sample of the supernatant was collected and tested for Turbidity, TP, filtered OP, COD, BOD, and TOC.

Comparison to Other Coagulants:

In a wastewater treatment plant, approximately 13 L of raw sewage influent was collected after the grit filter but prior to the primary clarifier. The sample was stirred and separated into 4 portions, a 1 L control sample and three 3 L samples. The 1 L control sample was loaded into an Imhoff cone and the standard settleable solids measurement procedure was followed. The remaining 3 samples were then dosed with rare earth (RE) as a RE chloride solution, Ferric chloride, and Aluminum sulfate (Alum) to make the metal (RE, Fe, or Al) concentration 0.015 mmol/L. The samples were allowed to stir for 10 min and then 1 L of each was loaded into an Imhoff cone and the standard settleable solids measurement procedure was followed. After settling the volume of the settleable solids was recorded. A sample of the supernatant was collected and tested for Turbidity, TP, filtered OP, COD, BOD, and TOC.

Analytical Testing methods were as described in Example 1.

Figure 4:
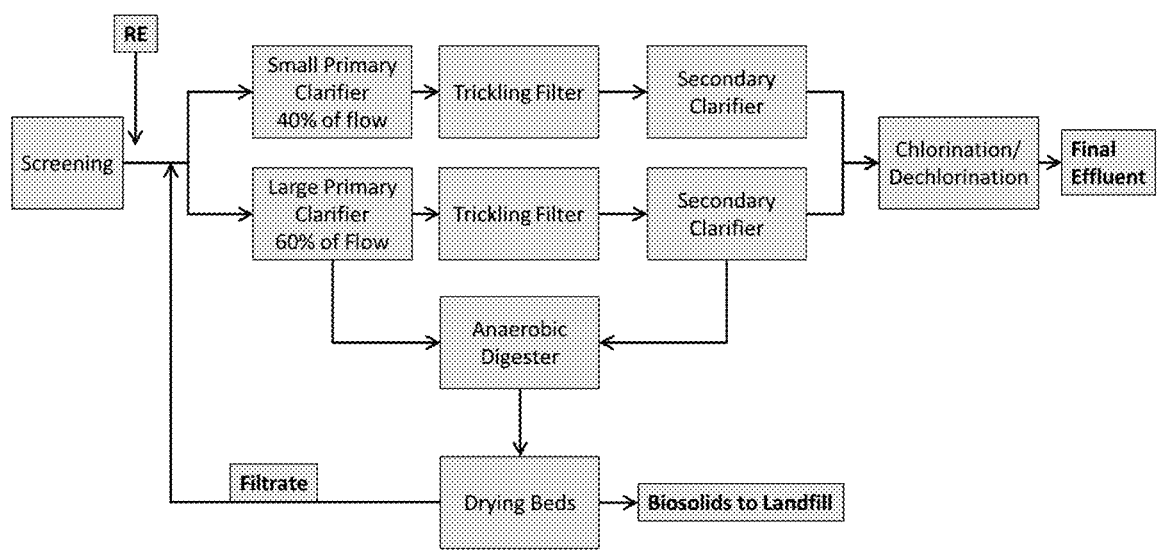
FIG. 4 illustrates the plant flow of Example 4 with the RE clarifying agent dosed after screening and prior to the small or large primary clarifier, both of which are prior to the secondary clarifier.

Example 4: Plant Data Generated from a 1.5 MGD Wastewater Treatment Plant in New York The plant flow and dose point is as illustrated in the Flow Chart shown in FIG. 4. All BOD, TSS, and TP analyses were performed using EPA methods as described herein. As shown in FIG. 4, the RE dose point is just after screening and prior to the small or large primary clarifier, which is prior to the secondary clarifier.

This plant dosed Rare Earths (RE) prior to the primary clarifier for 5 months. The plant measures BOD, TSS and TP in the influent and effluent. The table below shows the plant data for 15 months prior to dosing RE and the 5 months of dosing RE. The RE dose is the mmol of RE added per liter of water treated.

| Month | Avg. Flow (MGD) | Inf. BOD (mg/L) | Eff. BOD (mg/L) | Inf. TSS (mg/L) | Eff. TSS (mg/L) | Inf. TP (mg/L) | Eff. TP (mg/L) | RE dose (mmol/L) |
|---|---|---|---|---|---|---|---|---|
| 1 | 0.758 | 331 | 17 | 279 | 18 | 5.85 | 2.84 | |
| 2 | 0.526 | 435 | 13 | 392 | 17 | 6.20 | 4.8 | |
| 3 | 0.48 | 479 | 15 | 425 | 13 | 6.70 | 4 | |
| 4 | 0.499 | 451 | 15 | 450 | 19 | 7.80 | 4 | |
| 5 | 0.673 | 413 | 17 | 527 | 22 | | | |
| 6 | 0.774 | 421 | 17 | 362 | 22 | 7.80 | 4.9 | |
| 7 | 0.722 | 425 | 18 | 265 | 21 | 7.40 | 4.4 | |
| 8 | 0.778 | 516 | 17 | 263 | 17 | 5.20 | 3.7 | |
| 9 | 0.937 | 469 | 16 | 241 | 15 | 5.20 | 3.2 | |
| 10 | 1.04 | 279 | 18 | 229 | 16 | 4.70 | 3.2 | |
| 11 | 1.22 | 385 | 17 | 227 | 20 | 4.70 | 3.2 | |
| 12 | 1.55 | 200 | 14 | 211 | 19 | 9.50 | 2.7 | |
| 13 | 1.06 | 294 | 14 | 243 | 19 | | | |
| 14 | 0.768 | 349 | 10 | 331 | 13 | 5.00 | 3 | |
| 15 | 0.939 | 267 | 11 | 226 | 10 | 3.75 | 2.35 | |
| 16 | 0.745 | 463 | 15 | 380 | 2 | 8.25 | 1.90 | 0.208 |
| 17 | 0.946 | 341 | 17 | 326 | 1 | 5.76 | 1.10 | 0.100 |
| 18 | 1.257 | 400 | 14 | 338 | 1 | 4.80 | 0.69 | 0.064 |
| 19 | 0.530 | 345 | 10 | 378 | 9 | 3.88 | 0.62 | 0.115 |
| 20 | 0.495 | 440 | 9.6 | 540 | 8 | 6.15 | 0.44 | 0.114 |

Averages for the Data Above.

| | Avg. Flow (MGD) | Inf. BOD (mg/L) | Eff. BOD (mg/L) | Inf. TSS (mg/L) | Eff. TSS (mg/L) | Inf. TP (mg/L) | Eff. TP (mg/L) | RE dose (mmol/L) |
|---|---|---|---|---|---|---|---|---|
| Without RE | 0.848 | 381 | 15 | 311 | 17 | 6.13 | 3.56 | |
| With RE | 0.795 | 398 | 13 | 392 | 4 | 5.77 | 0.947 | 0.12 |

Differences of Averages for the Data Above. (without RE–with RE)

| Avg. Flow (MGD) | Inf. BOD (mg/L) | Eff. BOD (mg/L) | Inf. TSS (mg/L) | Eff. TSS (mg/L) | Inf. TP (mg/L) | Eff. TP (mg/L) |
|---|---|---|---|---|---|---|
| 0.053 | −17 | 2 | −81 | 13 | 0.36 | 2.613 |

% Reduction of Averages for the Data Above

| Avg. Flow (MGD) | Inf. BOD (mg/L) | Eff. BOD (mg/L) | Inf. TSS (mg/L) | Eff. TSS (mg/L) | Inf. TP (mg/L) | Eff. TP (mg/L) |
|---|---|---|---|---|---|---|
| 6.6% | −4.5% | 13.3% | −26% | 76.5% | 5.9% | 73.4% |

Analytical Testing methods were as described in Example 1.

Conclusion:

Wastewater treated at a 1.5 MGD wastewater treatment plant in New York was treated with (CeLa)Cl$_3$ solution dosed prior to the primary clarifier. Addition of RE resulted in an overall reduction in BOD, TSS, and TP. TSS and TP are reduced the most when RE is dosed. These results are even more striking as the average for the time period when RE is dosed has higher BOD, TSS and TP with a lower flow rate; thus, the influent during the dosing period is more concentrated than the non-dosing period.

Example 5: Experimental Data Generated from Wastewater Collected from a 32 MGD Wastewater Treatment Plant in Virginia General Product Synthesis was as described in Example 3 above.

Mixed RE Solution Used in Primary Influent Testing:

A (CeLa)Cl$_3$ solution was prepared as described in Example 3 above, with the following differences: pH=3.7; Density=1.57 g/ml; RECl$_3$ conc: 40.2%, 631 g/L; REO conc: 416 g/L, 2.46 mol/L.

Single RE Solution Used in Testing:

A CeCl$_3$ solution was prepared using the above general procedure as described in Example 3 above, with the following differences: pH=3.8; Density=1.545 g/ml; RECl$_3$ conc: 40.7%, 629 g/L; REO conc: 439 g/L, 2.55 mol/L.

Figure 5A:
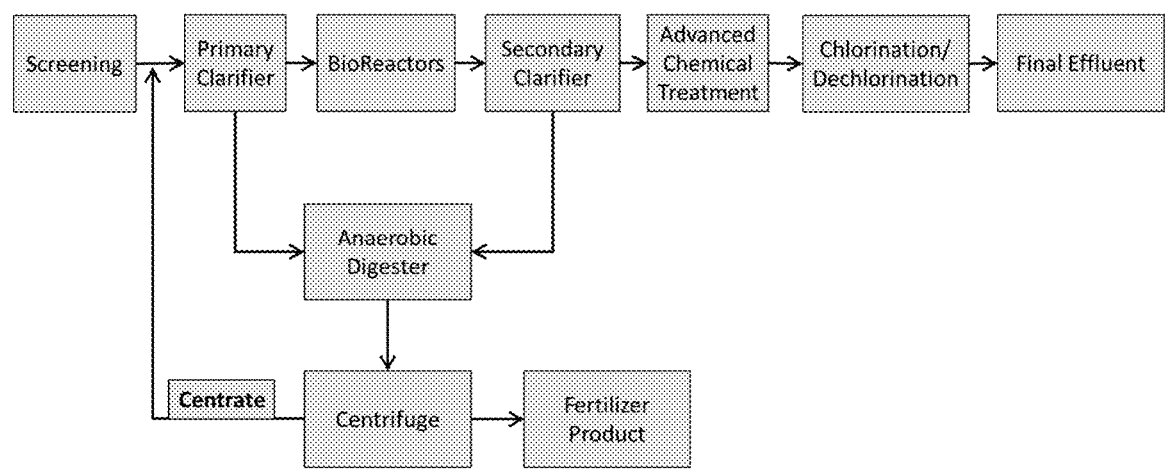
FIG. 5A illustrates the plant flow of Example 5.

The plant flow is as illustrated in the Flow Chart shown in FIG. 5A.

Results and Experimental

Example 5A: Raw Wastewater, Dosing with (CeLa)Cl$_3$

A (CeLa)Cl$_3$ solution was made at a concentration of 2.46 mol/L RE and the Ce:La ratio was approximately 2:1. 4 gal of raw wastewater (directly from the headworks of the plant and prior to the grit screen or any pretreatment) was collected and allowed to stir for at least 15 min. A 1 L sample was collected in an Imhoff cone from the discharge valve as a control. Rare earth chloride was then dosed into the wastewater in increments such that the RE concentration in the mixture increased by approximately 0.013 mmol/L each increment for a total of 9 additions. The actual concentration was calculated based on the dose and the volume of sample removed after sampling. The mixture was allowed to stir for at least 5 min before a 1 L sample was collected. This process was repeated until a total of 10 samples (1 control and 9 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand, biochemical oxygen demand and total suspended solids.

Figure 5B:
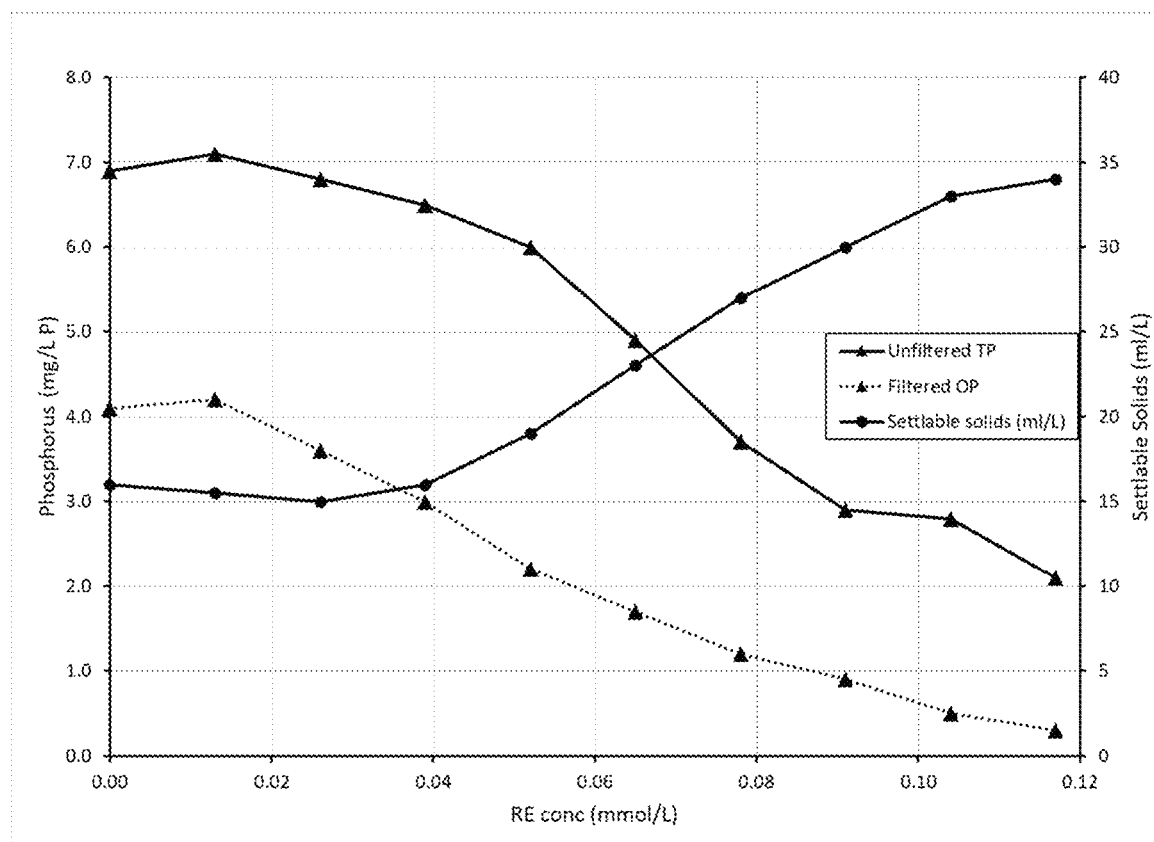
FIG. 5B is a graph of settlable solids, Unfiltered TP, and Filtered OP as measured plotted vs. the RE concentration in mmol/L of Example 5A.
Figure 5C:
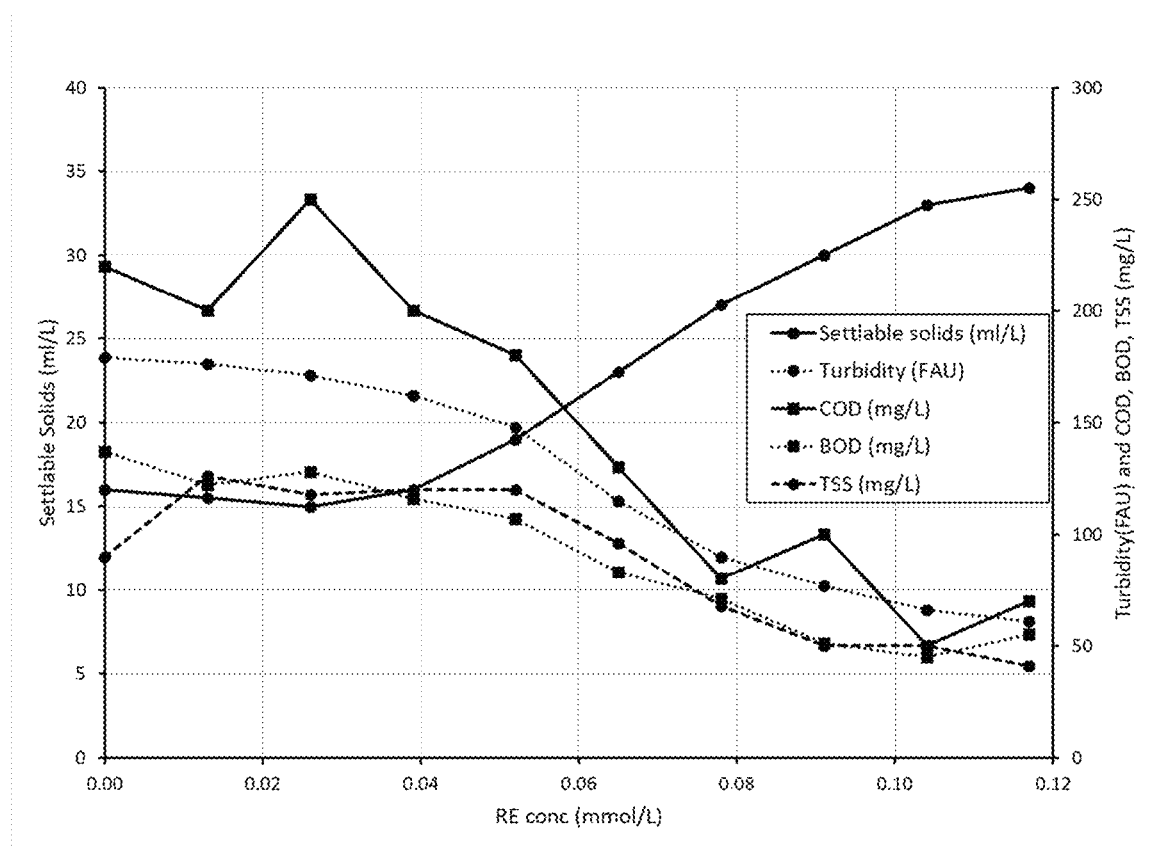
FIG. 5C is a graph of turbidity, COD, BOD and TSS vs. the RE concentration in mmol/L of Example 5A.
Figure 5D:
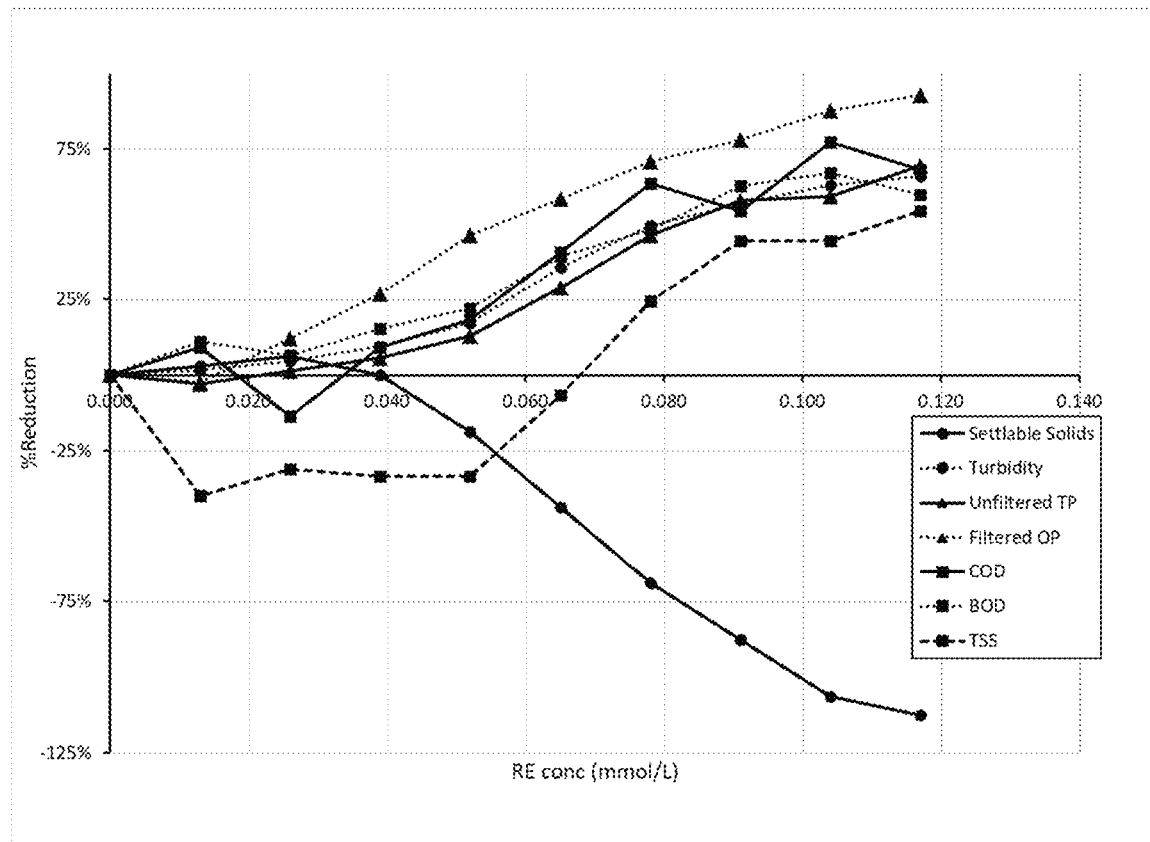
FIG. 5D is a graph of the % Reduction of settable solids, turbidity, Unfiltered TP, Filtered OP, COD, BOD and TSS vs. the RE concentration in mmol/L of Example 5A.

The settlable solids, Unfiltered TP and Filtered OP of each sample were measured and plotted vs. the RE concentration in mmol/L, as shown in FIG. 5B. Unfiltered samples of the supernatant from each dosing were measured for turbidity, COD, BOD and TSS and this was plotted vs. the RE concentration in mmol/L, as shown in FIG. 5C. % Reduction is illustrated in FIG. 5D.

Example 5B: Primary Influent Wastewater, Dosing with CeCl$_3$

A CeCl$_3$ solution was made at a concentration of 2.55 mol/L RE. 4 gal of wastewater collected from just before the primary clarifier was allowed to stir for at least 15 min. A 1 L sample was collected in an Imhoff cone from the discharge valve as a control. Rare earth chloride was then dosed into the wastewater in increments such that the RE concentration in the mixture increased by approximately 0.013 mmol/L each increment for a total of 9 additions. The actual concentration was calculated based on the dose and the volume of sample removed after sampling. The mixture was allowed to stir for at least 5 min before a 1 L sample was collected. This process was repeated until a total of 10 samples (1 control and 9 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand, biochemical oxygen demand and total suspended solids.

Figure 5E:
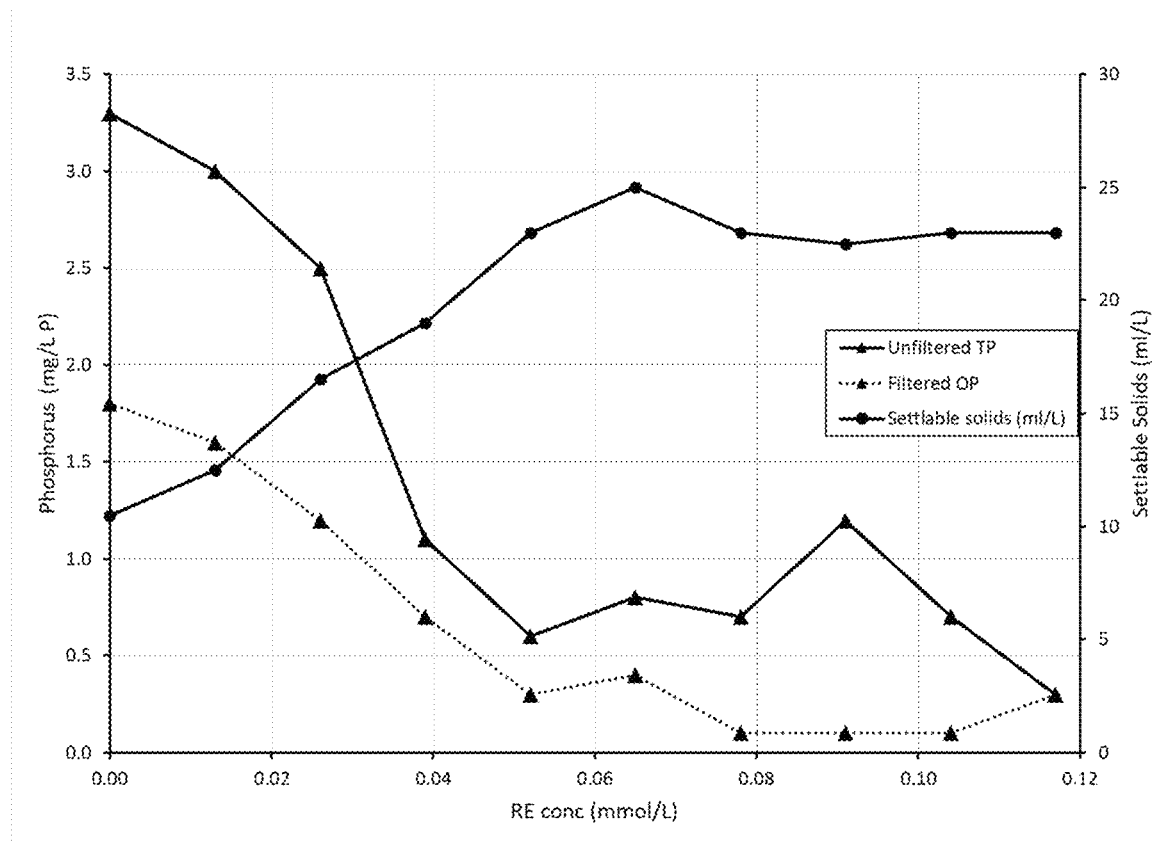
FIG. 5E is a graph of settlable solids, Unfiltered TP, and Filtered OP as measured plotted vs. the RE concentration in mmol/L of Example 5B.
Figure 5F:
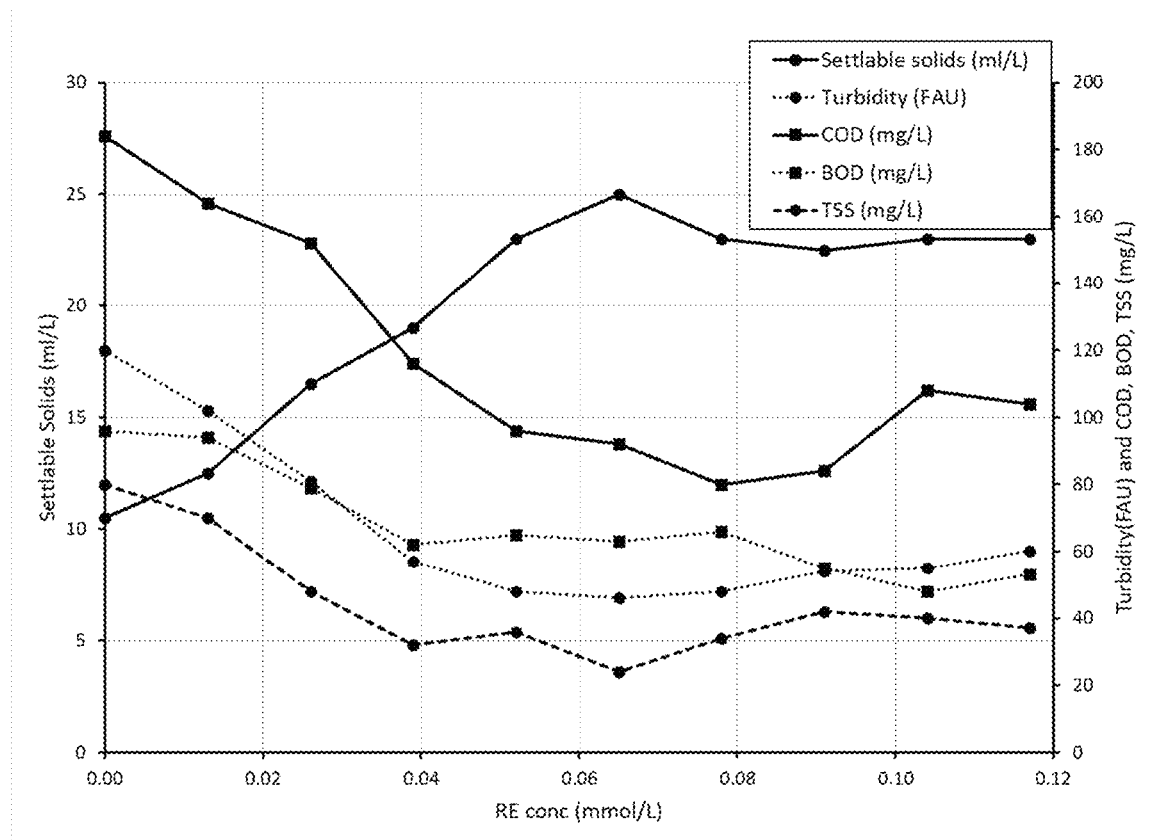
FIG. 5F is a graph of turbidity, COD, BOD and TSS vs. the RE concentration in mmol/L of Example 5B.
Figure 5G:
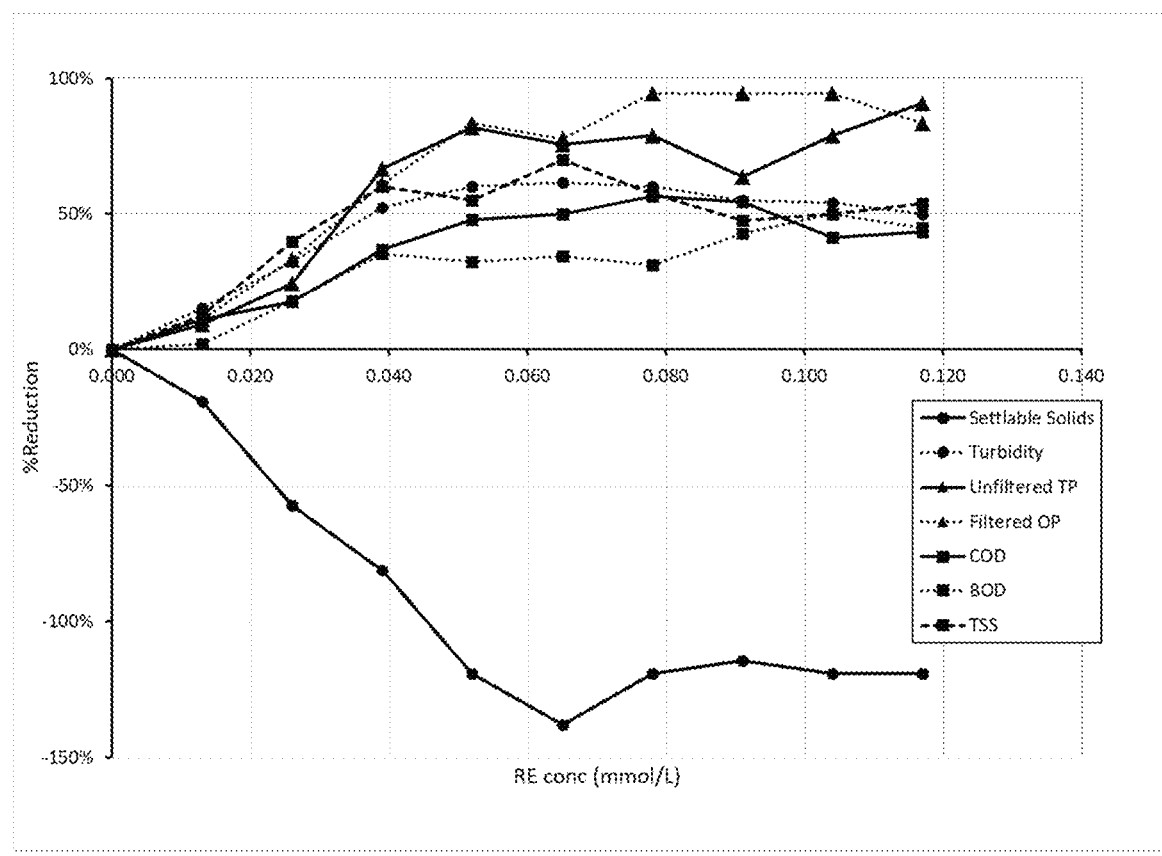
FIG. 5G is a graph of the % Reduction of settable solids, turbidity, Unfiltered TP, Filtered OP, COD, BOD and TSS vs. the RE concentration in mmol/L of Example 5B.

The settlable solids, Unfiltered TP and Filtered OP of each sample were measured and plotted vs. the RE concentration in mmol/L, as shown in FIG. 5E. Unfiltered samples of the supernatant from each dosing were measured for turbidity, COD, BOD and TSS and this was plotted vs. the RE concentration in mmol/L, as shown in FIG. 5F. % Reduction is illustrated in FIG. 5G.

Example 5C: Primary Influent Wastewater, Dosing with (CeLa)Cl$_3$

A (CeLa)Cl$_3$ solution was made at a concentration of 2.46 mol/L RE and the Ce:La ratio was approximately 2:1. 4 gal of wastewater collected from just before the primary clarifier was allowed to stir for at least 15 min. A 1 L sample was collected in an Imhoff cone from the discharge valve as a control. Rare earth chloride was then dosed into the wastewater in increments such that the RE concentration in the mixture increased by approximately 0.007 mmol/L each increment for a total of 9 additions. The actual concentration was calculated based on the dose and the volume of sample removed after sampling. The mixture was allowed to stir for at least 5 min before a 1 L sample was collected. This process was repeated until a total of 10 samples (1 control and 9 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand, biochemical oxygen demand and total suspended solids.

Figure 5H:
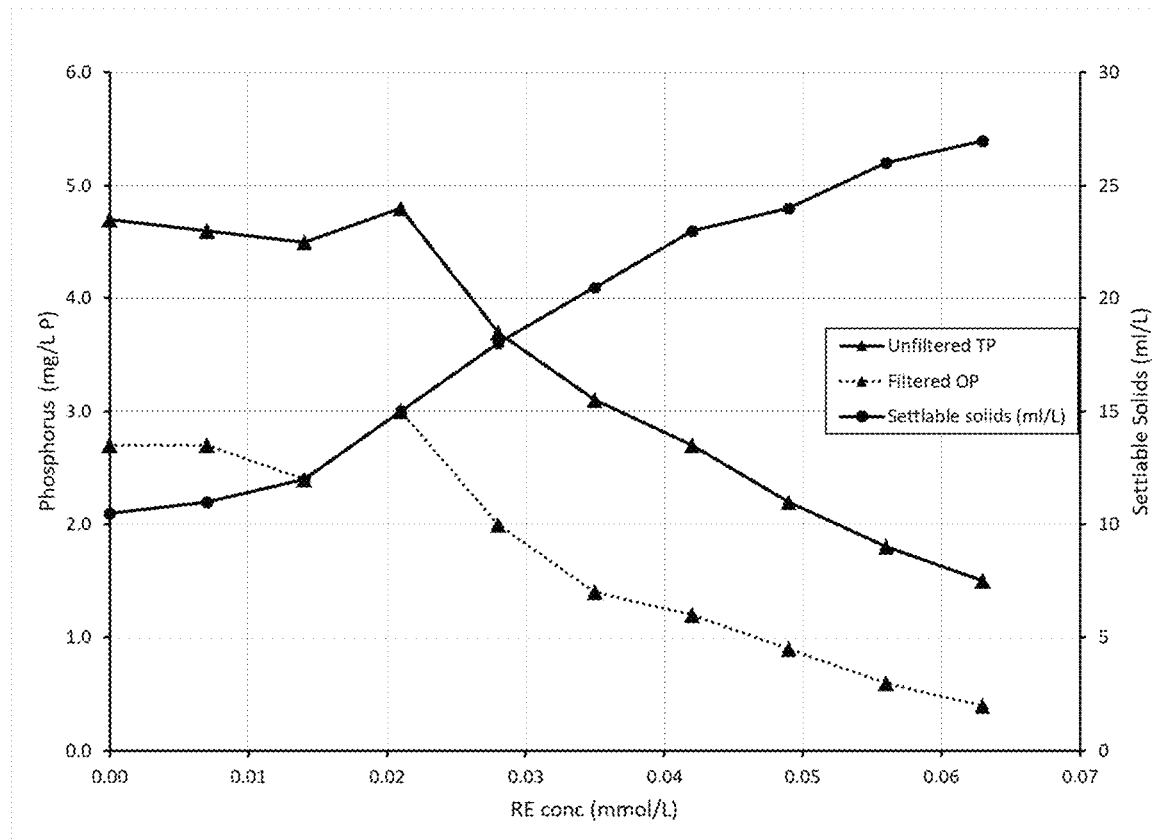
FIG. 5H is a graph of settlable solids, Unfiltered TP, and Filtered OP as measured plotted vs. the RE concentration in mmol/L of Example 5C.
Figure 5I:
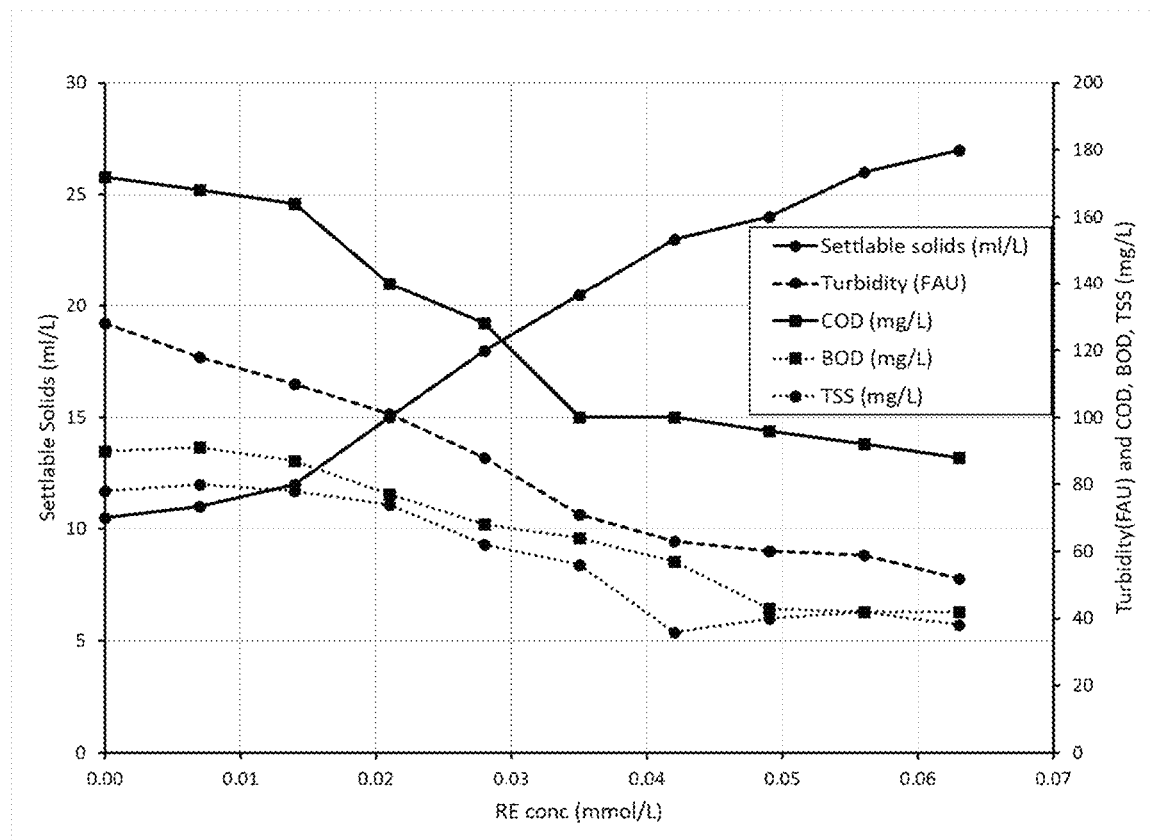
FIG. 5I is a graph of turbidity, COD, BOD and TSS vs. the RE concentration in mmol/L of Example 5C.
Figure 5J:
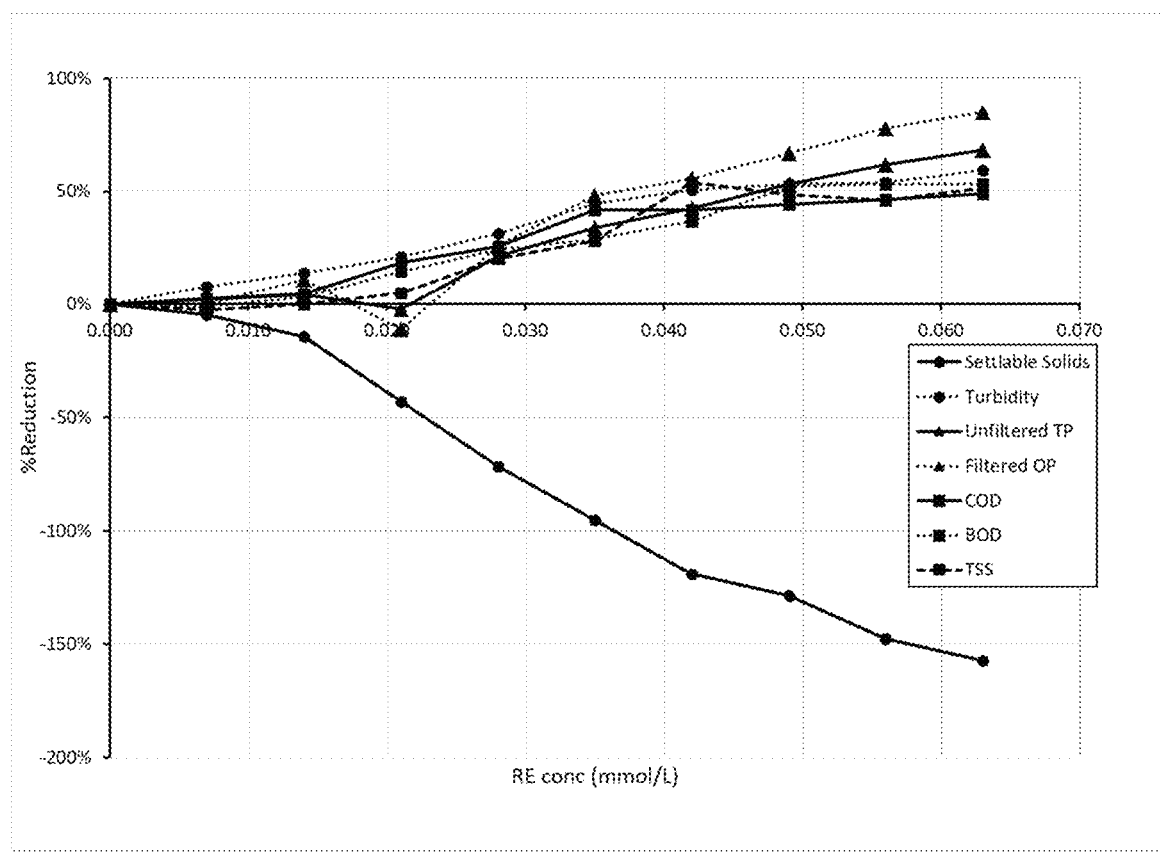
FIG. 5J is a graph of the % Reduction of settable solids, turbidity, Unfiltered TP, Filtered OP, COD, BOD and TSS vs. the RE concentration in mmol/L of Example 5C.

The settable solids, Unfiltered TP and Filtered OP of each sample were measured and plotted vs. the RE concentration in mmol/L, are shown in FIG. 5H. Unfiltered samples of the supernatant from each dosing were measured for turbidity, COD, BOD and TSS and plotted vs. the RE concentration in mmol/L, as shown in FIG. 5I. % Reduction is illustrated in FIG. 5J.

Example 5D: Primary Influent Wastewater, Dosing with $CeCl_3$

A $CeCl_3$ solution was made at a concentration of 2.55 mol/L RE. 4 gal of wastewater collected from just before the primary clarifier was allowed to stir for at least 15 min. A 1 L sample was collected in an Imhoff cone from the discharge valve as a control. Rare earth chloride was then dosed into the wastewater in increments such that the RE concentration in the mixture increased by approximately 0.007 mmol/L each increment for a total of 9 additions. The actual concentration was calculated based on the dose and the volume of sample removed after sampling. The mixture was allowed to stir for at least 5 min before a 1 L sample was collected. This process was repeated until a total of 10 samples (1 control and 9 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand, biochemical oxygen demand and total suspended solids.

Figure 5K:
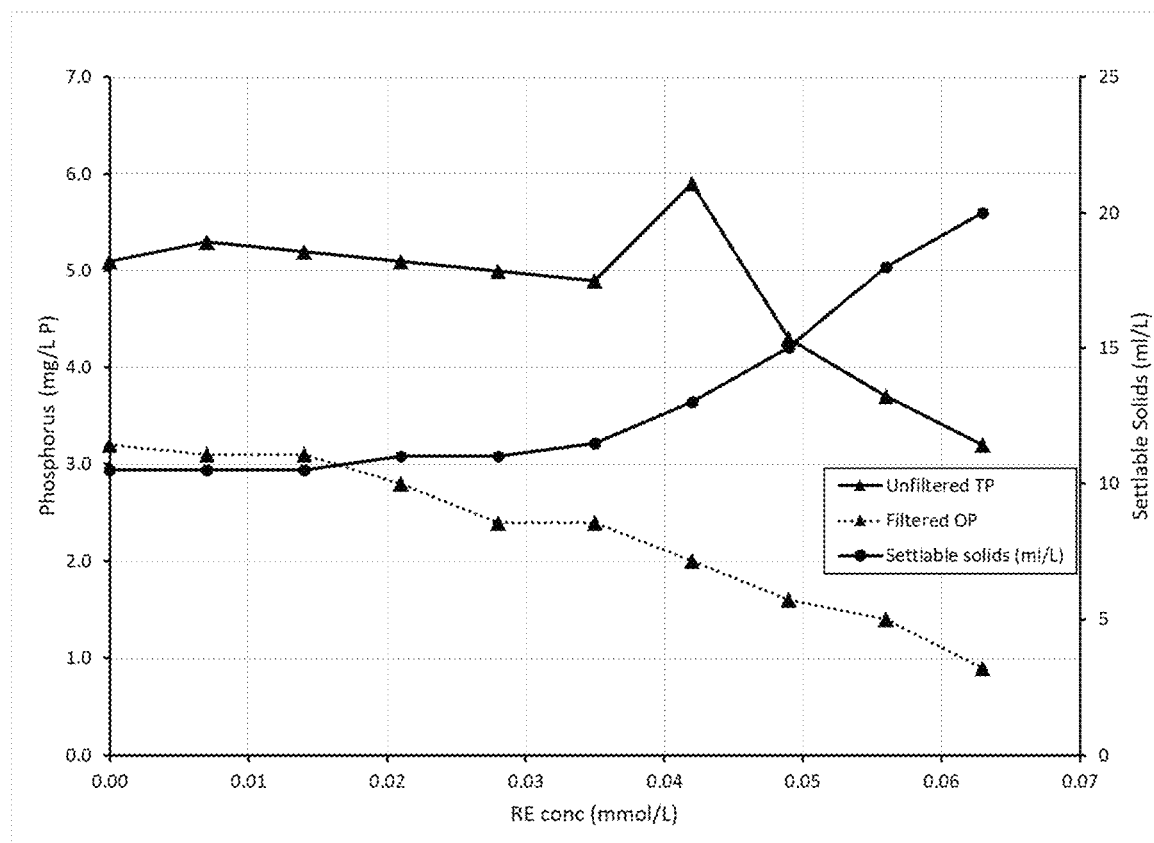
FIG. 5K is a graph of settlable solids, Unfiltered TP, and Filtered OP as measured plotted vs. the RE concentration in mmol/L of Example 5D.
Figure 5L:
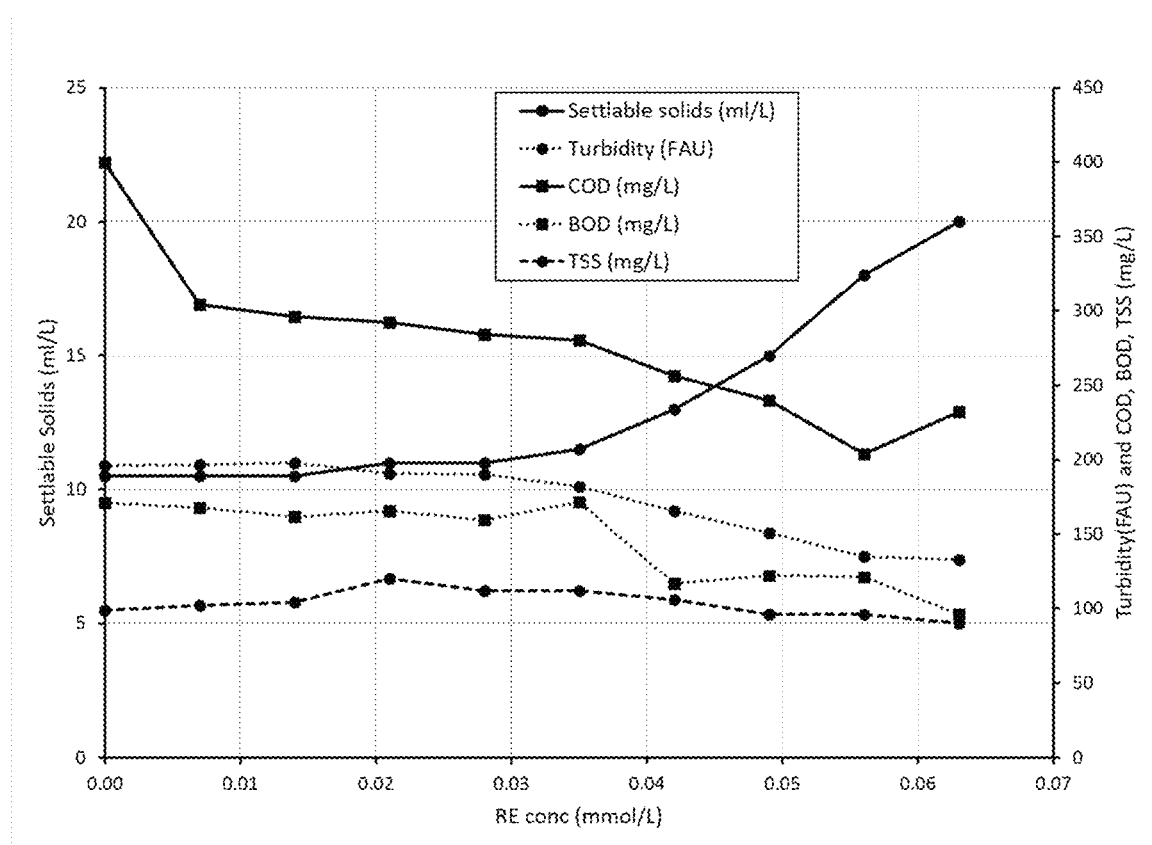
FIG. 5L is a graph of turbidity, COD, BOD and TSS vs. the RE concentration in mmol/L of Example 5D.
Figure 5M:
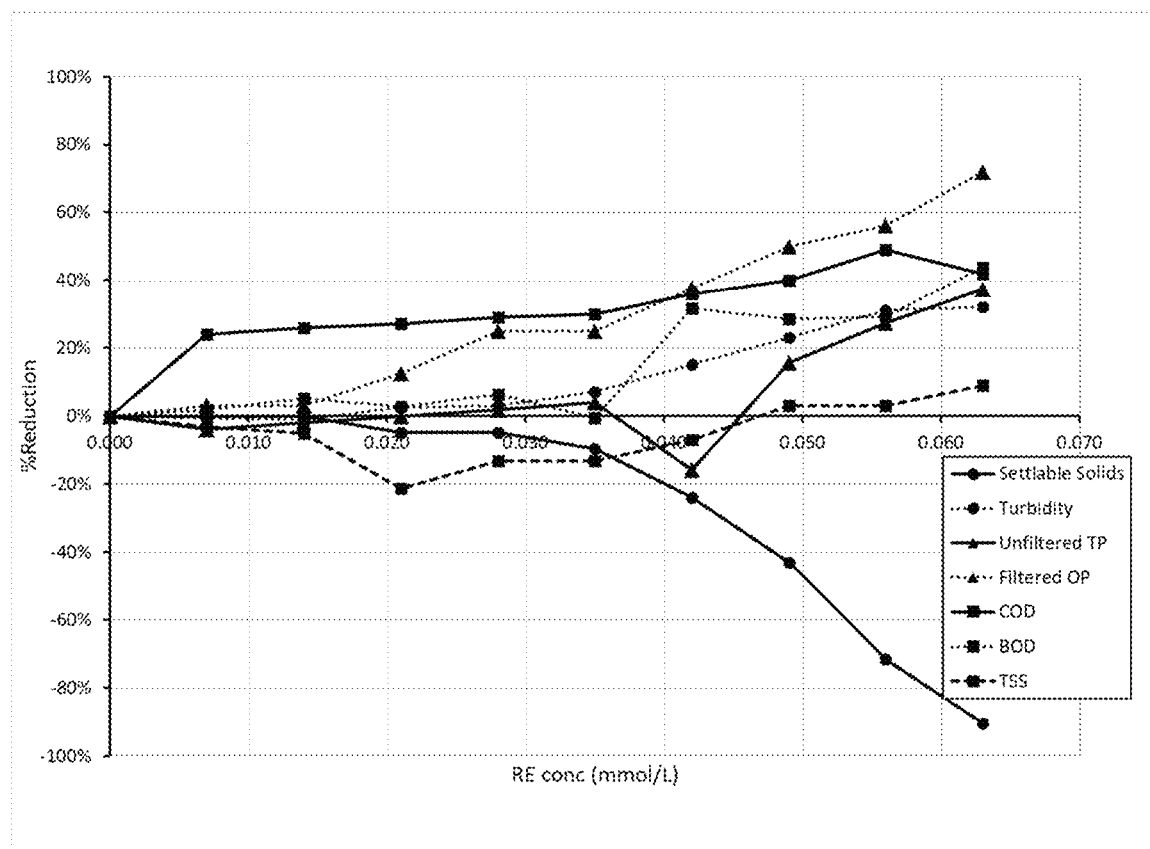
FIG. 5M is a graph of the % Reduction of settable solids, turbidity, Unfiltered TP, Filtered OP, COD, BOD and TSS vs. the RE concentration in mmol/L of Example 5D.

The settable solids, Unfiltered TP and Filtered OP of each sample were measured and plotted vs. the RE concentration in mmol/L, as shown in FIG. 5K. Unfiltered samples of the supernatant from each dosing were measured for turbidity, COD, BOD and TSS and plotted vs. the RE concentration in mmol/L, as shown in FIG. 5L. % Reduction is shown as in FIG. 5M.

Example 5E Primary Influent Wastewater Room Temperature and Chilled, Dosing with $(CeLa)Cl_3$ A $(CeLa)Cl_3$ solution was made at a concentration of 2.46 mol/L RE and the Ce:La ratio was approximately 2:1. 8 gal of wastewater collected from just before the primary clarifier. The sample was split into 2×4 gal portions. One 4 gal portion was allowed to sit at room temperature overnight while the other was placed in a refrigerator set to 4° C. overnight. In the morning each was allowed to stir for at least 15 min. The measured temperature of the room temperature sample was 21.3° C. (70.34° F.) while the chilled sample was 12.5° C. (54.68° F.). A 1 L sample was collected in an Imhoff cone from the discharge valve as a control. Rare earth chloride was then dosed into the wastewater in increments such that the RE concentration in the mixture increased by approximately 0.012 mmol/L each increment for a total of 4 additions. The actual concentration was calculated based on the dose and the volume of sample removed after sampling. The mixture was allowed to stir for at least 5 min before a 1 L sample was collected. This process was repeated until a total of 5 samples (1 control and 4 additions) were collected. The pH of the mixture was recorded when each sample was taken. Each 1 L sample was allowed to settle according to the standard Settable Solids measurement procedure. After 1 hr the volume of settable solids was recorded and a filtered and unfiltered sample of the supernatant was collected. Filtered samples were filtered through a 0.45 micron syringe filter and analyzed for ortho-phosphorus. Unfiltered samples were analyzed for turbidity, total phosphorus, chemical oxygen demand, biochemical oxygen demand and total suspended solids. The COD of the final dose chilled sample was not measured.

Figure 5N:
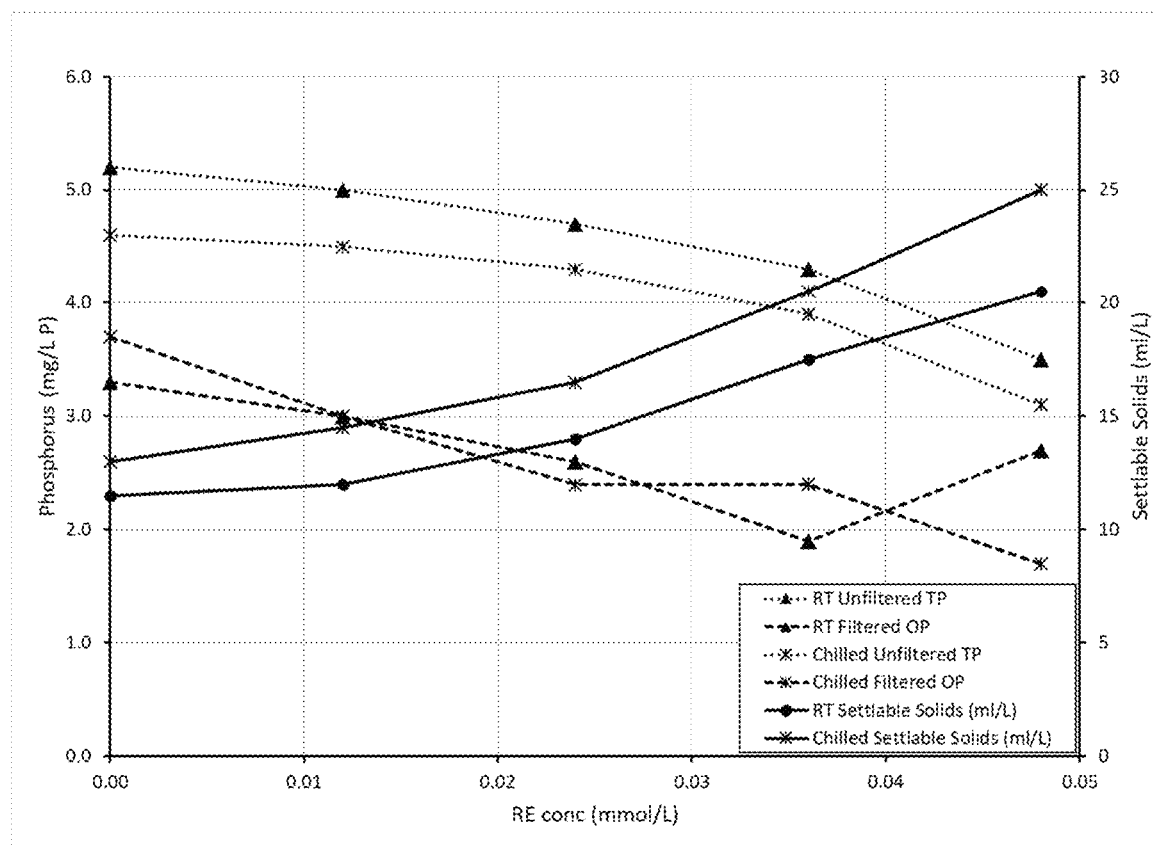
FIG. 5N is a graph of the settlable solids, Unfiltered TP and Filtered OP as measured plotted vs. the RE concentration in mmol/L of Example 5E.
Figure 5O:
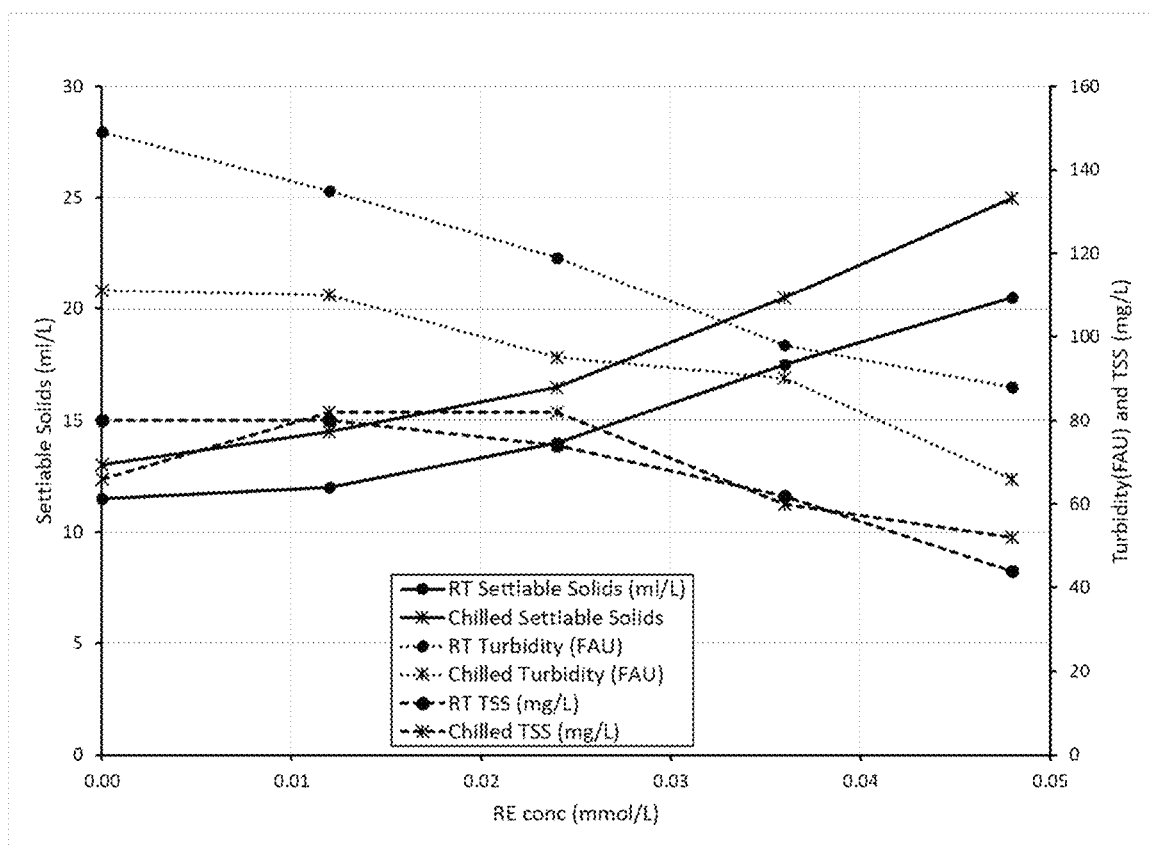
FIG. 5O is a graph of turbidity and TSS vs. the RE concentration in mmol/L of Example 5E.
Figure 5P:
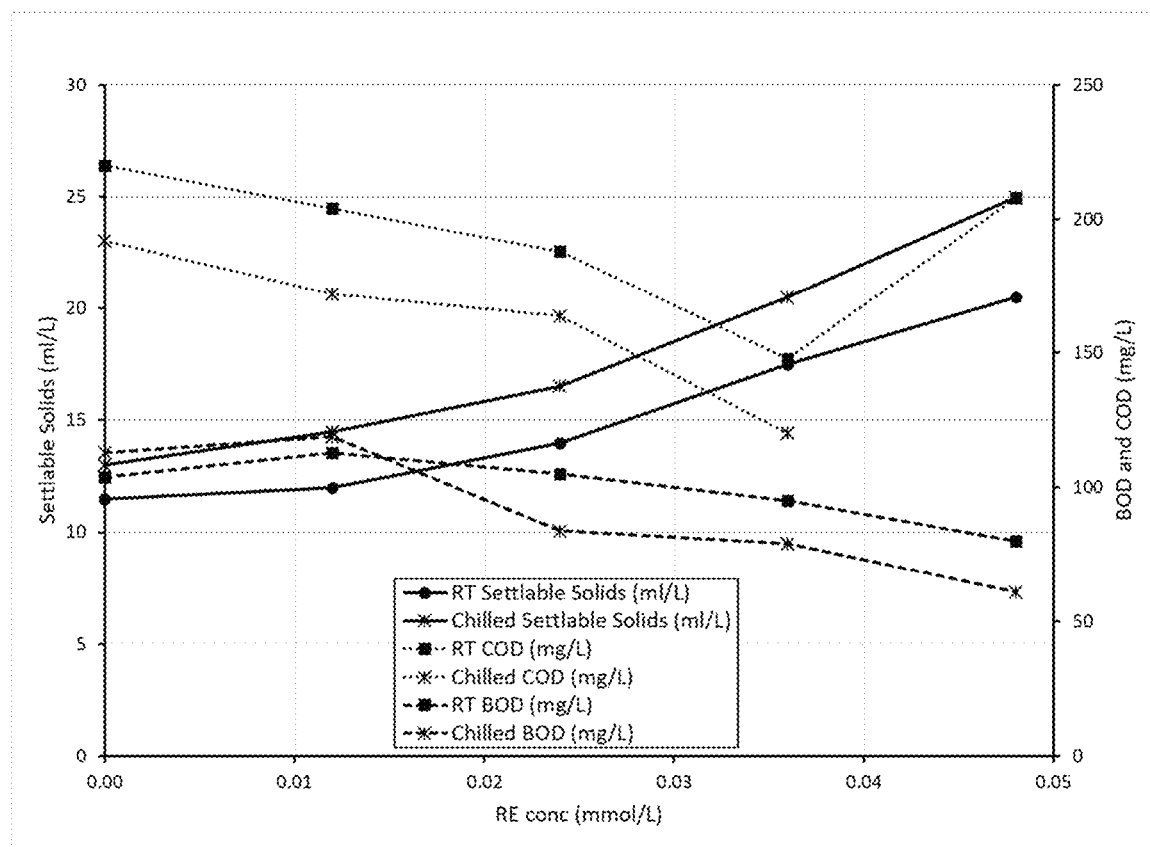
FIG. 5P is a graph of COD and BOD vs. the RE concentration in mmol/L of Example 5E.
Figure 5Q:
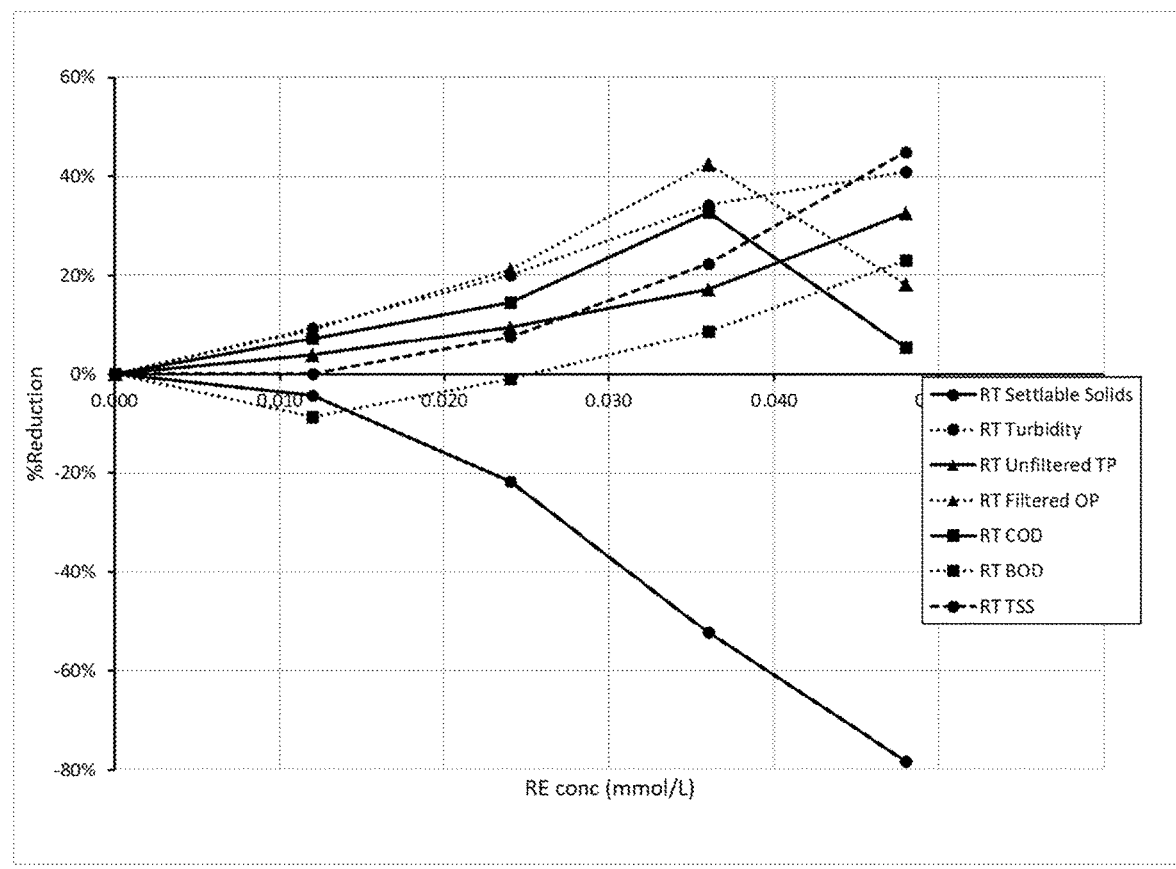
FIG. 5Q is a graph of the % Reduction of settable solids, turbidity, Unfiltered TP, Filtered OP, COD, BOD and TSS vs. the RE concentration in mmol/L for the room temperature samples of Example 5D.
Figure 5R:
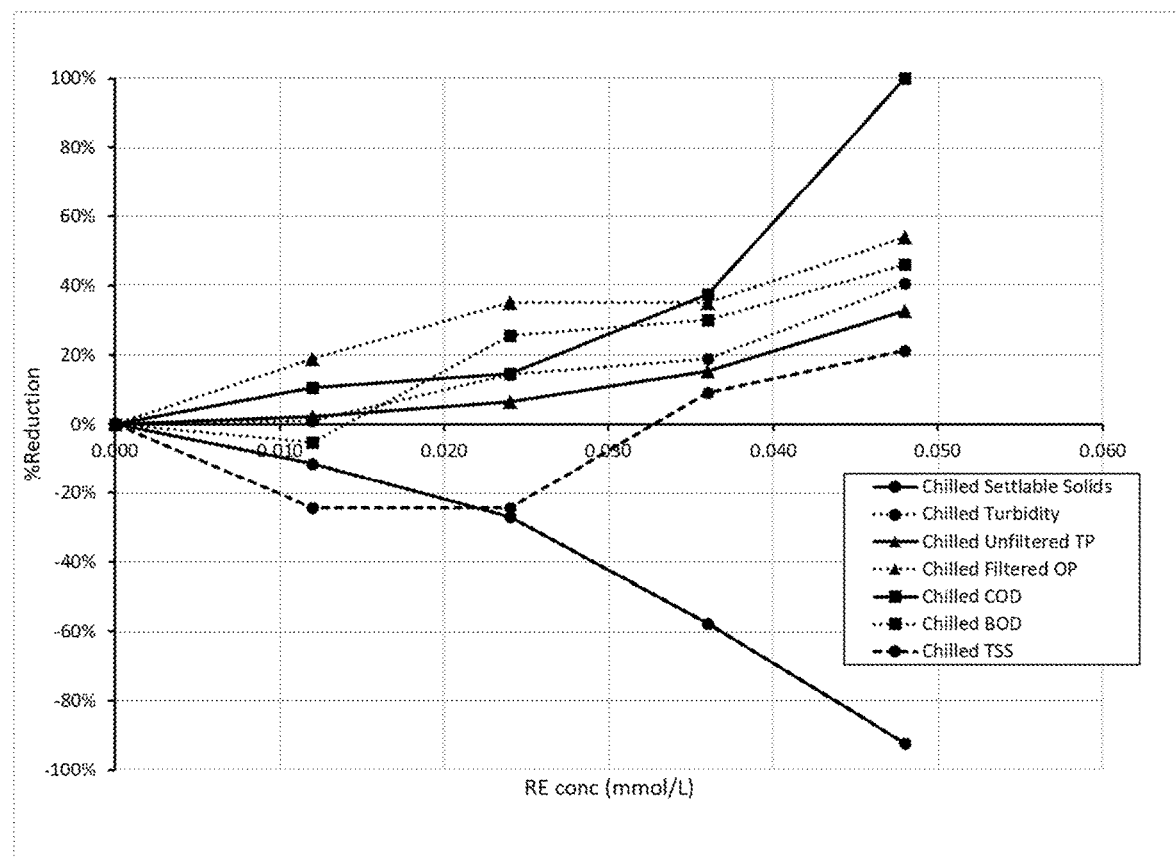
FIG. 5R is a graph of the % Reduction of settable solids, turbidity, Unfiltered TP, Filtered OP, COD, BOD and TSS vs. the RE concentration in mmol/L for the chilled samples of Example 5D.

The settable solids, Unfiltered TP and Filtered OP of each sample were measured and plotted vs. the RE concentration in mmol/L, as shown in FIG. 5N. Unfiltered samples of the supernatant from each dosing were measured for turbidity, COD, BOD and TSS and plotted vs. the RE concentration in mmol/L, as shown in FIG. 5O and FIG. 5P. % Reduction at RT is as shown in FIG. 5Q and % Reduction Chilled is as shown in FIG. 5R.

Analytical Testing methods were as described in Example 1.

Conclusion:

Wastewater samples from a 32 MGD wastewater treatment plant in Virginia were collected and dosed with $CeCl_3$ and $(CeLa)Cl_3$ solutions. Addition of RE resulted in an overall reduction in Turbidity, OP, TP, COD, BOD, and TSS; as well as an increase in settable solids. Dosing at chilled sample has similar effects but dosing at lower temperatures does not appear to offer an advantage over dosing at warmer temperatures.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method for treating wastewater, including removing phosphorus while maintaining a ratio of C—P, comprising:
dosing wastewater as part of a primary treatment or before the primary treatment with a clarifying agent of chloride salts of Ce and La having from 55.0-75.0% Ce and from 25.0-45.0% La and any balance being chloride salts of other rare earth elements, in an amount to provide a rare earth (RE):phosphorus (P) molar ratio of approximately 0.1:1 RE:P to approximately 0.8:1 RE:P and at a rare earth concentration of 0.01 to 0.5 mmol/L of wastewater,
wherein the dosing provides a ratio of C to P ranging from 150 C:1 P to 25 C:1 P for dosed wastewater and wherein the dosing reduces one or more of orthophosphate (OP), total phosphorous (TP), total organic carbon (TOC), chemical oxygen demand (COD), and biochemical oxygen demand (BOD); and
passing the dosed wastewater to a secondary treatment, wherein the ratio of C to P maintains microorganisms in the secondary treatment.

2. The method of claim 1, wherein the wastewater is dosed to provide a rare earth concentration of 0.03 to 0.30 mmol RE/L wastewater.

3. The method of claim 1, wherein the balance of chloride salts of other rare earth elements is less than 2%.

4. The method of claim 3, wherein the chloride salts of other rare earth elements are selected from the group consisting of Pr, Nd, Sm, Y, and mixtures thereof.

5. The method of claim 1, wherein the clarifying agent contains less than 10 g/L of sodium, iron, lead, uranium, and mixtures thereof.

6. The method of claim 1, wherein the clarifying agent of chloride salts of Ce and La has from 60.0-65.0% Ce and 30.0-40.0% La and the balance being one or more of chloride salts of other rare earth elements.

7. The method of claim 1, wherein the clarifying agent of chloride salts of Ce and La has from 59.8-70.1% Ce and from 29.9-40.1% La and the balance being one or more of chloride salts of any other rare earth elements.

8. The method of claim 1, wherein the clarifying agent of is an aqueous solution of chloride salts of Ce and La.

9. The method of claim 1, wherein dosing achieves a ratio of C to P ranging from 100 C:1 P to 50 C:1 P for the wastewater.

10. The method according to claim 1, wherein the wastewater is dosed with the clarifying agent upstream of the primary treatment, in the primary treatment, or both upstream of and in the primary treatment.

11. The method of claim 10, wherein the wastewater is dosed with the clarifying agent at multiple dose points.

12. The method of claim 10, wherein the wastewater is dosed with the clarifying agent upstream of the primary treatment and prior to a grit screen or any pretreatment.

13. The method of claim 10, wherein the primary treatment is continuous and the wastewater is dosed with the clarifying agent at multiple dose points.

14. The method of claim 1, wherein the dosing reduces turbidity, orthophosphate (OP), total phosphorous (TP), total organic carbon (TOC), chemical oxygen demand (COD), biochemical oxygen demand (BOD), and total suspended solids (TSS).

15. The method of claim 1, wherein the wastewater is dosed in an amount to provide a RE:P molar ratio of approximately 0.1:1 to 0.5:1 and at a rare earth concentration of 0.013 mmol/L to 0.052 mmol/L of wastewater.

16. The method of claim 1, wherein the wastewater is dosed in an amount to provide a RE:P molar ratio of approximately 0.4:1 to 0.8:1 and at a rare earth concentration of 0.04 mmol/L to 0.09 mmol/L of wastewater.

17. The method of claim 1, wherein the wastewater is dosed in an amount to provide a RE:P molar ratio of approximately 0.1:1 to 0.4:1 and at a rare earth concentration of 0.04 mmol/L to 0.09 mmol/L of wastewater.

18. A method for treating wastewater, including removing phosphorus while maintaining a ratio of C—P, comprising:
dosing wastewater as part of a primary treatment or before the primary treatment with a clarifying agent of chloride salts of a pure rare earth element of Ce or Sm to provide a rare earth (RE):phosphorus (P) molar ratio of approximately 0.1:1 RE:P to approximately 0.8:1 RE:P and at a rare earth concentration of 0.01 to 0.5 mmol/L of wastewater,
wherein the dosing provides a ratio of C to P ranging from 150 C:1 P to 25 C:1 P for the dosed wastewater and wherein the dosing reduces one or more of orthophosphate (OP), total phosphorous (TP), total organic carbon (TOC), chemical oxygen demand (COD), and biochemical oxygen demand (BOD); and
passing the dosed wastewater to a secondary treatment, wherein the ratio of C to P maintains microorganisms in the secondary treatment.

19. The method of claim 18, wherein the wastewater is dosed in an amount to achieve a ratio of C to P ranging from 100 C:1 P to 50 C:1 P.

20. A method for treating wastewater, including removing phosphorus while maintaining a ratio of C—P, comprising:
dosing wastewater in multiple doses as part of a primary treatment or before the primary treatment with a clarifying agent of chloride salts of Ce and La having from 55.0-75.0% Ce and from 25.0-45.0% La and any balance being chloride salts of other rare earth elements or of chloride salts of Ce, in an amount to provide a rare earth concentration of 0.01 to 0.5 mmol/L of wastewater,
wherein the dosing provides a ratio of C to P ranging from 150 C:1 P to 25 C:1 P for dosed wastewater and wherein the dosing reduces one or more of orthophosphate (OP), total phosphorous (TP), total organic carbon (TOC), chemical oxygen demand (COD), biochemical oxygen demand (BOD), turbidity, and total suspended solids (TSS).

21. The method of claim 20, further comprising the step of passing the dosed wastewater to a secondary treatment, wherein the ratio of C to P maintains microorganisms in the secondary treatment.

* * * * *

UNITED STATES PATENT AND TRADEMARK OFFICE
CERTIFICATE OF CORRECTION

PATENT NO. : 11,111,161 B2
APPLICATION NO. : 16/178356
DATED : September 7, 2021
INVENTOR(S) : Haneline et al.

Page 1 of 1

It is certified that error appears in the above-identified patent and that said Letters Patent is hereby corrected as shown below:

In the Claims

Column 37, Line 31, Claim 2, delete "of"

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*